US008010396B2

(12) United States Patent
Gura

(10) Patent No.: US 8,010,396 B2
(45) Date of Patent: Aug. 30, 2011

(54) METHOD AND SYSTEM FOR VALIDATING TASKS

(75) Inventor: Gerald Alan Gura, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1416 days.

(21) Appl. No.: 11/502,721

(22) Filed: Aug. 10, 2006

(65) Prior Publication Data

US 2008/0127041 A1  May 29, 2008

(51) Int. Cl.
*G06Q 10/00* (2006.01)
(52) U.S. Cl. ............... 705/7.12; 705/7.23; 705/7.41
(58) Field of Classification Search .......... 705/8, 7.12, 705/7.23, 7.41
See application file for complete search history.

(56) References Cited

U.S. PATENT DOCUMENTS

| | | | |
|---|---|---|---|
| 5,381,332 A | 1/1995 | Wood | |
| 5,671,361 A | 9/1997 | Brown et al. | |
| 5,907,490 A | 5/1999 | Oliver | |
| 5,923,552 A | 7/1999 | Brown et al. | |
| 6,817,613 B2 | 11/2004 | Hasek | |
| 6,842,760 B1* | 1/2005 | Dorgan et al. | 700/100 |
| 7,310,684 B2* | 12/2007 | Patrick et al. | 709/238 |
| 7,349,863 B1* | 3/2008 | Pena-Mora et al. | 705/7.12 |
| 7,653,008 B2* | 1/2010 | Patrick et al. | 370/254 |
| 7,904,324 B2 | 3/2011 | Gura | |
| 2002/0049621 A1 | 4/2002 | Bruce | |
| 2002/0111823 A1* | 8/2002 | Heptner | 705/1 |
| 2002/0198926 A1 | 12/2002 | Panter et al. | |
| 2003/0178769 A1 | 9/2003 | Hasek | |
| 2003/0233268 A1 | 12/2003 | Taqbeem et al. | |
| 2004/0030590 A1 | 2/2004 | Swan et al. | |
| 2004/0143811 A1* | 7/2004 | Kaelicke et al. | 717/101 |
| 2004/0204972 A1* | 10/2004 | Anant et al. | 705/7 |
| 2005/0114829 A1* | 5/2005 | Robin et al. | 717/101 |
| 2005/0149927 A1 | 7/2005 | Abe | |
| 2005/0222881 A1 | 10/2005 | Booker | |

(Continued)

FOREIGN PATENT DOCUMENTS

EP  1 355 245 A1  10/2003

(Continued)

OTHER PUBLICATIONS

Winter, Ron; "119 Schedule Checks is a Complete Review", Presented at the 2003 PrimaVera Users Conference, Nov. 11, 2003, pp. 1-23. retrieved from the web at: http://ronwinterconsulting.com/raupdate.htm.*

(Continued)

*Primary Examiner* — Jonathan G Sterrett
(74) *Attorney, Agent, or Firm* — Schmeiser, Olsen & Watts; John R. Pivnichny

(57) ABSTRACT

A computer-implemented method and system for validating a task of a plurality of tasks of a project. A computing application executes routines to automatically identify errors associated with one or more tasks. The routines generate exception reports that facilitate correction of the errors via user-determined selections of actions or via corrective actions automatically displayed by the computing application. The error identification facilitates validation of project elements including milestones, dependencies and deliverables, key work products, tasks in a work breakdown structure (WBS), predecessors and successors in the WBS, resources, work and labor rates, links between project plans, and an update of a project. Further, the error identification facilitates an analysis of schedule conflicts between give and get tasks.

8 Claims, 35 Drawing Sheets

U.S. PATENT DOCUMENTS

| | | | |
|---|---|---|---|
| 2005/0264581 A1* | 12/2005 | Patrick et al. | 345/594 |
| 2006/0044307 A1 | 3/2006 | Song | |
| 2006/0173762 A1 | 8/2006 | Clater | |
| 2008/0301153 A1* | 12/2008 | Greer et al. | 707/10 |
| 2011/0029440 A1* | 2/2011 | Motoyama et al. | 705/301 |
| 2011/0071956 A1* | 3/2011 | Pinto et al. | 705/348 |

FOREIGN PATENT DOCUMENTS

| | | |
|---|---|---|
| EP | 1 355 246 A1 | 10/2003 |

OTHER PUBLICATIONS

The architecture of an active database management system by D McCarthy—1989.*

Active database rules with transaction-conscious stable-model . . . by C Zaniolo—1995.*

Enforcing high-level protocols in low-level software acm.org [PDF]R DeLine, M Fähndrich—Proceedings of the ACM SIGPLAN 2001 . . . , 2001—portal.acm.org.*

A high-performance, portable implementation of the MPI message passing interface standard psu.edu [PDF]W Gropp, E Lusk, N Doss, A Skjellum—Parallel Computing, 1996—Elsevier.*

Active database systems psu.edu [PDF]U Dayal, E Hanson, J Widom—Modern Database Systems, 1995—Citeseer.*

Snoop: An Event Specification Language for Active Database Systems psu.edu [PDF]D Mishra—1991—Citeseer.*

SEAMAN: Implementing Process-Centered Software Development Environments on Top of an Active Database Management System psu.edu [PDF]D Tombros, A Geppert, KR Dittrich—1995—Citeseer.*

An overview of the extended static checking system psu.edu [PDF]DL Detlefs—Proceedings of the First Workshop on Formal Methods . . . , 1996—Citeseer.*

An Application of Role-Based Access Control in an Organizational Software Process Knowledge Base dtic.mil [PDF]WA Windhurst, Naval Postgraduate School . . .—2001—oai.dtic.mil.*

Model checking programs psu.edu [PDF]W Visser, K Havelund, G Brat, SJ Park, F . . .—Automated Software . . . , 2003—Springer.*

Winters, Ron; "Checks and Balances: Baseline Schedule Review", Oct. 22, 2002, Presented at the 2002 Primavera Users Conference, pp. 1-22.*

Winters, Ron; "White Paper on Using Schedule Analyzer Professional", Dec. 14, 2002, pp. 1-5.*

Check'n'crash: combining static checking and testing psu.edu [PDF]C Csallner, Y Smaragdakis—27th International Conference on . . . , 2005—ieeexplore.ieee.org.*

Project Management Considerations for Distributed Processing Applications jstor.org [PDF]RG Felix, WL Harrison—MIS quarterly, 1984—JSTOR.*

Fleisch, et al; The value of information integration in meeting delivery dates; Journal of Organizational Computing and Electronic Commerce, vol. 11, No. 1; pp. 15-30; ISSN: 1054-1721.

Office Action (Mail Date Sep. 14, 2010) for U.S. Appl. No. 11/517,148, filed Sep. 7, 2006; First Named Inventor: Gerald Alan Gura; Confirmation No. 1715.

Notice of Allowance (Mail Date Oct. 29, 2010) for U.S. Appl. No. 11/529,175, filed Sep. 28, 2006; First Named Inventor: Gerald Alan Gura; Confirmation No. 8204.

Earned value project management method and extensions gwu.edu [PDF] FT Anbari—IEEE Engineering Management Review, 2004—gwu.edu.

Connecting earned value to the scheduleearnedschedule.com [PDF] W Lipke—The Measurable News, 2004—earnedschedule.com.

Project portfolio earned value management using treemaps umd.edu [PDF] JH Cable, JF Ordonez, G Chintalapani, C . . .—Proceeding of the . . . , 2004—cs.umd.edu.

Earned value project management QW Fleming, JM Koppelman, JM Oppelman—Crosstalk, 1998.

Is the Earned-Value Method an Enemy of Workflow? YW Kim, G Ballard—. . . Conference of the International Group for . . . 2000—leanconstruction.org.

Notice of Allowance (Mail Date Apr. 14, 2011) for U.S. Appl. No. 11/517,148, Filing Date Sep. 7, 2006.

* cited by examiner

*1450*

| Task Name | Start | Finish | Baseline Start (Rollup) | Baseline Finish (Rollup) | Original Baseline Start | Original Baseline Finish | BCWS-BAC | Baseline Cost (Rollup) |
|---|---|---|---|---|---|---|---|---|
| − Baseline Errors in the EVM template | 12/16/2003 | 12/22/2003 | 12/11/2003 | 12/23/2003 | NA | NA | $0.00 | $840.00 |
| Unused Task (For project office use only) | 12/15/2003 | 12/15/2003 | 12/19/2003 | 12/19/2003 | NA | NA | $0.00 | $0.00 |
| Manually Increased Baseline Start Date to 12/17 | 12/16/2003 | 12/22/2003 | 12/17/2003 | 12/19/2003 | NA | NA | ($16.00) | $40.00 |
| Manually Decreased Baseline Start to 12/11 | 12/16/2003 | 12/22/2003 | 12/11/2003 | 12/19/2003 | NA | NA | $0.00 | $40.00 |
| Manually Increased Baseline Finish Date to 12/23 | 12/16/2003 | 12/22/2003 | 12/15/2003 | 12/23/2003 | NA | NA | $0.00 | $40.00 |
| Manually Decreased Baseline Finish Dates to 12/17 | 12/16/2003 | 12/22/2003 | 12/15/2003 | 12/17/2003 | NA | NA | $0.00 | $40.00 |
| Manually Increased BAC to 65 | 12/16/2003 | 12/22/2003 | 12/15/2003 | 12/19/2003 | NA | NA | ($25.00) | $65.00 |
| Manually Decreased BAC 15 | 12/16/2003 | 12/22/2003 | 12/15/2003 | 12/19/2003 | NA | NA | $25.00 | $15.00 |
| | | | | | | | | |
| Manually Inc BS to 12/16 Inc BF 12/23 Inc BC 60 | 12/16/2003 | 12/22/2003 | 12/16/2003 | 12/23/2003 | NA | NA | ($28.00) | $60.00 |
| Manually Inc BS to 12/16 Inc BF 12/23 Dec BC 15 | 12/16/2003 | 12/22/2003 | 12/16/2003 | 12/23/2003 | NA | NA | $17.00 | $15.00 |
| Manually Inc BS to 12/16 dec BF 12/18 Inc BC 60 | 12/16/2003 | 12/22/2003 | 12/16/2003 | 12/18/2003 | NA | NA | ($28.00) | $60.00 |
| Manually inc BS To 12/16 Dec BF 12/18 Dec BC 15 | 12/16/2003 | 12/22/2003 | 12/16/2003 | 12/18/2003 | NA | NA | $17.00 | $15.00 |
| | | | | | | | | |
| Manually Dec BS to 12/12 Inc BF 12/23 Inc BC 60 | 12/16/2003 | 12/22/2003 | 12/12/2003 | 12/23/2003 | NA | NA | ($20.00) | $60.00 |
| Manually Dec BS to 12/12 Inc BF 12/23 Dec BC 15 | 12/16/2003 | 12/22/2003 | 12/12/2003 | 12/23/2003 | NA | NA | $25.00 | $15.00 |
| Manually Dec BS to 12/12 dec BF 12/18 Inc BC 60 | 12/16/2003 | 12/22/2003 | 12/12/2003 | 12/18/2003 | NA | NA | ($20.00) | $60.00 |
| Manually Dec BS To 12/12 Dec BF 12/18 Dec BC 15 | 12/16/2003 | 12/22/2003 | 12/12/2003 | 12/18/2003 | NA | NA | $25.00 | $15.00 |

*FIG. 14C*

| Task Name | Start | Finish | Baseline Start (Rollup) | Baseline Finish (Rollup) | Original Baseline Start | Original Baseline Finish | BCWS-BAC | Baseline Cost (Rollup) |
|---|---|---|---|---|---|---|---|---|
| - Baseline Errors in the EVM template | 12/16/2003 | 12/22/2003 | 12/11/2003 | 12/23/2003 | NA | NA | $0.00 | $540.00 |
| Unused Task (For project office use only) | 12/15/2003 | 12/15/2003 | 12/19/2003 | 12/19/2003 | NA | NA | $0.00 | $0.00 |
| Manually Increased Baseline Start Date to 12/17 | 12/16/2003 | 12/22/2003 | 12/17/2003 | 12/19/2003 | 12/15/2003 | NA | ($16.00) | $40.00 |
| Manually Decreased Baseline Start to 12/11 | 12/16/2003 | 12/22/2003 | 12/11/2003 | 12/19/2003 | 12/15/2003 | NA | $0.00 | $40.00 |
| Manually Increased Baseline Finish Date to 12/23 | 12/16/2003 | 12/22/2003 | 12/15/2003 | 12/23/2003 | NA | 12/19/2003 | $0.00 | $40.00 |
| Manually Decreased Baseline Finish Dates to 12/17 | 12/16/2003 | 12/22/2003 | 12/15/2003 | 12/17/2003 | NA | 12/19/2003 | $0.00 | $40.00 |
| Manually Increased BAC to 65 | 12/16/2003 | 12/22/2003 | 12/15/2003 | 12/19/2003 | NA | NA | ($25.00) | $65.00 |
| Manually Decreased BAC 15 | 12/16/2003 | 12/22/2003 | 12/15/2003 | 12/19/2003 | NA | NA | $25.00 | $15.00 |
| | | | | | | | | |
| Manually Inc BS to 12/16 Inc BF 12/23 Inc BC 60 | 12/16/2003 | 12/22/2003 | 12/16/2003 | 12/23/2003 | 12/15/2003 | 12/19/2003 | ($28.00) | $60.00 |
| Manually Inc BS to 12/16 Inc BF 12/23 Dec BC 15 | 12/16/2003 | 12/22/2003 | 12/16/2003 | 12/23/2003 | 12/15/2003 | 12/19/2003 | $17.00 | $15.00 |
| Manually Inc BS to 12/16 dec BF 12/18 Inc BC 60 | 12/16/2003 | 12/22/2003 | 12/16/2003 | 12/18/2003 | 12/15/2003 | 12/19/2003 | ($28.00) | $60.00 |
| Manually inc BS to 12/16 Dec BF 12/18 Dec BC 15 | 12/16/2003 | 12/22/2003 | 12/16/2003 | 12/18/2003 | 12/15/2003 | 12/19/2003 | $17.00 | $15.00 |
| | | | | | | | | |
| Manually Dec BS to 12/12 Inc BF 12/23 Inc BC 60 | 12/16/2003 | 12/22/2003 | 12/12/2003 | 12/23/2003 | 12/15/2003 | 12/19/2003 | ($20.00) | $60.00 |
| Manually Dec BS to 12/12 Inc BF 12/23 Dec BC 15 | 12/16/2003 | 12/22/2003 | 12/12/2003 | 12/23/2003 | 12/15/2003 | 12/19/2003 | $25.00 | $15.00 |
| Manually Dec BS to 12/12 dec BF 12/18 Inc BC 60 | 12/16/2003 | 12/22/2003 | 12/12/2003 | 12/18/2003 | 12/15/2003 | 12/19/2003 | ($20.00) | $60.00 |
| Manually Dec BS To 12/12 Dec BF 12/18 Dec BC 15 | 12/16/2003 | 12/22/2003 | 12/12/2003 | 12/18/2003 | 12/15/2003 | 12/19/2003 | $25.00 | $15.00 |

| EV RollUp | | E2E | Planning | Develop PM | Develop | Qualify |
|---|---|---|---|---|---|---|
| | BAC = | 659341 | 353018 | 147065 | 103703 | 55555 |
| | SPI = | 99.2% | 98.6% | 89.6% | 135.3% | 100.0% |
| | BSPI = | 97.4% | 98.6% | 87.4% | 79.7% | 100.0% |
| | SV = | -3028 | -4895 | -2367 | 4234 | 0 |
| | BCWS to date = | 393917 | 353018 | 22660 | 12005 | 6234 |
| | BCWP to date = | 390889 | 348123 | 20293 | 16239 | 6234 |
| | %PlanComp = | 59.7% | 100.0% | 15.4% | 11.6% | 11.2% |
| | %Comp = | 59.3% | 98.6% | 13.8% | 15.7% | 11.2% |
| | Behind = | -10189 | -4895 | -2862 | -2432 | 0 |
| | Ahead = | 7160 | 0 | 494 | 6666 | 0 |
| | BAC (Cost Basis) = | 603786 | 353018 | 147065 | 103703 | |
| | Standard EAC = | 607924 | 355876 | 147065 | 102541 | |
| | TCPI = | 101.2% | 235.7% | 100.0% | 99.8% | |
| | CPI = | 99.3% | 99.2% | 100.0% | 101.1% | |
| | CV = | -2636 | -2818 | 0 | 182 | |
| | BCWP (Cost Basis) = | 384655 | 348123 | 20293 | 16239 | |
| | ACWP to date = | 387291 | 350941 | 20293 | 16057 | |

| ID | Task Name | Baseline Cost | BCWS | BCWP | Behind Schedule | B/S Critical Path |
|---|---|---|---|---|---|---|
| 1 | Lab Integrated Plan | $80,102 | $62,651 | $62,427 | ($1,714) | ($709) |
| 163 | Detailed planning | $79,942 | $62,651 | $62,427 | ($1,714) | ($709) |
| 164 | PM-Project Management | $12,152 | $8,498 | $9,533 | ($61) | ($42) |
| 577 | Development | $27,355 | $27,087 | $26,965 | ($127) | ($127) |
| 578 | Integration / packaging | $3,754 | $2,684 | $2,729 | ($75) | ($62) |
| 636 | System Test | $11,107 | $8,057 | $7,077 | ($1,202) | ($228) |
| 762 | Documentation/Training | $7,775 | $7,410 | $7,163 | ($249) | ($249) |

METHOD AND SYSTEM FOR VALIDATING TASKS

FIELD OF THE INVENTION

The present invention relates to a method and system for validating tasks of a project.

BACKGROUND OF THE INVENTION

Conventional project plan management tools lack automation and functionality to easily and effectively build, quality assure and maintain a complex project plan while conforming to professional project management standards (e.g., standards provided the Project Management Institute or another similar authority). Further, conventional project management techniques are characterized by manual tasks that are complex, mentally-challenging and time-consuming. These manual tasks include determining project plan problem areas that need heightened focus, integrating large volumes of project plan details, and maintaining baseline integrity. Still further, known project management applications (e.g., Microsoft® Project) are limited to identifying only one or a minimal number of schedule conflicts per opening of a project management file for a project plan that includes a substantial number of schedule conflicts. Moreover, conventional project performance measurements indicate a project is ahead of schedule overall while providing no indication that a significant number of tasks of the project or a number of critical tasks are behind schedule. Thus, there exists a need to overcome at least one of the preceding deficiencies and limitations of the related art.

SUMMARY OF THE INVENTION

In first embodiments, the present invention provides a computer-implemented method of validating a plurality of tasks of a project, comprising: executing one or more software routines by a computing application capable of managing the project; and identifying, by the computing application, a set of one or more errors, the set including at least one of a first set, a second set, a third set, a fourth set, a fifth set, a sixth set, a seventh set, and an eighth set, wherein each set of the first set through the eighth set includes one or more errors, wherein the plurality of tasks comprises at least one of: one or more milestones and one or more tasks having work assigned thereto, wherein the one or more milestones is capable of including one or more major milestones, wherein the plurality of tasks is capable of including one or more summary tasks, and wherein the identifying the set comprises at least one of:

identifying the first set by the computing application and in response to the executing, the first set associated with a first task of the plurality of tasks, the identifying facilitating a validation of a first milestone of the one or more milestones, wherein the plurality of tasks includes the one or more milestones, wherein the identifying the first set comprises at least one of:

identifying a first error of the first set based on a milestone type associated with the first task being a key milestone and a milestone flag associated with the first task indicating that the first task is not any milestone of the one or more milestones, identifying a second error of the first set based on the milestone type associated with the first task indicating that the first task is a first major milestone and the milestone flag associated with the first task indicating that the first task is not any milestone of the one or more milestones, wherein the one or more milestones includes the first major milestone, identifying a third error of the first set based on a summary task flag associated with the first task indicating that the first task is a first summary task included in the plurality of tasks and the milestone flag associated with the first task indicating that the first task is a first milestone of the one or more milestones, identifying a fourth error of the first set based on the milestone flag associated with the first task indicating that the first task is the first milestone and a work value associated with the first task being a non-zero amount of work assigned to the first task, identifying a fifth error of the first set based on the milestone type associated with the first task being a key milestone and the work value associated with the first task being a non-zero amount of work assigned to the first task, identifying a sixth error of the first set based on the milestone type associated with the first task being the first major milestone associated with the first task and the work value associated with the first task being a non-zero amount of work assigned to the first task, and identifying a seventh error of the first set based on the milestone type associated with the first task being the first major milestone associated with the first task and based on a constraint type associated with the first task not indicating that the first task is to be completed on a completion date and not indicating that the first task is to be completed no later than the completion date;

identifying the second set by the computing application and in response to the executing, the second set associated with a second task of the plurality of tasks, the second task being one of a first dependency and a first deliverable, the second task capable of being a first major dependency, the identifying the second set facilitating a validation of one of the dependency and the deliverable, wherein the plurality of tasks includes the one or more milestones, wherein the identifying the second set comprises at least one of:

identifying a first error of the second set based on a give/get value associated with the second task indicating that the second task is one of the deliverable and the dependency and based on a milestone flag associated with the second task indicating that the second task is not any milestone of the one or more milestones, identifying a second error of the second set based on a milestone type associated with the second task indicating the second task is the first major dependency and the milestone flag associated with the second task indicating that the second task is not any milestone of the one or more milestones, identifying a third error of the second set based on a summary task flag associated with the second task indicating that the second task is a second summary task included in the plurality of tasks and the milestone flag associated with the second task indicating that the second task is a second milestone of the one or more milestones, identifying a fourth error of the second set based on the give/get value associated the second task indicating the second task is one of the deliverable and the dependency, a work value associated with the second task being a non-zero amount of work assigned to the second task, and the milestone flag associated with the second task indicating that the second task is the second milestone, identifying a fifth error of the second set based on the milestone type associated with the second task indicating the second task is the first major dependency, the work value associated with the second task being the non-zero amount of work assigned to the second task, and the milestone flag associated with the second task indicating the second task is the second milestone, identifying, if the second task is the dependency, a sixth error of the second set based on the milestone type associated with the second task indicating the second task is the first major dependency and based on a constraint type associated with the second task not indicating that the second task is to be started on a start date and not indicating that the second task is to be started no earlier than the start date, identifying a seventh error of the second set based on the give/get value associated with the second task indicating that the second task is one of the deliverable and the dependency and a to/from value associated with the second task not indicating an individual responsible for fulfilling the dependency via providing input for the second task if the second task is the dependency or for providing the deliverable if the second task is the deliverable, identifying an eighth error of the second set based on the give/get value associated with the second task not indicating that the second task is the dependency and the milestone type associated with the second task indicating the second task is the first major dependency, and identifying a ninth error of the second set based on the give/get value associated with the second task indicating the second task is the dependency and the milestone type associated with the second task indicating that the second task is a second major milestone, wherein the one or more milestones includes the second major milestone;

identifying the third set by the computing application and in response to the executing, the third set associated with a third task of the plurality of tasks, the third task being a key work product, wherein a production of the key work product is required to complete the project, the identifying the third set facilitating a validation of the key work product, wherein the plurality of tasks includes the one or more milestones, wherein the identifying the third set comprises at least one of:

identifying a first error of the third set based on a milestone flag associated with the third task indicating that the third task is not any milestone of the one or more milestones and a work product value associated with the third task designating the third task as a first work product, identifying a second error of the third set based on a summary task flag associated with the third task indicating that the third task is a third summary task included in the plurality of tasks and the milestone flag associated with the third task indicating that the third task is a third milestone of the one or more milestones, identifying a third error of the third set based on the milestone flag associated with the third task indicating that the third task is the third milestone and a work value associated with an amount of work assigned to the third task being a non-zero value, identifying a fourth error of the third set based on the work product value associated with the third task designating the third task as the work product and a project phase field capable including a value associated with a project phase of the third task not including any value, identifying a fifth error of the third set based on the project phase field including the value associated with the project phase of the third task, the work product value associated with the third task not designating the third task as the work product, and a milestone type associated with the third task not indicating that the third task is a major milestone of the one or more milestones, and identifying a sixth error of the third set based on the milestone type associated with the third task indicating that the third task is a third major milestone and the work product value associated with the third task designating the third task as the work product, wherein the one or more milestones includes the third major milestone;

identifying the fourth set by the computing application and in response to the executing, the fourth set associated with a fourth task of the plurality of tasks, the fourth task being a task of a work breakdown structure that defines work to be accomplished to achieve a final objective of the project, the identifying the fourth set facilitating a validation of the task in the work breakdown structure, wherein the identifying the fourth set comprises identifying an error of the fourth set based on an earned value method value not indicating that a percentage of originally scheduled work that is actually completed for the fourth task is to be utilized by the computing application;

identifying the fifth set by the computing application and in response to the executing, the fifth set associated with a fifth task of the plurality of tasks, the fifth task capable of being associated with a predecessor of the fifth task and a successor to the fifth task, the fifth task capable of being a first key work product, the fifth task capable of being a first give task, the fifth task capable of being a first get task, the identifying the fifth set facilitating a validation of the predecessor and the successor, wherein the identifying the fifth set comprises at least one of:

identifying a first error of the fifth set based on a milestone type associated with the fifth task indicating that the fifth task is a fourth major milestone and a predecessor field associated with the fifth task not indicating any predecessor of the fifth task, wherein the plurality of tasks includes the one or more milestones and the one or more milestones includes the fourth major milestone, identifying a second error of the fifth set based on the milestone type associated with the fifth task being the fourth major milestone and a successor field associated with the fifth task not indicating any successor to the fifth task, wherein the plurality of tasks includes the one or more milestones and the one or more milestones includes the fourth major milestone, identifying a third error of the fifth set based on the milestone type associated with the fifth task being a key milestone type assigned to the fifth task and the predecessor field associated with the fifth task not indicating any predecessor of the fifth task, identifying a fourth error of the fifth set based on the milestone type associated with the fifth task being a key milestone type assigned to the fifth task and the successor field associated with the fifth task not indicating any successor to the fifth task, identifying a fifth error of the fifth set based on a give/get value associated with the fifth task indicating that the fifth task is the first give task and the successor field associated with the fifth task not indicating any successor to the fifth task that is external to the project, identifying a sixth error of the fifth set based on the give/get value associated with the fifth task indicating that the fifth task is the first give task and the predecessor field associated with the fifth task not indicating any predecessor of the fifth task, identifying a seventh error of the fifth set based on the give/get value associated with the fifth task indicating that the fifth task is the first get task and the predecessor field associated with the fifth task not indicating any predecessor of the fifth task that is external to the project, identifying an eighth error of the fifth set based on the give/get value associated with the fifth task indicating that the fifth task is the first get task and the successor field associated with the fifth task not indicating any successor to the fifth task, identifying a ninth error of the fifth set based on a key work product value associated with the fifth task designating the fifth task as the first key work product and the successor field associated with the fifth task not indicating any successor to the fifth task, identifying a tenth error of the fifth set based on the key work product value associated with the fifth task designating the fifth task as the first key work product and the successor field associated with the fifth task not indicating any successor to the fifth task, identifying an eleventh error of the fifth set based on a milestone flag associated with the fifth task indicating that the fifth task is not a milestone and the predecessor field associated with the fifth task not indicating any predecessor of the fifth task, identifying a twelfth error of the fifth set based on the milestone flag associated with the fifth task indicating that the fifth task is not a milestone and the predecessor field associated with the fifth task not indicating any successor to the fifth task, and identifying a thirteenth error of the fifth set based on an amount of total slack associated with the fifth task being greater than a predefined total slack limit;

identifying the sixth set by the computing application and in response to the executing, the sixth set associated with a sixth task of the plurality of tasks, the sixth task being associated with resources, work and labor rates, the identifying the sixth set facilitating a validation of the resources, the work and the labor rates, wherein the project is associated with one of an hours based earned value reporting and a dollars based earned value reporting, wherein the plurality of tasks includes the one or more milestones, wherein the identifying the sixth set comprises at least one of:

identifying, if the project is associated with the hours based earned value reporting, a first error of the sixth set based on a standard labor rate associated with the sixth task not being equal to one dollar per hour, identifying, if the project is associated with the dollars based earned value reporting, a second error of the sixth set based on the standard labor rate associated with the sixth task being less than a predefined standard labor rate, identifying, if the project is associated with the hours based earned value reporting, a third error of the sixth set based on an overtime labor rate associated with the sixth task being not equal to one dollar per hour, identifying, if the project is associated with the dollars based earned value reporting, a fourth error of the sixth set based on the overtime labor rate associated with the sixth set being less than a predefined overtime labor rate, identifying a fifth error of the sixth set based on a cost per use value associated with the sixth task being not equal to zero, identifying a sixth error of the sixth set based on a milestone flag associated with the sixth task indicating that the sixth task is not any milestone of the one or more milestones, a summary task flag associated with the sixth task indicating the sixth task is not any summary task included in the plurality of tasks, and a resource name field associated with the sixth task includes no names of resources assigned to the sixth task, identifying a seventh error of the sixth set based on the summary task flag associated with the sixth task indicating the sixth task is a fourth summary task included in the plurality of tasks and the resource name field associated with the sixth task indicating at least one resource assigned to the sixth task, identifying an eighth error of the sixth set based on the milestone flag associated with the sixth task indicating that the sixth task is not a milestone, the summary task flag associated with the sixth task indicating that the sixth task is not any summary task included in the plurality of tasks, a work value associated with the sixth task being a non-zero amount of work assigned to the sixth task, and the sixth task being defined within an end-to-end integrated plan, and identifying a ninth error of the sixth set based on the work value associated with the sixth task being greater than a predefined work value limit;

identifying the seventh set by the computing application and in response to the executing, the seventh set associated with a seventh task of the plurality of tasks, the seventh task associated with a link, the link connecting the seventh task to one of a successor task included in a second project and a predecessor task included in the second project, the identifying the seventh set facilitating a validation of the link, wherein the identifying the seventh set comprises at least one of:

identifying a first error of the seventh set based on a give/get value associated with the seventh task indicating that the seventh task is a second give task and a successor field associated with the seventh task not indicating the successor task included in the second project, identifying a second error of the seventh set based on the give/get value associated with the seventh task indicating that the seventh task is a second get task and a predecessor field associated with the seventh task not indicating the predecessor task included in the second project, and identifying a third error of the seventh set based on one of a first conflict between a critical date of the seventh task and a critical date of the successor task and a second conflict between the critical date of the seventh task and a critical date of the predecessor task; and identifying the eighth set by the computing application and in response to the executing, the eighth set associated with an eighth task of the plurality of tasks, the eighth task is a dependency associated with a predecessor task, the identifying the eighth set facilitating an analysis of one or more date conflicts associated with the eighth task and the predecessor task, wherein the identifying the eighth set comprises:

determining, by the computing application and in response to the executing, that a link between the eighth task and the predecessor task is valid, and identifying a date conflict associated with the eighth task based on a conflict between a critical date of the eighth task and a critical date of the predecessor task.

A system, computer program product, and process for supporting computing infrastructure corresponding to the above-summarized method are also described and claimed herein.

Advantageously, the present invention provides a technique for automating and integrating project task validation activities. The present invention provides an interface to execute a user-specified group of operations for automatic identification, display and correction of errors, thereby facilitating the validation of tasks in a project.

BRIEF DESCRIPTION OF THE DRAWINGS

FIG. 14C is a screen illustrating baseline errors to be detected by the process of FIGS. 14A-14B, in accordance with embodiments of the present invention.

FIG. 14D is a screen illustrating a result of identifying baseline information missing from the screen of FIG. 14C, in accordance with embodiments of the present invention.

FIG. 15 is an example of a report including a behind schedule performance index used in the methods of FIG. 1A and/or FIG. 1B, in accordance with embodiments of the present invention.

FIG. 16B is an example of a Behind Schedule report used to analyze behind schedule components of a project plan in the methods of FIG. 1A and/or FIG. 1B, in accordance with embodiments of the present invention.

DETAILED DESCRIPTION OF THE INVENTION

Figure 14A:
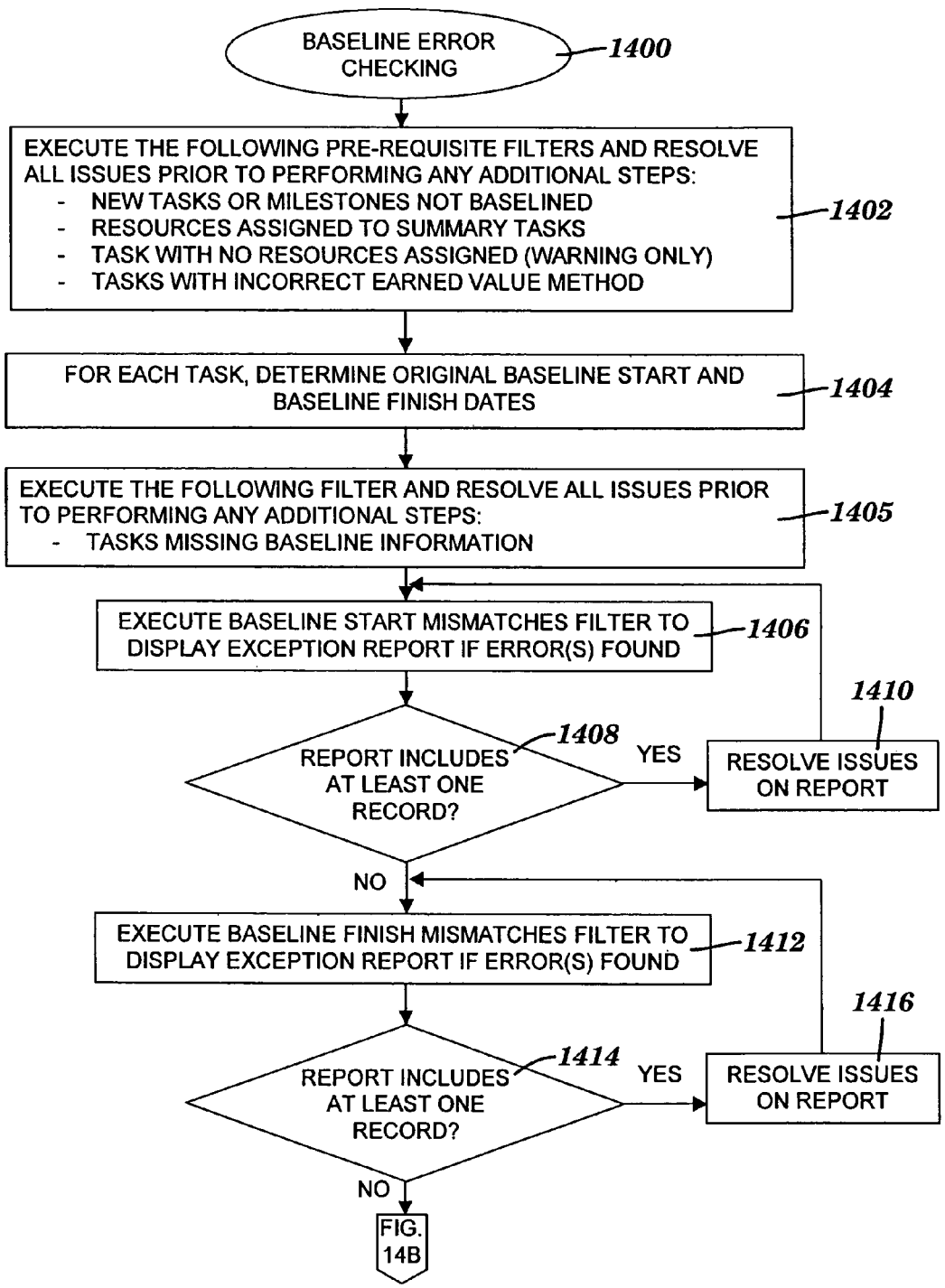
FIGS. 14A-14B depict a flow chart of a process of baseline error checking in the method of FIG. 1B, in accordance with embodiments of the present invention.
Figure 14B:
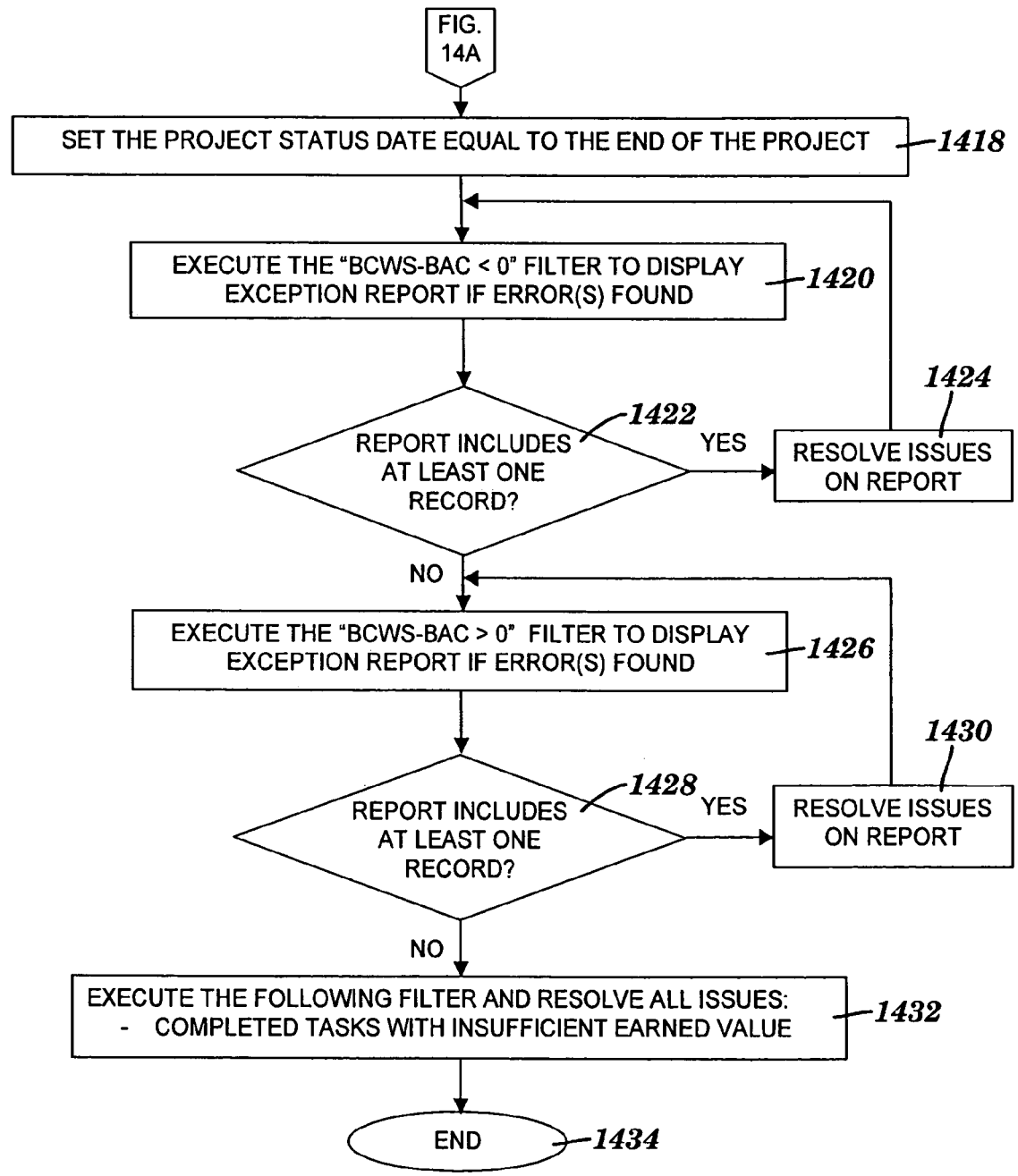

The present invention provides a method and system for quality assuring and validating a project plan's task setup and syntax during project planning and execution, expeditiously and accurately assuring the quality of a project plan's baseline during project planning and execution, and identifying behind schedule performance issues during project execution. The present invention is implemented by a computing application that is, for example, an add-on to a software-based project management application. The computing application provides a novel sequence of processes to facilitate the validation of tasks and assure the quality of a baseline of a project, where the sequence includes eight processes in the order presented below:

(1) validating milestones (see FIGS. 3A-3B),
(2) validating dependencies and deliverables (see FIG. 4),
(3) validating key work products (see FIG. 5),
(4) validating tasks in a work breakdown structure (see FIG. 6),
(5) validating predecessors and successors in a work breakdown structure (see FIG. 7),
(6) validating resources, work and labor rates (see FIGS. 8A-8B), (7) identifying and resolving schedule conflicts (see FIGS. 12A-12F), and (8) validating a project baseline (see FIGS. 14A-14B).

In one embodiment, the processes (1) through (8) listed above refer to the same task of a project. In another embodiment, different tasks are referred to by any pair of processes selected from processes (1) through (8).

Hereinafter, "computing application" refers to the software application that executes and/or facilitates the aforementioned quality assurance, validation, and performance reporting techniques of the present invention. Hereinafter, "user" refers to one or more individuals who utilize the computing application to validate tasks of a project, assure the quality of the project's baseline, and assess the project's performance.

DEFINITIONS

A list of terms used herein and their definitions are presented below.

Ahead of Schedule: A custom field that records the schedule variance relative to a task if the task is ahead of schedule.

Baseline: The original approved plan for a project, plus or minus approved scope changes. A baseline includes a set of project estimates such as task name, duration, work, resource assignments, schedule and costs. A baseline also includes a baseline start date and a baseline finish date that are copies of the start and finish dates, respectively, of each task in a project plan. Moreover, a baseline includes calculations of the budgeted actual cost, budgeted cost of work scheduled and budgeted cost of work performed. Baseline is usually used with a modifier (e.g., cost baseline, schedule baseline, and performance measurement baseline).

Baseline cost (BAC): The sum of the total budgets for a project.

Baseline finish date: The date work was scheduled to finish for a task when the original project plan was approved.

Baseline start date: The date work was scheduled to start for a task when the original project plan was approved.

Behind Schedule: A custom field that records the schedule variance value relative to a task if the task is behind schedule.

Budgeted cost of work performed (BCWP): The sum of approved cost estimates, including any overhead allocation, for tasks or portions of tasks completed during a given time period. BCWP is also known as Earned Value.

Budgeted cost of work scheduled (BCWS): The sum of the approved cost estimates, including any overhead allocation, for tasks or portions of tasks scheduled to be performed during a given time period. BCWS is also known as Planned Value.

Constraint: A factor that affects when an activity can be scheduled (e.g., a field value that limits the start or finish date of a task).

Critical path: The series of tasks that must finish on time for the entire project to finish on schedule. Each task on the critical path is a critical task.

Deliverable: A task reserved (along with a dependency) for denoting a completion of an intermediate event resulting in a hand off between two subprojects operating within the same end-to-end integrated plan. A deliverable is denoted when a subproject is sending a work product or similar output. A deliverable is also known as a Give or a Give task.

Dependency: A task reserved (along with a deliverable) for denoting a completion of an intermediate event resulting in a hand off between two subprojects operating within the same end-to-end integrated plan. A dependency is denoted when a subproject receives a work product or similar input. A dependency is also known as a Get or a Get task.

Earned value methodology (EVM): A body of processes, models, rules, procedures, tools and techniques that are employed in a project schedule planning, tracking and controlling management system. EVM includes custom filters, macros and metrics that facilitate quality assurance of a project plan.

Earned Value (EV) Rollup: A report provided by EVM that includes earned value metrics for an end-to-end integrated plan and the integrated plan's subprojects.

End-to-end (e2e) integrated plan: A project comprised of individual subprojects that are seamlessly linked via predecessor and successor assignments. This term is also referred to herein simply as "integrated plan."

External task: A task residing in a plan that is external to another plan that includes a given task. The external task and the given task are in a predecessor-successor or successor-predecessor relationship.

Milestone: A task with no duration and associated with 0 hours of work. A milestone designates a significant event in a project (e.g., marking the completion of a phase of a project).

Project: A temporary endeavor of interrelated activities implemented for a specific purpose.

Project plan: A set of documents that support a project.

Predecessor: A task that must start or finish before another task can start or finish.

Schedule Variance (SV): SV=BCWP−BCWS. The SV of a task, summary task, subproject or integrated plan indicates whether the task, summary task, subproject or integrated plan is ahead of schedule (i.e., positive SV value) or behind schedule (i.e., negative SV value).

Scheduled Performance Index (SPI): SPI=BCWP/BCWS. SPI provides a rate at which a task, subproject or integrated plan is actually progressing compared to the original plan.

Slack: The amount of time that a task may be delayed from its earliest possible start date without delaying the finish date of the project. Slack is also known as float.

Subproject: One project of multiple projects included in an e2e integrated plan.

Successor: A task that cannot start or finish until another task has started or finished.

Overview of Project Management Process

Figure 1A:
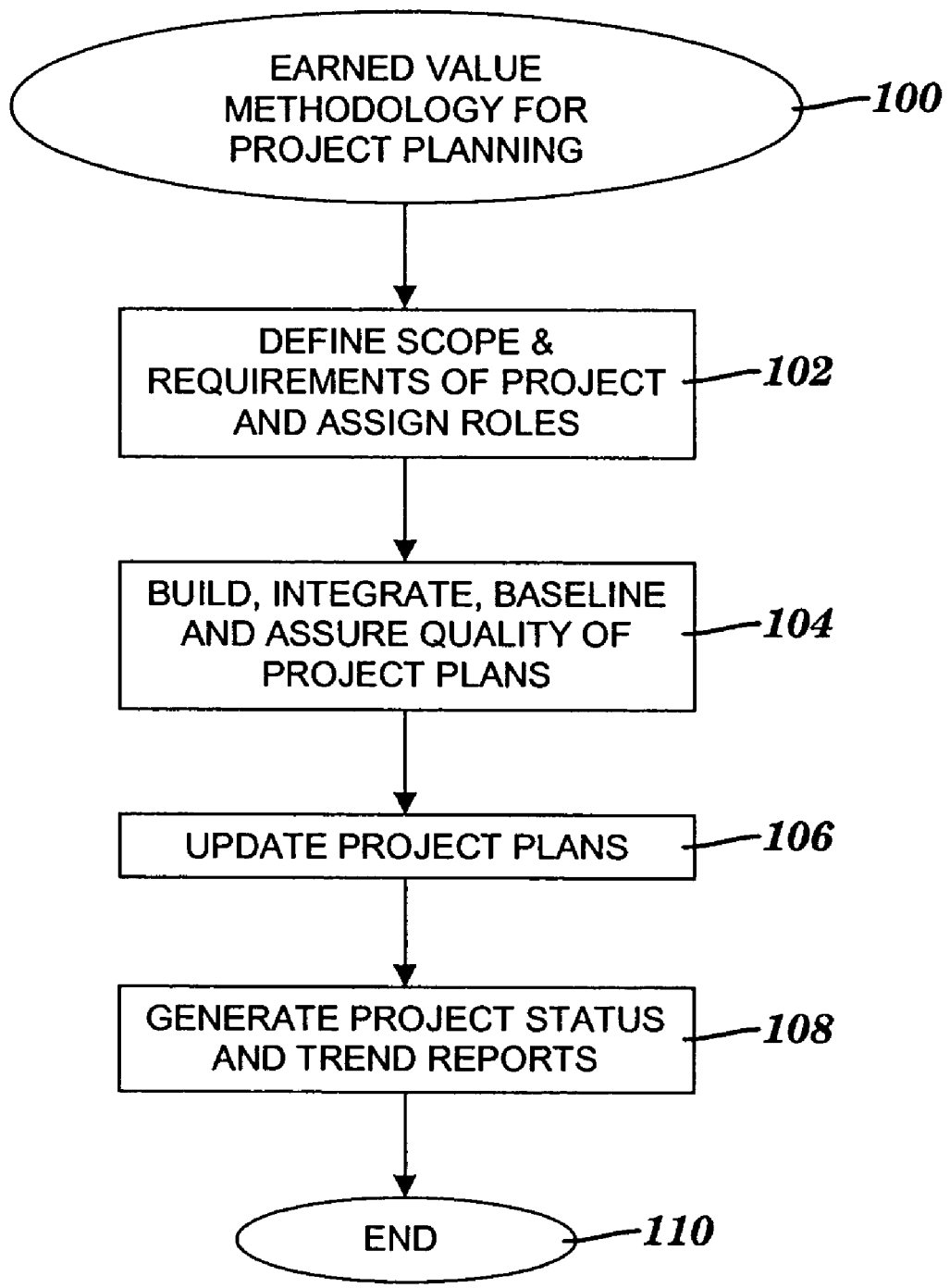
FIG. 1A is a flow chart of an overview of a project management process, in accordance with embodiments of the present invention.

FIG. 1A is a flow chart of an overview of a project management process, in accordance with embodiments of the present invention. The project management process of FIG. 1A is also referred to herein as the earned value methodology (EVM). The EVM begins at step 100. In step 102, one or more management teams define the scope and requirements of a project and assign roles and responsibilities to entities associated with the management of the project (e.g., assign a client project manager and assign a Single Point of Contact (SPOC) role). In step 104, a project manager builds, integrates and baselines an e2e integrated plan. Step 104 also includes a quality assurance (QA) review of the project plan. The QA review is performed by one or more project managers utilizing a computing application and includes validating tasks of a project, as described below relative to FIG. 1B. In step 106, one or more project managers updates the project plan based on the QA review. In step 108, status and trend reports associated with the project are generated and reviewed by one or more project managers. The project management process of FIG. 1A ends at step 110.

Overview of Task Validation

Figure 1B:
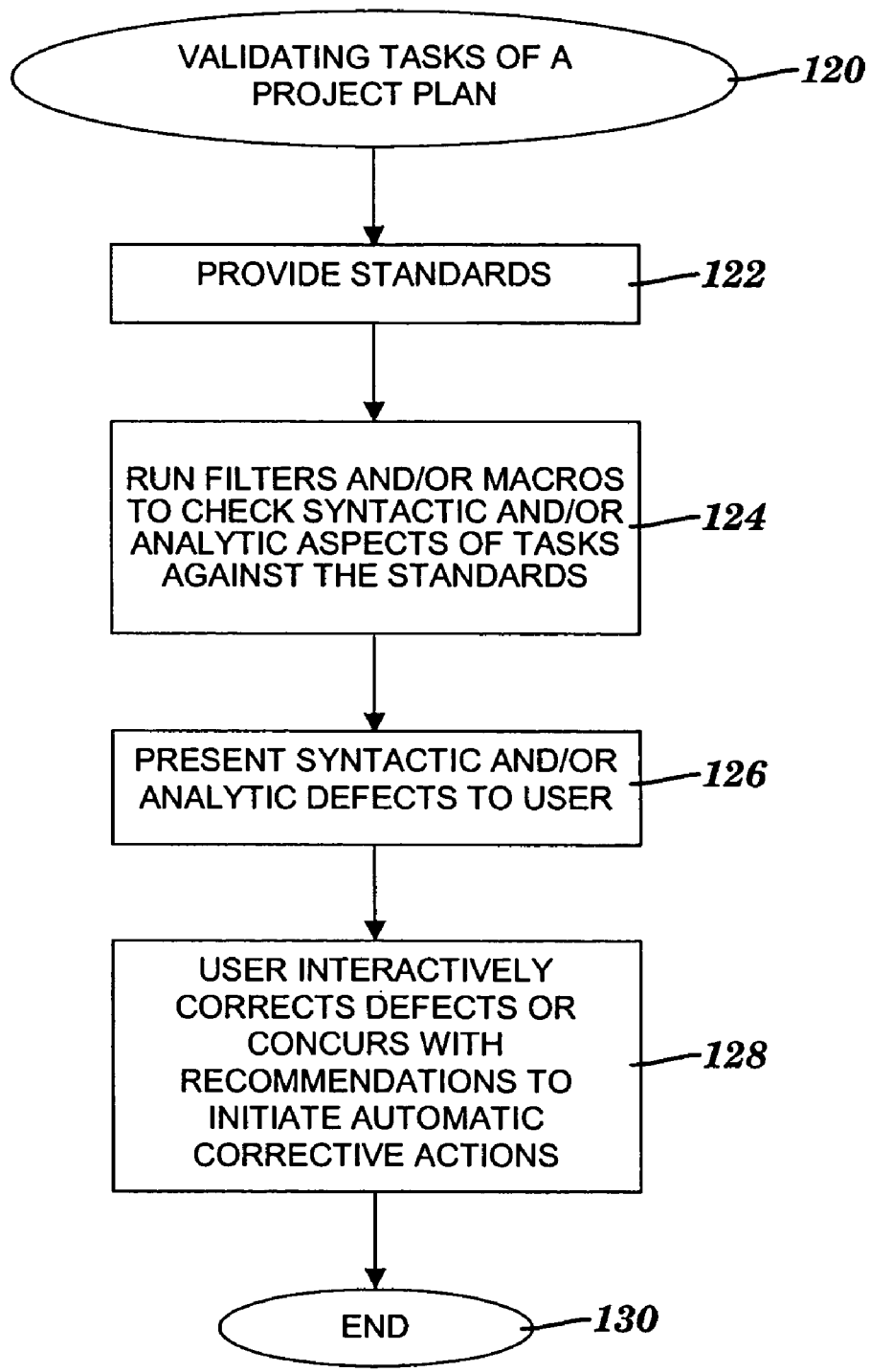
FIG. 1B is a flow chart of a method for validating tasks of a project managed by the process of FIG. 1A, in accordance with embodiments of the present invention.

FIG. 1B is a flow chart of a method for validating a plurality of tasks of a project managed by the process of FIG. 1A, in accordance with embodiments of the present invention. The plurality of tasks of the project includes at least one milestone and/or at least one task having a work value assigned thereto.

In one embodiment, the plurality of tasks includes one or more summary tasks. In another embodiment, the plurality of tasks includes one or more major milestones. The task validation method of FIG. 1B is implemented by a computing application and starts at step 120. In one embodiment, the computing application is an add-on component to a project planning application (e.g., Microsoft® Project). In step 122, pre-defined standards are input into the computing application. Each pre-defined standard is associated with a characteristic of one or more tasks of the project being managed. The characteristic of a task is syntactic or analytic.

In step 124, a user of the computing application initiates the execution of code via the computing applications. In one embodiment, the execution of the code in step 124 includes an execution of one or more filters and/or macros. Hereinafter, the one or more filters and/or macros of step 124 are collectively referred to as software routines. Each of the one or more software routines validates tasks of a project in step 124 by identifying whether or not an error (a.k.a. defect) is associated with a syntactic or an analytic characteristic of each task. An error associated with a syntactic or analytic characteristic is identified by determining that the syntactic or analytic characteristic is in nonconformance with an associated pre-defined standard which was input in step 122.

In step 126, the error(s) identified in step 124 are presented to a user of the computing application via an interface provided by the application. In step 128, the user interacts with the interface to correct one or more errors identified in step 124, or the computing application displays a recommended action to correct the one or more errors and the user initiates, via the interface, an automatic correction of the one or more errors. The task validation process of FIG. 1B ends at step 130.

Building Project Plans

Figure 2:
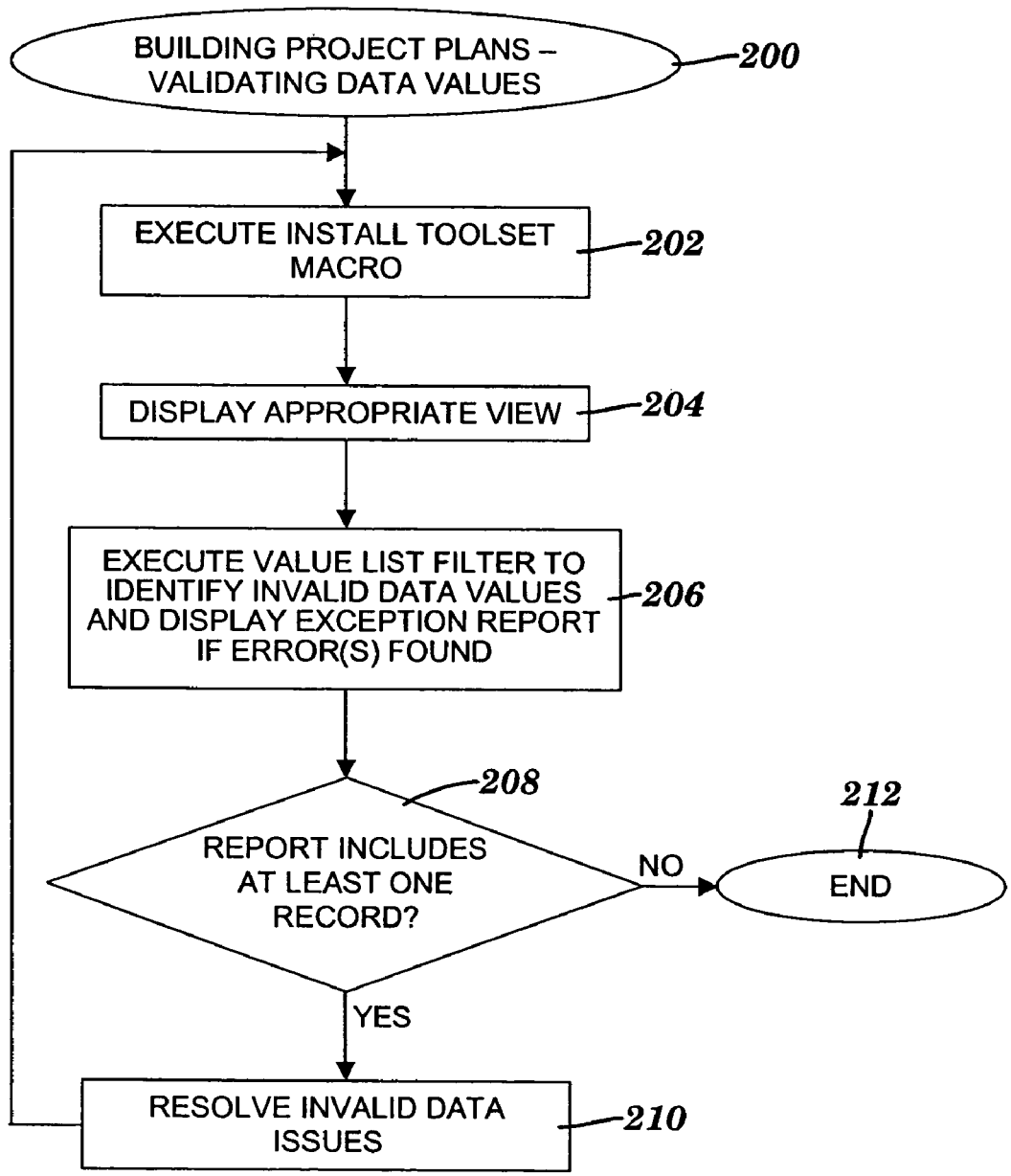
FIG. 2 is a flow chart of a process for installing the computing application and validating data values in the method of FIG. 1B, in accordance with embodiments of the present invention.

FIG. 2 is a flow chart of a process for installing the computing application and validating data values in the method of FIG. 1B, in accordance with embodiments of the present invention. The data value validation process begins at step 200. In step 202, a user who has downloaded or received an EVM project scheduling template executes a macro to install an EVM toolset (i.e., install the computing application). The template includes views, tables, filters and fields for which valid data values are defined by a value list. In this case, the value list comprises a set of pre-defined standards by which the template's data values are validated. The toolset installation includes migrating EVM components (e.g., data values) from the template to an existing file for project management (e.g., an existing Microsoft® Project .mpp file). The toolset includes software tools that provide, for example, an automated generation of project status reports.

In step 204, a view of data from the project management file is optionally displayed. In step 206, a software routine (e.g., a value list filter) is executed by the computing application to automatically identify whether there are one or more invalid data values that were previously entered in the template. If one or more invalid data values are identified, the invalid data value(s) are displayed in an interactive view that includes an exception report. Any exception report provided by the computing application and described herein is interactive and includes user-modifiable field values. A data value of the one or more data values is identified as being invalid because the data value is not included in the list of valid data values defined by the value list. For example, a data value included in a Give/Get field is identified as being invalid because the data value does not conform to the list of valid data values that includes "Get," "Give," "External Get," and "External Give." The exception report generated in step 206 also identifies one or more tasks associated with the one or more invalid data values. Valid data values associated with each of the identified tasks are not displayed on the exception report.

Inquiry step 208 determines if the exception report includes at least one record (i.e., includes at least one task and at least one associated invalid data value). If the exception report does include at least one record, the user resolves the issues associated with the invalid data in step 210 via the computing application. In one embodiment, the user corrects the displayed one or more invalid data value(s) by selecting one or more different, valid data values via the interactive view. Following step 210, the process begins another iteration by returning to step 202. These iterations continue until inquiry step 208 indicates that the exception report does not include at least one record, and the data value validation process ends at step 212.

Validating Milestones

Figure 3A:
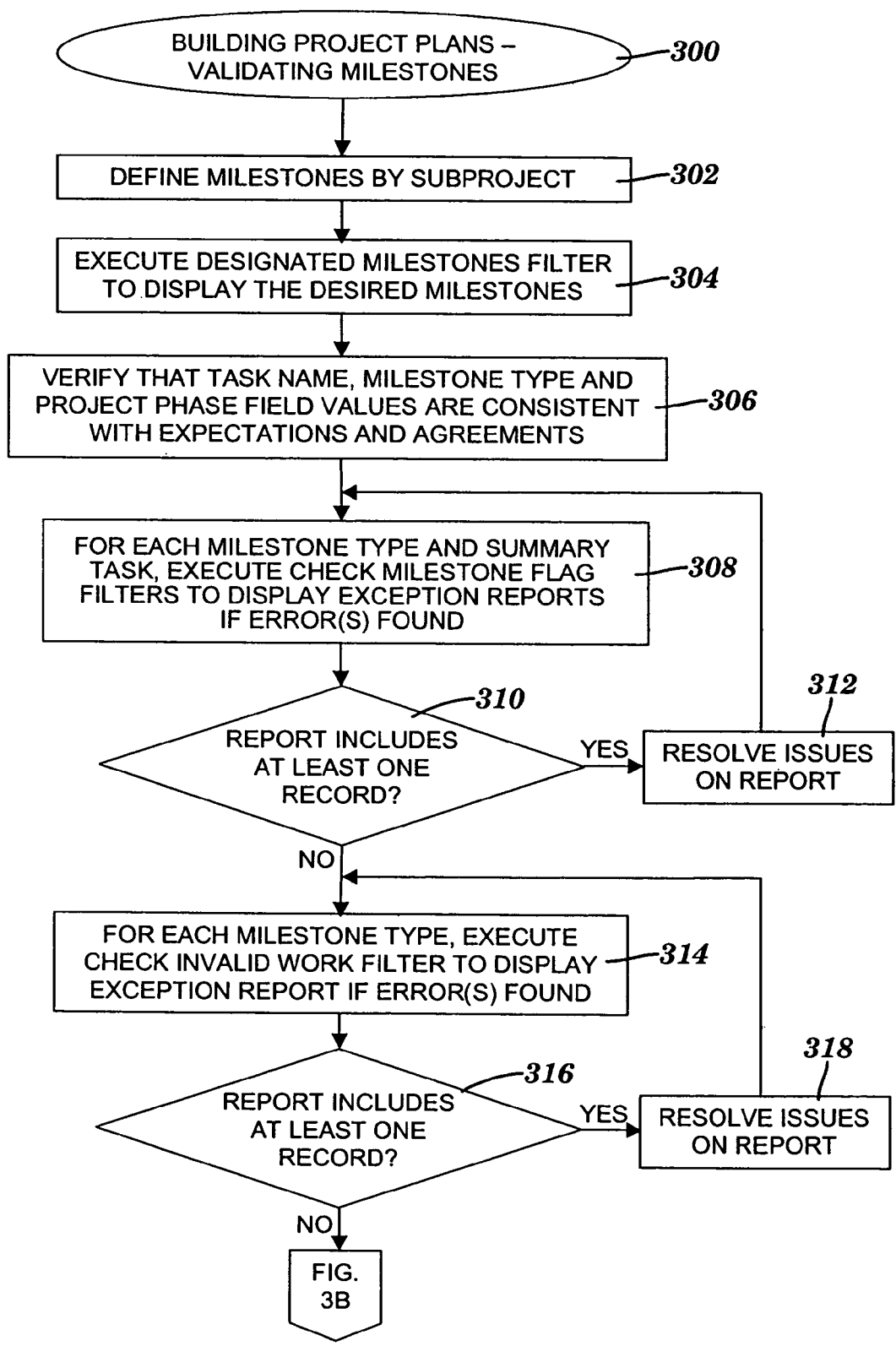
FIGS. 3A-3B depict a flow chart of a process of validating milestones in the method of FIG. 1B, in accordance with embodiments of the present invention.
Figure 3B:
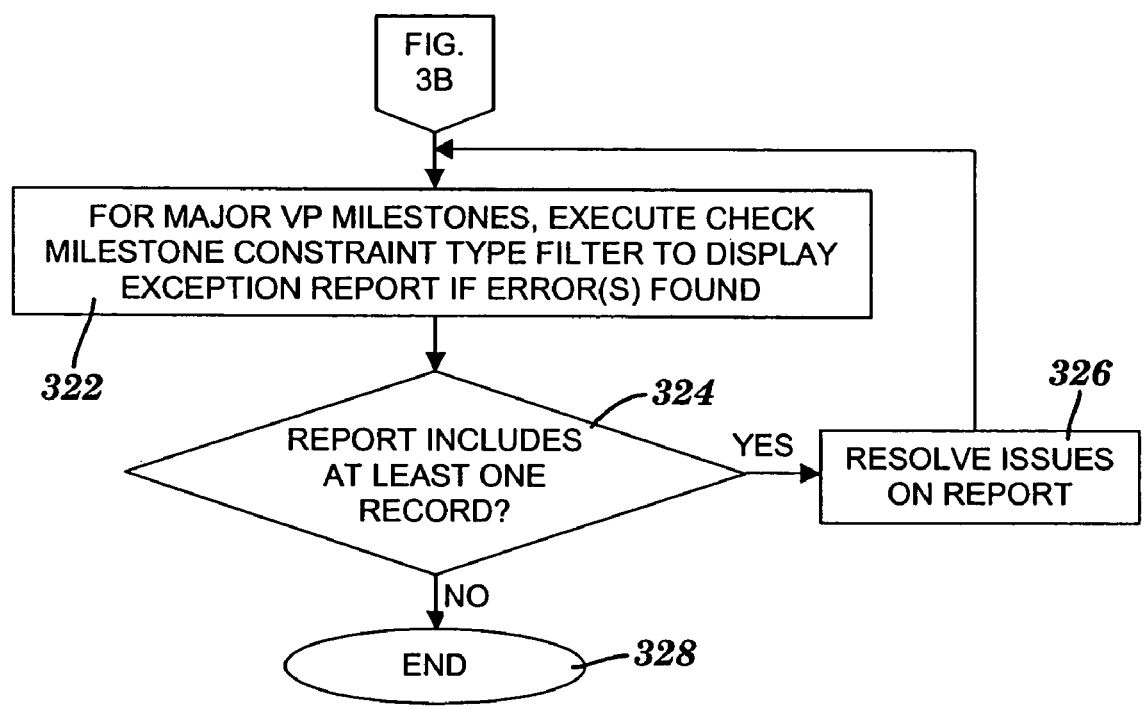

FIGS. 3A-3B depict a flow chart of a process of validating milestones in the method of FIG. 1B, in accordance with embodiments of the present invention. The milestone validation method starts at step 300 of FIG. 3A. In step 302, a user utilizes a template provided by the computing application to define one or more milestones by subproject. In one embodiment, each milestone definition includes one or more of the following field values: (1) an identifier of the milestone (e.g., task name), (2) a milestone type, (3) a constraint type (i.e., "finish no later than" or "must finish on") (4) a constraint date indicating the committed date for completing the event designated by the defined milestone, (5) a resource name indicating the name of a deliverable owner, (6) a milestone flag set to "Yes," (7) a work field set to "0" and (8) a duration field set to "0."

The milestone type field value indicates, for example, major VP milestone (a.k.a. major (VP) milestone or major milestone), major dependency VP milestone (a.k.a. major dependency VP), key milestone, or standard milestone. Major VP milestones and major dependency VP milestones are items in a project designated to appear on specified reports for a Vice President (VP) (e.g., monthly Vice President's report) or for another specified person or position.

As used herein, the modifier "key" in key milestone, key Get, and key work product indicates items that are to appear in an executive summary report. Items not designated as "key" will not show up on the executive summary report.

The present invention imposes a rule to limit the constraint type for a Key, Major or Give milestone to "finish no later than" or "must finish on" to ensure that any schedule slippage results in a schedule conflict occurring within the project plan that experienced the delay.

In step 304, the user selects one or more milestone types to display via one or more milestone filters. The computing application executes the one or more milestone filters in step 304 to display a list of milestones of the selected milestone type(s). In step 306, the user verifies that the task name, milestone type, and project phase field values in the list are consistent with expectations and agreements associated with a project manager (e.g., a solution project manager). The user verifies that the list is accurate and complete. To be accurate, the list includes only milestones of the selected type or a summary line associated with a milestone of the selected type.

In step 308, the computing application executes a QA filter for each milestone type to automatically search for and identify any errors in milestone flag fields. In one embodiment, the computing application in step 308 executes an Invalid Milestone flag for Key Milestone filter that identifies an invalid milestone flag for a task if a value indicating a key milestone is specified in the milestone type field for the task and the task's milestone flag field is set to No. If the milestone type field is set to indicate a Key milestone, then the milestone flag field must be set to Yes. It will be understood by those skilled in the art that a name of any filter or macro used herein is an example and that the present invention contemplates that other names can be substituted in each case.

Further, step 308 in the aforementioned embodiment includes the computing application executing an Invalid Milestone flag for Major VP filter that identifies an invalid milestone flag field for a task if the task is defined as a Major VP milestone in the milestone type field and the task's milestone flag field equals No. If the milestone type field is set to indicate a Major VP milestone, then the milestone flag field must be set to Yes.

Step 308 also includes an execution of an Invalid Milestone flag for Summary Task filter that identifies an invalid milestone flag for a task if the task is defined as a summary task and the task's milestone field is set to Yes. A summary task cannot be designated as a milestone.

For example, if a milestone type field specifies a key milestone, but the corresponding milestone flag field equals "No", then the milestone flag value is invalid and the corrective action is setting the milestone flag field "Yes." As another example, if a task is defined as a Major VP milestone, but the corresponding milestone flag field equals "No", then the milestone flag field value is invalid and the corrective action is setting the milestone flag to "Yes."

If the filters executed in step 308 identify any errors, then the computing application also generates and displays an exception report in step 308. Otherwise, the computing application indicates that no errors were identified in step 308. If inquiry step 310 determines that the exception report generated in step 308 includes at least one record indicating at least one error identified in step 308, then the computing application automatically displays one or more corrective actions in step 312 that can resolve at least one error indicated by the exception report. The user selects an option in step 312 to prompt the computing application to automatically apply a displayed corrective action or to bypass the corrective action(s). Following step 312, the process repeats starting at step 308.

For example, the exception report generated by step 308 includes a record having a milestone type field value of "major (VP) milestone" and a milestone flag set to No. This record indicates an invalid milestone because any key milestone or major (VP) milestone must be associated with a milestone flag that is set to Yes. The computing application displays a selectable option to change the milestone flag setting associated with the record from No to Yes. The user selects the option and the computing application modifies the milestone flag setting to Yes. If no other record appeared on the exception report, then the subsequent execution of step 308 after step 312 indicates that no errors were identified in the subsequent execution of step 308.

If inquiry step 310 determines that the exception report of step 308 does not include at least one record (i.e., no errors were identified in step 308), then the computing application executes, in step 314, a QA filter for each type of milestone to automatically search for and identify any errors in work fields. Hereinafter, the filters executed in step 314 are also referred to as the Invalid Work for Milestone filter, the Invalid Work for Key Milestone filter and the Invalid Work for Major VP filter.

As a first example, the execution of the Invalid Work for Milestone filter identifies a task that has a milestone flag field set to "Yes", but the corresponding work field value does not equal zero. Since milestones must be associated with work that equals zero according to predefined standards, the first example identifies an invalid work field value.

As a second example, the execution of the Invalid Work for Key Milestone filter identifies a task whose milestone type field indicates a key milestone and whose milestone flag field is set to "Yes", but whose corresponding work field value does not equal zero. Since key milestones must be associated with a work field value that equals zero, the second example identifies an invalid work field value.

As a third example, the execution of the Invalid Work for Major VP filter identifies a task whose milestone type field indicates a major VP milestone and whose milestone flag field is set to "Yes", but whose corresponding work field value does not equal zero. Since major VP milestones must be associated with a work field value that equals zero, the third example identifies an invalid work field value.

If the execution of the filters in step 314 identifies any errors, then the computing application also generates and displays an exception report in step 314. Otherwise, the computing application indicates that no errors were identified in step 314. If inquiry step 316 determines that the exception report generated in step 314 includes at least one record indicating at least one error identified in step 314, then the computing application automatically displays one or more corrective actions in step 318 that can resolve at least one error indicated by the exception report. The user selects an option in step 318 to prompt the computing application to automatically apply a displayed corrective action or to bypass the corrective action(s). Following step 318, the process repeats starting at step 314.

Returning to the first example described above, the exception report generated includes a record having a milestone flag set to Yes and a work field set to a non-zero value and the computing application displays an option to perform a corrective action whereby the non-zero work value is changed to zero. The user selects the option and the corrective action is performed by the computing application. If no other record appeared on the exception report, then the subsequent execution of step 314 after step 318 indicates that no errors were identified in the subsequent execution of step 314.

If inquiry step 316 determines that the exception report of step 314 does not include at least one record (i.e., no errors were identified in step 314), then the milestone validation process continues in FIG. 3B. In step 322 of FIG. 3B, the computing application executes a QA filter to automatically check milestone constraint types for major VP milestones. Hereinafter, the filter of step 322 is also referred to as the Invalid Constraint Type for Major VP filter.

As an example, the execution of the Invalid Constraint Type for Major VP filter identifies an uncompleted task whose milestone type field defines the task as a major VP milestone, but whose corresponding constraint type field includes a value other than "Must Finish On" or "Finish No Later Than." Since the only valid constraint types for a milestone whose type is a major VP milestone are "Must Finish On" and "Finish No Later Than," this example identifies an invalid constraint type.

If the execution of the filter in step 322 identifies any errors, then the filter also generates and displays an exception report in step 322. Otherwise, the computing application indicates that no errors are identified in step 322. If inquiry step 324 determines that the exception report generated in step 322 includes at least one record indicating at least one error identified in step 322, then the computing application automatically determines and automatically displays one or more corrective actions in step 326 that can resolve one or more errors indicated by the exception report. The user selects an option in step 326 to prompt the computing application to automatically apply a displayed corrective action or to bypass the corrective action(s). Following step 326, the process repeats starting at step 322.

Returning to the example described above relative to step 322, the exception report generated includes a record for a major VP milestone whose constraint type field includes "As Late As Possible," rather than the only valid values of "Must Finish On" or "Finish No Later Than." The computing application displays an option to perform a corrective action, whereby the constraint type field is changed from As Late As Possible to Finish No Later Than. The user selects the displayed option and the corrective action is performed by the computing application. If no other record appeared on the exception report, then the subsequent execution of step 322 after step 326 indicates that no errors are identified by the filter of step 322.

If inquiry step 324 determines that the exception report of step 322 does not include at least one record (i.e., no errors were identified in step 322), then the milestone validation process ends at step 328.

In one embodiment, the computing application identifies and presents to the user one or more proposed corrective actions that resolve the issue(s) in steps 312, 318 and/or 326, where any of the one or more proposed correction actions are automatically completed via the user's interaction with an interface view that includes the exception report associated with the issues being resolved (e.g., the user activates an onscreen button to select a proposed corrective action).

Validating Dependencies and Deliverables

Figure 4:
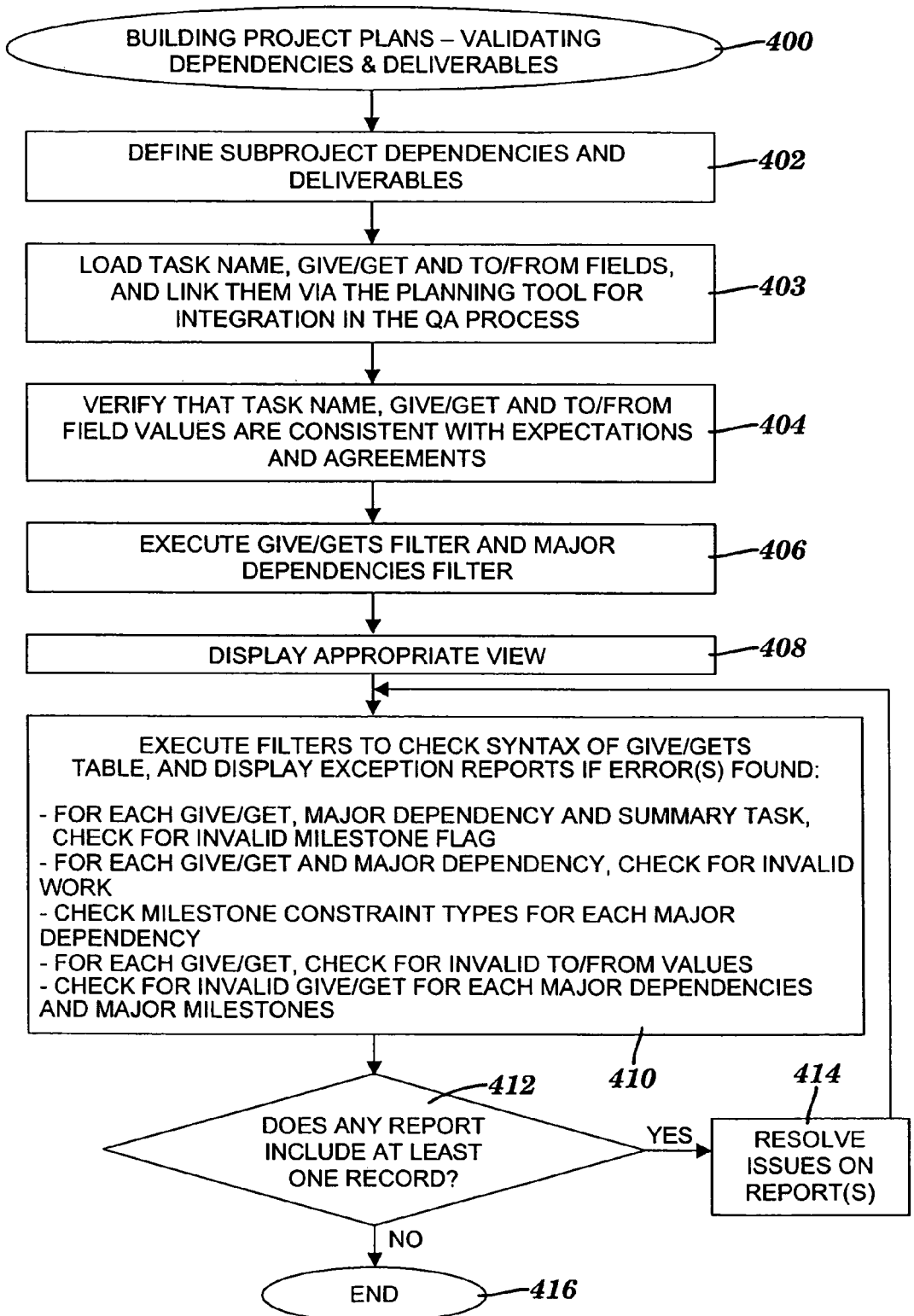
FIG. 4 is a flow chart of a process of validating dependencies and deliverables in the method of FIG. 1B, in accordance with embodiments of the present invention.

FIG. 4 is a flow chart of a process of validating dependencies and deliverables in the method of FIG. B, in accordance with embodiments of the present invention. The dependencies and deliverables validation process begins at step 400. In step 402, dependencies and deliverables for a subproject are defined by the user via a template provided by the computing application. In step 403, the user enters values in the following fields associated with a dependency or a deliverable: task name, give/get, to/from, constraint type, constraint date and resource name.

In the case of step 403 referring to a dependency, the task name indicates a name of a work product or similar project element being received as an input from another subproject and the give/get field indicates a get (i.e., a dependency that is outside the subproject but within the e2e integrated plan) or an external get (i.e., a dependency outside the e2e integrated plan). Further, the to/from field indicates the name of the person (e.g., project lead) who is responsible for fulfilling the dependency (i.e., the person who is to provide the input). Still further, the constraint type field value must be "start no earlier than" or "must start on", and the constraint date is the interlocked date indicating the earliest time in the schedule the subproject can expect to receive the input. Moreover, the resource name field contains the name of the person who will receive the input.

In the case of step 403 referring to a deliverable, the task name is a name of a work product or similar project element being delivered as an output to another subproject and the give/get field indicates a give (i.e., a deliverable outside the subproject but within the e2e integrated plan) or an external give (i.e., a deliverable outside the e2e integrated plan). Further, the to/from field indicates the name of the person (e.g., project lead) who will receive the output. Still further, the constraint type field value must be "finish no later than" or "must finish on", and the constraint date is the interlocked date indicating the latest time in the schedule the subproject can expect to deliver the output. The resource name field for a deliverable includes the name of the individual providing the output.

Step 403 also links pairs of task names corresponding to a dependency/deliverable pair via the computing application for integration in the task validation process of FIG. 1B. In step 404, the user verifies that the task name, give/get and to/from field values are consistent with expectations and agreements.

In step 406, the computing application executes a give/get filter to display all deliverables and dependencies that exist in a project plan. The user may also execute a major dependencies filter in step 406. In step 408, an appropriate view is automatically displayed to the user (e.g., a give/get table resulting from filtering the project tasks for give/get) and the user verifies the accuracy and completeness of the data in the view.

In step 410, the computing application executes filters to perform the following checks:

(1) for each give/get, major dependency and summary task, check for invalid milestone flag values;

(2) for each give/get and major dependency, check for invalid work values;

(3) for each major dependency, check for invalid milestone constraint types;

(4) for each give/get, check for invalid to/from values; and (5) for each major dependency and major milestone, check for invalid give/get values.

The step 410 filters associated with the checks in item (1) listed above include the Invalid Milestone flag for Give/Get, Invalid Milestone flag for Major Dependency, and Invalid Milestone flag for Summary task filters.

The Invalid Milestone flag for Give/Get filter identifies a task's milestone flag field as being invalid if the task is defined as a Give or Get and the task's milestone flag field is set to No. If the give/get field of a task is set to a non-blank value, then the corresponding milestone flag field must be set to Yes.

The Invalid Milestone flag for Major Dependency filter identifies a task's milestone flag field as being invalid if the task is defined as a Major Dependency VP and the task's milestone flag field equals No. If the milestone type field is specified as Major Dependency VP, then the corresponding milestone flag field must be set to Yes.

The Invalid Milestone flag for Summary task filter identifies a task's milestone flag field as being invalid if the task is a summary task and the summary task's milestone flag field is set to Yes. If the task is a summary task (e.g., the task's summary flag field is set to Yes), then the milestone flag field must be set to No.

The step 410 filters associated with the checks in item (2) listed above include the Invalid Work for Give/Get filter and the Invalid Work for Major Dependency VP filter.

The Invalid Work for Give/Get filter identifies a task's work field as being invalid if the task's milestone flag field is set to Yes, the task is defined as a Give or a Get, and the corresponding work field value does not equal zero. The Invalid Work for Major Dependency VP filter identifies a task's work field as invalid if the task's milestone flag field is set to Yes, the task is defined as a Major Dependency VP, and the task's work field value does not equal zero. According to predefined standards, milestones must have their associated work fields equal to zero.

The step 410 filter associated with the check in item (3) listed above is the Invalid Constraint Type for Major Dependency VP filter.

The Invalid Constraint Type for Major Dependency VP filter identifies an invalid constraint type for a task if the task is not completed, defined as a Major Dependency VP, and the task's constraint type is a value other than "Must Start On" or "Start No Earlier Than". The only valid constraint types for a Major Dependency VP are "Must Start On" and "Start No Earlier Than".

The step 410 filter associated with the check in item (4) listed above is the Invalid To/From for Give/Get filter.

The Invalid To/From for Give/Get filter identifies an invalid To/From value for a task if the task is not completed, defined as a Give or Get, and no value has been specified in the task's To/From field.

The step 410 filters associated with the checks in item (5) listed above includes Invalid Give/Get for Major Dependency VP and Invalid Give/Get for Major (VP).

The Invalid Give/Get for Major Dependency VP filter identifies an invalid Give/Get value for a task if the task is not completed, the task's milestone type is set to "Major Dependency (VP)", and the task's Give/Get field does not equal Get or External Get. The only valid values for the Give/Get field for a Major Dependency (VP) milestone are Get and External Get.

The Invalid Give/Get for Major (VP) filter identifies an invalid Give/Get value for a task if the task is not completed, the task's milestone type is set to "Major (VP)", and the task's Give/Get field includes Get or External Get. A Major (VP) milestone cannot be a Get or External Get. The valid values for the Give/Get field for a Major (VP) milestone are: Give and External Give, or the field may be blank.

The execution of the above-described filters associated with the checks (1)-(5) listed above facilitates a check of the syntax of data in the give/get table and produces one or more exception reports in step 410 if one or more errors are found.

If inquiry step 412 determines that any of the exception reports generated in step 410 includes at least one record (i.e., step 410 identifies at least one error), then the computing application automatically determines and automatically displays one or more corrective actions in step 414 that can resolve one or more errors indicated by the exception report(s). The user selects an option in step 414 to prompt the computing application to automatically apply a displayed corrective action or to bypass the displayed corrective action(s). Following step 414, the process repeats starting at step 410.

If inquiry step 412 determines that none of the exception reports generated in step 410 includes at least one record (i.e., no errors were identified in step 410), then the dependencies and deliverables validation process ends at step 416.

Corrective actions that can be performed in step 414 include:

1. If the Invalid Milestone flag for Give/Get or the Invalid Milestone flag for Major Dependency filter identifies an invalid milestone flag, then the user selects an option to set the milestone flag to Yes.

2. If the Invalid Milestone flag for Summary task filter identifies an invalid milestone flag, then the user selects an option to set the milestone flag to No.

3. If the Invalid Work for Give/Get or the Invalid Work for Major Dependency VP filter identifies an invalid work field, then user selects an option to set the work field value to zero.

4. If the Invalid Constraint Type for Major Dependency VP filter identifies an invalid constraint type, then the user selects an option to set the constraint type field to "Must Start On" or "Start No Earlier Than".

5. If the Invalid To/From for Give/Get filter identifies an invalid value in a To/From field for a task, then the user selects an option to enter in the To/From field the name of the person who is to provide the deliverable if the task is a Give, or the name of the person who is to provide the input to the task if the task is a Get.

6. If the Invalid Give/Get for Major Dependency VP identifies an invalid Give/Get value, then the user selects an option to set the Give/Get field to Get or External Get.

7. If the Invalid Give/Get for Major (VP) filter identifies an invalid Give/Get value, then the user selects an option to change the milestone type of the task to Major Dependency (VP) if the user determines that the Give/Get field is supposed to be Get or External Get. Alternatively, the user may select an option to set the Give/Get field to Give or External Give or set the milestone type field to a blank.

For example, an exception report is generated in step 410 by the Invalid To/From for Give/Get filter. The exception report includes a modifiable record having a blank To/From field for a deliverable. Since the To/From field must include the name of the person who is to provide the deliverable, this record identifies an error in the To/From field. The user corrects the error by entering the appropriate name in a modifiable To/From field in the exception report. The user re-executes the Invalid To/From for Give/Get filter. This re-execution does not generate any records on an exception report, and thereby verifies that no further problems exist relative to To/From field values for Give or Get tasks.

Validating Required Work Products

Figure 5:
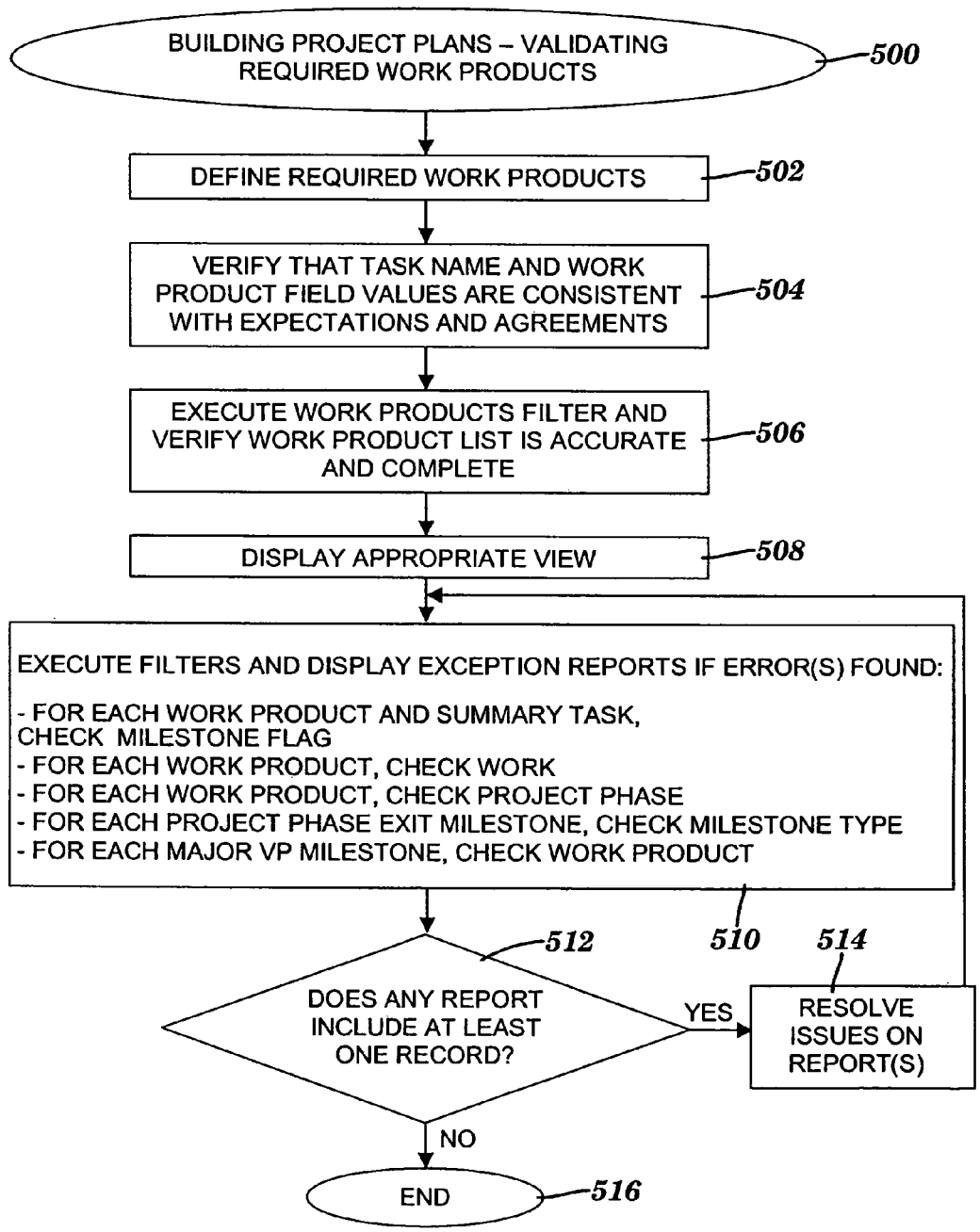
FIG. 5 is a flow chart of a process of validating required work products in the method of FIG. 1B, in accordance with embodiments of the present invention.

FIG. 5 is a flow chart of a process of validating required work products in the method of FIG. 1B, in accordance with embodiments of the present invention. The work products validated by the process of FIG. 5 are associated with a given project phase. The required work products validation process begins at step 500. In step 502, the user defines required work products by entering values in multiple fields via the computing application. These fields include, for example, task name (i.e., identifier of the required work product being defined), constraint type (e.g., "finish no later than" or "must finish on"), constraint date (i.e., interlocked date indicating the latest time in the schedule the subproject can expect to deliver the work product), required work product flag (e.g., Yes/No), required work product phase, resource name (i.e., name of person providing the output), milestone flag, (e.g., Yes/No) and work (i.e., set to "0"). In step 504, the user verifies that the task name and work product flag field values are consistent with expectations and agreements. In step 506, the computing application executes a work products filter that filters project tasks to generate a work product list where the work product flags are equal to Yes. Further, the user verifies that the work product list is accurate and complete in step 506. In step 508, a view is automatically displayed to allow the user to select filters to be executed to facilitate the required work products validation process.

In step 510, the computing application executes filters to perform the following checks:

(1) for each work product and summary task, check for invalid milestone flag values;

(2) for each work product, check for invalid work field values;

(3) for each work product, check for invalid project phase values;

(4) for each project phase exit milestone, check for invalid milestone types; and (5) for each major VP milestone, check for invalid key work product values.

The step 510 filters associated with the checks in item (1) listed above include Invalid Milestone flag for Key Work Product and Invalid Milestone flag for Summary task.

The Invalid Milestone flag for Key Work Product filter identifies a task's milestone flag as being invalid if the task is defined as a key work product and the task's milestone flag field equals No. If the key work product field is specified with a non-blank value, then the corresponding milestone flag field must be set to Yes.

The invalid values identified by the Invalid Milestone flag for Summary task filter and the associated corrective actions are described above relative to FIG. 4.

The step 510 filter associated with the check in item (2) listed above is Invalid Work for Key Work Product. The Invalid Work for Key Work Product filter identifies a task's work field value as being invalid if the task is defined as a key work product, the task's milestone flag field is set to Yes, and the task's work field does not equal zero. A work field corresponding to a milestone must be equal to zero.

The step 510 filter associated with the check in item (3) listed above is Invalid Project Phase for Key Work Product. The Invalid Project Phase for Key Work Product filter identifies a task's project phase value as being invalid if the task is defined as a key work product and no value has been specified in the task's project phase field.

The step 510 filter associated with the check in item (4) listed above is Invalid Milestone Type for Project Phase Exit. The Invalid Milestone Type for Project Phase Exit filter identifies a task's milestone type as being invalid if the task's project phase field includes a value, the task is not defined as a key work product, and the milestone type is not Major (VP). The only valid milestone type is Major (VP) if the project phase is non-blank and the task is not defined as a key work product.

The step 510 filter associated with the check in item (5) listed above is Invalid Key Work Product for Major VP. The Invalid Key Work Product for Major VP filter identifies a task's key work product field value as being invalid if the task is defined as a Major (VP) milestone but the task's key work product field includes a value (i.e., is non-blank). This combination of values is invalid because a Major (VP) milestone cannot be a key work product.

If the execution of the filters in step 510 identifies one or more errors, then the computing application also automatically generates one or more exception reports in step 510.

If inquiry step 512 determines that any of the exception reports generated in step 510 includes at least one record (i.e., step 510 identifies at least one error), then the computing application automatically determines and automatically displays one or more corrective actions in step 514 that can resolve one or more errors indicated by the exception report(s). The user selects an option in step 514 to prompt the computing application to automatically apply a displayed corrective action or to bypass the displayed corrective action(s). Following step 514, the process repeats starting at step 510.

If inquiry step 512 determines that none of the exception reports generated in step 510 includes at least one record (i.e., no errors were identified in step 510), then the required work products validation process ends at step 516.

Examples of corrective actions that are performed in step 514 include:

1. If the Invalid Milestone flag for Key Work Product filter identifies an invalid milestone flag, then the user selects an option to set the milestone flag to Yes.

2. If the Invalid Work for Key Work Product filter identifies an invalid work value, then the user selects and option to set the work field to zero.

3. If the Invalid Project Phase for Key Work Product filter identifies an invalid project phase value, then the user selects an option to enter a non-blank value in the project phase field.

4. If the Invalid Milestone Type for Project Phase Exit filter identifies an invalid milestone type for a task, then the user selects an option to enter Major (VP) in the task's milestone type field. Alternatively, if the task is intended to be a key work product, then the user leaves the milestone type field blank and selects an option to enter a valid value in the key work product field to define the task as a key work product.

5. If the Invalid Key Work Product for Major VP filter identifies an invalid key work product value, then the user selects an option to (1) set the key work product field to a blank so as not to define the task as a key work product, (2) set the milestone type field to a blank, or (3) set the milestone type field to indicate a key milestone rather than a Major (VP) milestone.

Validating Tasks in WBS

Figure 6:
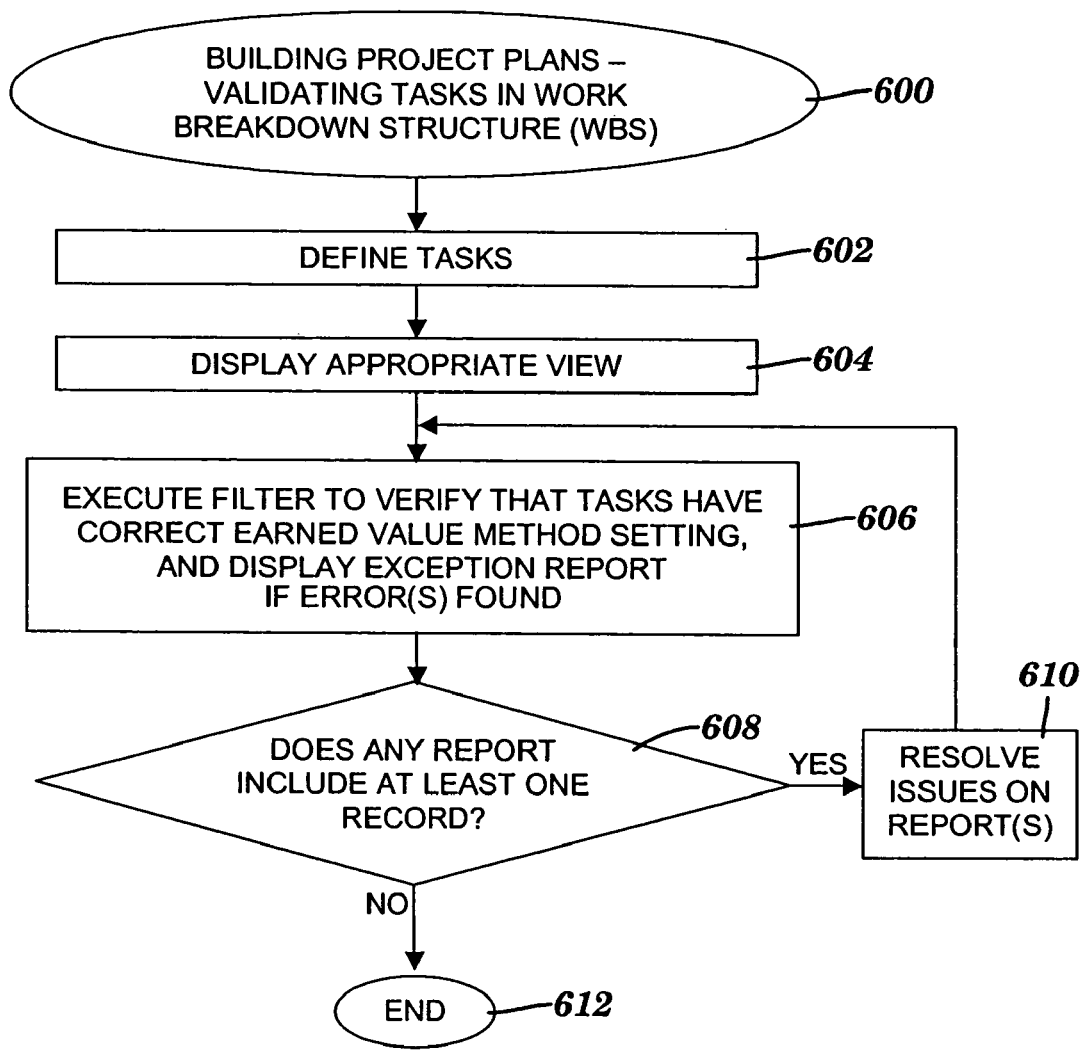
FIG. 6 is a flow chart of a process of validating tasks in a work breakdown structure in the method of FIG. 1B, in accordance with embodiments of the present invention.

FIG. 6 is a flow chart of a process of validating tasks in a work breakdown structure (WBS) in the method of FIG. 1B, in accordance with embodiments of the present invention. A WBS is a task-oriented tree of activities that organizes, defines and graphically displays the total work to be accomplished to achieve the final objectives of a project. The process for validating tasks in a WBS starts at step 600 of FIG. 6A. In step 602, the user defines tasks in a WBS. A definition of a task (i.e., task detail) in a WBS reflects the specific activities that need to be performed to support meeting milestones, deliverables and/or required work products. All planned effort is contained within the task definitions of step 602, thereby documenting the required flow of work from dependency inputs to deliverable outputs. In one embodiment, task definitions in step 602 are elaborated until they reflect a single person's effort over a one to two week period (i.e., 40 to 80 hours of effort), resulting in an objective and measurable output. In one embodiment, tasks defined in step 602 do not have constraint types and dates assigned to them as the tasks are intended to float given other project scheduling constraints (e.g. milestones, dependencies, deliverables and resource loads).

In one embodiment, the step 602 definition of a task includes entries for a resource name field, and earned value method setting field, and a work field. An entry in the resource name field indicates the name of the individual performing the task being defined in step 602. The entry for the earned value method setting is, for example, "Physical % Complete." Physical % Complete (a.k.a. Earned Value % Complete) is defined as the percentage of originally scheduled work that is actually completed. The entry for the work field is an amount of time (e.g., number of hours) of work effort that is constrained by a pre-defined range of time amounts (e.g., 40 to 80 hours of work).

In step 604, a view is automatically displayed to allow the user to select filters to facilitate the validation of tasks in WBS. In step 606, the computing application executes the Tasks with Incorrect Earned Value Method filter to verify that tasks have the correct earned value method setting.

The Tasks with Incorrect Earned Value Method filter identifies an invalid earned value method setting for a task if the task's earned value method field value is set to a value that does not indicate "Physical % Complete". For example, "% Complete" is an incorrect earned value method setting.

If the Tasks with Incorrect Earned Value Method filter identifies any incorrect earned value method settings, then the computing application also generates and displays an exception report in step 606 that include the identified errors.

If inquiry step 608 determines that the exception report generated in step 606 includes at least one record (i.e., at least one error is identified in step 606), then the computing application automatically determines and automatically displays one or more corrective actions in step 610 that can resolve one or more errors indicated by the exception report. The user selects an option in step 610 to prompt the computing application to automatically apply a displayed corrective action or to bypass the displayed corrective action(s). Following step 610, the process repeats starting at step 606.

For example, the user selects an option to apply a correction that enters "Physical % Complete" in the earned value method field. In one embodiment, the Tasks with Incorrect Earned Value Method filter identifies multiple tasks whose earned value method settings are incorrect, and a user can select a single option (e.g., Apply to All) that applies the same correction to the multiple tasks.

If inquiry step 608 determines that the exception reports generated in step 606 include no records (i.e., no errors were identified in step 606), then the WBS task validation process ends at step 612.

Validating Predecessors and Successors

Figure 7:
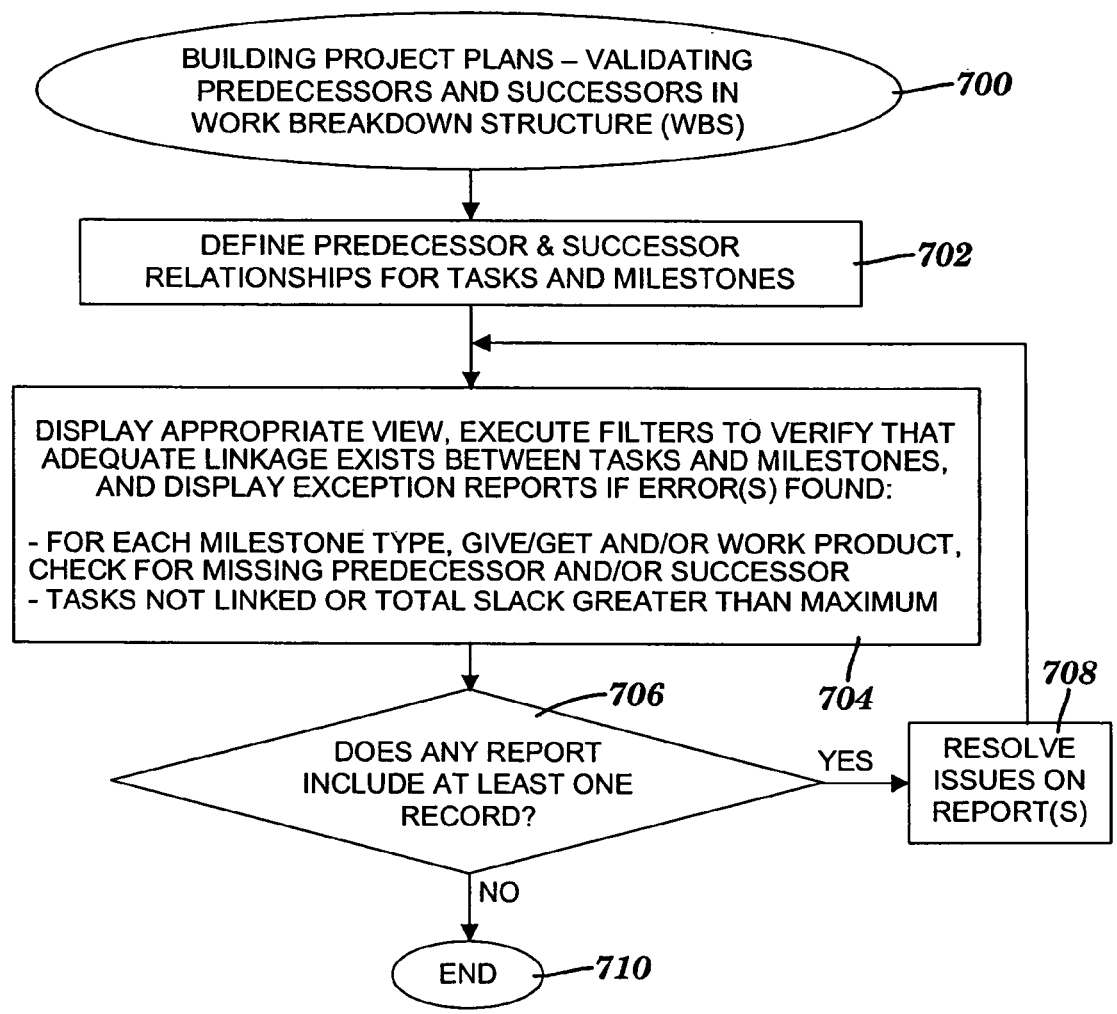
FIG. 7 is a flow chart of a process of validating predecessor tasks and successor tasks in a work breakdown structure in the method of FIG. 1B, in accordance with embodiments of the present invention.

FIG. 7 is a flow chart of a process of validating predecessor tasks and successor tasks in a work breakdown structure in the method of FIG. 1B, in accordance with embodiments of the present invention. The predecessor/successor validation process begins at step 700. In step 702, the user defines predecessor and/or successor relationships for tasks and milestones of the project being managed. The definitions of the predecessor and successor relationships create links between tasks, between milestones, and between tasks and milestones throughout the entire project plan to provide a contiguous flow of work activities. A definition of a predecessor of a given task includes an identifier for the task or tasks whose completion immediately precedes the start of the given task. A definition of a successor of a given task includes an identifier of the task or tasks whose start immediately follows completion of the given task.

In step 704, a view is automatically displayed by the computing application. The view allows the user to initiate the execution of filters that validate the predecessor/successor linkages. In step 704, the computing application also executes filters to perform the following checks:

(1) for each milestone type, Give/Get and/or work product, check for a missing predecessor and/or successor;

(2) check for tasks that are not linked; and (3) check for a total slack that exceeds a limit.

The step 704 filters associated with the checks in item (1) listed above are presented below:

(a) Major VP missing predecessor
(b) Major VP missing successor
(c) Key milestone missing predecessor
(d) Key milestone missing successor
(e) Give missing external successor
(f) Give missing predecessor
(g) Get missing external predecessor
(h) Get missing successor
(i) Key work product missing predecessor
(j) Key work product missing successor The Major VP missing predecessor filter identifies a missing predecessor for a Major VP milestone task within a project plan if the task is not completed, the task is defined as a Major VP milestone, and no predecessor link from another task within the project plan is specified. A Major (VP) milestone must have a predecessor task linked to it.

The Major VP missing successor filter identifies a missing successor for a Major VP milestone task within a project plan if the task is not completed, the task is defined as a Major (VP) milestone, and no successor link to another task within the project plan is specified. A Major (VP) milestone must have a successor task linked to it.

The Key milestone missing predecessor filter identifies a missing predecessor for a key milestone task within a project plan if the task is not completed, the task is defined as a key milestone, and no predecessor link from another task within the project plan is specified. A key milestone requires that a predecessor task be linked to it.

The Key milestone missing successor filter identifies a missing successor for a key milestone task within a project plan if the task is not completed, the task is defined as a key milestone, and no successor link to another task within the project plan is specified. A key milestone requires that a successor task be linked to it.

The Give missing external successor filter identifies a missing external successor for a Give task within a project plan if the task is not completed, the task is defined as a Give task, and no successor link to a task within another project plan is specified. A Give task requires that a successor task be linked to it.

The Give missing predecessor filter identifies a missing predecessor for a Give task within a project plan if the task is not completed, the task is defined as a Give task, and no predecessor link from another task within the project plan is specified. A Give task requires that a predecessor task be linked to it.

The Get missing external predecessor filter identifies a missing external predecessor for a Get task within a project plan if the task is not completed, the task is defined as a Get task, and no predecessor link to a task within another project plan is specified. A Get task requires that a predecessor task be linked to it.

The Get missing successor filter identifies a missing successor for a Get task within a project plan if the task is not completed, the task is defined as a Get task, and no successor link from another task within the project plan is specified. A Get task requires that a successor task be linked to it.

The Key work product missing predecessor filter identifies a missing predecessor for a key work product task within a project plan if the task is defined as a key work product and no predecessor link from another task within the project plan is specified. A key work product requires that a predecessor task be linked to it.

The Key work product missing successor filter identifies a missing successor for a key work product task within a project plan if the task is defined as a key work product and no successor link to another task within the project plan or within another project plan is specified. A key work product requires that a successor task be linked to it.

The step 704 filters associated with the checks in item (2) listed above include the Task missing predecessor filter and the Task missing successor filter.

The Task missing predecessor filter identifies a missing predecessor for a task if the task is not completed, the task is not defined as a milestone, and no predecessor link to the task is specified. This type of missing predecessor may adversely affect schedule execution, cause an abnormal amount of Slack to be present in the project plan, and result in a poorly defined critical path.

The Task missing successor filter identifies a missing successor for a task if the task is not completed, the task is not defined as a milestone, and no successor link to the task is specified. This type of missing successor may adversely affect schedule execution, cause an abnormal amount of Slack to be present in the project plan, and result in a poorly defined critical path.

The step 704 filter associated with the check in item (3) listed above is the Total slack exceeds limit filter. The Total slack exceeds limit filter identifies that a task's total slack exceeds a limit if the task is not completed and the total slack field value is greater than a user-specified limit (e.g., greater than 80 hours (10 days)). Excessive slack is a leading cause of failures in project execution and also results in a poorly defined critical path.

If the execution of the filters in step 704 identifies one or more errors, then the computing application also automatically generates one or more exception reports in step 704.

If inquiry step 706 determines that any of the exception reports generated in step 704 includes at least one record (i.e., at least one error is identified in step 704), then the user identifies and implements one or more corrective actions in step 708 to resolve one or more errors indicated by the exception report(s) generated in step 704.

If inquiry step 706 determines that no errors are identified in exception reports of step 704, then the predecessor/successor validation process ends at step 710.

Examples of corrective actions performed by the user in step 708 via interactive fields in an exception report generated in step 704 include:

(1) If the Major VP missing predecessor filter identifies a missing predecessor for a Major (VP) milestone, the user reviews the task detail and identifies the task whose completion indicates that the Major (VP) milestone is reached. The user selects an option to set the predecessor of the Major (VP) milestone to the identified task.

(2) If the Major VP missing successor filter identifies a missing successor, the user reviews the task detail and identifies the task or set of tasks that begins in response to the Major (VP) milestone being reached. The user selects an option to set the successor of the Major (VP) milestone to the identified task or set of tasks.

(3) If the Key milestone missing predecessor filter identifies a missing predecessor for a key milestone, the user reviews the task detail and identifies the task whose completion indicates that the key milestone is reached. The user selects an option to set the predecessor of the key milestone to the identified task.

(4) If the Key milestone missing successor filter identifies a missing successor for a key milestone, the user reviews the task detail and identifies the task or set of tasks that begins in response to the key milestone being reached. The user selects an option to set the successor of the key milestone to the identified task.

(5) If the Give missing external successor filter identifies a missing external successor, the user identifies the project plan receiving the deliverable from the Give. The user selects an option to set the external successor to the identified project plan.

(6) If the Give missing predecessor filter identifies a missing predecessor for a Give, the user reviews the task detail and identifies the task whose completion indicates that the Give can be delivered. The user selects an option to set the predecessor of the Give to the identified task.

(7) If the Get missing external predecessor filter identifies a missing external predecessor for a Get, then the user identifies the project plan providing the deliverable. The user selects an option to set the external predecessor of the Get to the identified project plan.

(8) If the Get missing successor filter identifies a missing successor for a Get task, then the user reviews the task detail and identifies the task(s) receiving the Get. The user selects an option to set the successor of the Get to the identified task(s).

(9) If the Key work product missing predecessor filter identifies a missing predecessor for a key work product, then the user reviews the task detail and identifies the task whose completion indicates that the key work product can be delivered. The user selects an option to set the predecessor of the key work product to the identified task.

(10) If the Key work product missing successor filter identifies a missing successor for a key work product, then the user identifies the project plan receiving the key work product and/or the subsequent task to be executed. The user selects an option to set the successor of the key work product to the identified project plan or subsequent task.

(11) If the Task missing predecessor filter identifies a missing predecessor, then the user reviews the task detail and identifies the predecessor task whose completion indicates that the task is to be executed. The user selects an option to assign the predecessor task link to the task as appropriate.

(12) If the Task missing successor filter identifies a missing successor, then the user reviews the task detail and identifies the successor task that begins in response to the completion of the task's execution. The user selects an option assign the appropriate successor task link to the task.

(13) If the Total slack exceeds limit filter identifies a total slack that exceeds the user-specified limit, then the user reviews the slack and adds or modifies predecessor and/or successor links to reduce the total slack. Removing all slack is not the user's goal; instead, the user reviews the total slack to confirm that the slack is reasonable and acceptable. It should be noted a corrective action is also taken by the user if the slack is a negative number. A negative slack value indicates an attempt to compete actions before those actions can be done.

For example, the Total slack exceeds limit filter is executed in step 704. In response to a prompt, the user inputs 8 days as the maximum slack value. An exception report is generated that includes a milestone task 7 and a non-milestone task 12 that is missing a value in its predecessor field. The user identifies task 7 as the predecessor of task 12 and links task 7 and task 12 together so that task 7's successor field indicates task 12 and task 12's predecessor field indicates task 7. This linking is initiated by the user in step 708 via the exception report (e.g., highlighting task 7 and task 12 and activating a link button on the exception report).

In this example, the Total slack exceeds limit filter is re-executed in step 704 to generate another exception report that still includes task 7 and task 12. Task 7 is not on this exception report due to a predecessor or successor linking problem because a separate filter already identified such linking problems related to milestones. Thus, the user recognizes that task 7 and task 12 are on this report because of their slack being greater than 8 days. The user reviews the constraint type of task 13, which is the successor to task 12 and finds that task 13 is a non-milestone task that has a constraint type of "start no earlier than." The user changes the constraint type for task 13 to "as soon as possible" in step 708. The Total slack exceeds limit filter is re-executed and no further errors are indicated by an exception report.

If the constraint type of task 13 in the above example had already been "as soon as possible," the user checks for slack by reviewing the start date of task 13 to determine if an unnecessary start date had been applied to the task. Alternatively, if task 13 had been a milestone with a valid constraint type, then the user could not change the constraint type to "as soon as possible." In that case, the user checks if task 12 should have a different successor task that needs to be completed prior to the milestone task 13.

Validating Resources, Work and Labor Rates

Figure 8A:
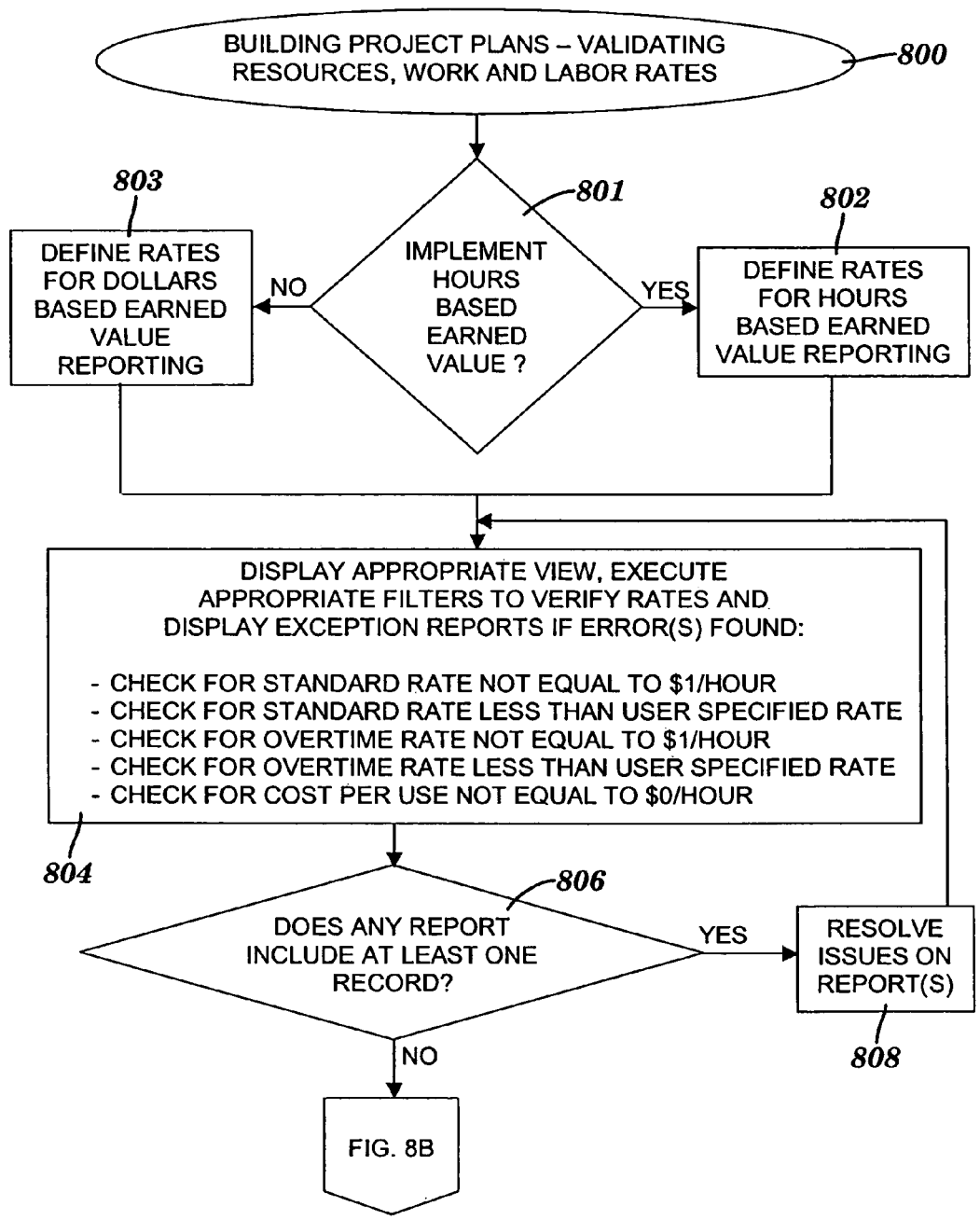
FIGS. 8A-8B depict a flow chart of a process of validating resources, work and labor rates in the method of FIG. 1B, in accordance with embodiments of the present invention.
Figure 8B:
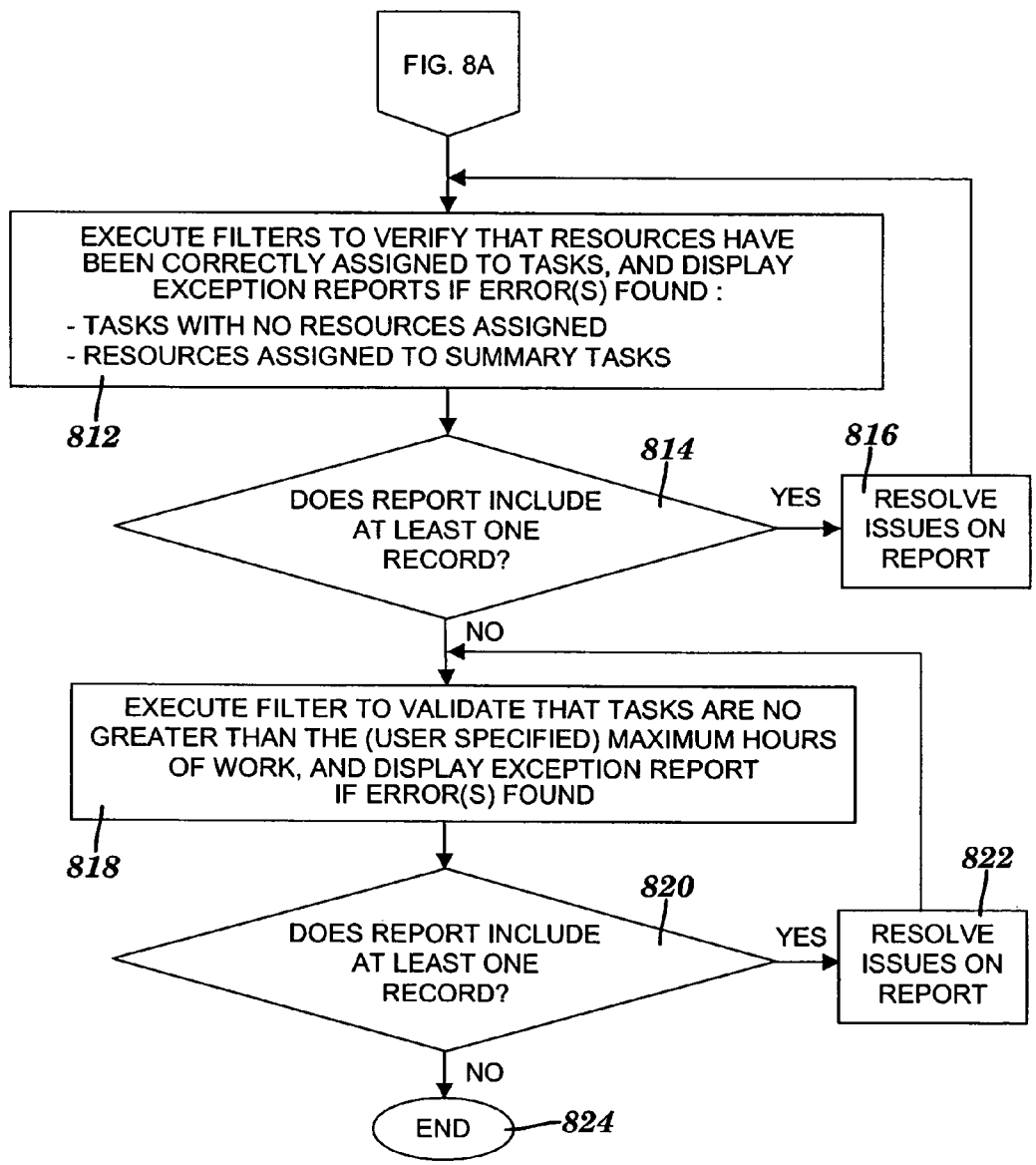

FIGS. 8A-8B depict a flow chart of a process of validating resources, work and labor rates in the method of FIG. 1B, in accordance with embodiments of the present invention. As used herein, a labor rate is associated with personnel required to perform one or more tasks of a project. The validation of resources, work and labor rates starts at step 800. If inquiry step 801 determines that the project being managed is implementing hours based earned value reporting, then the user defines, in step 802, a labor rate for each resource as one monetary unit per unit of time (e.g., $1/hour). In one implementation, the $1/hour rate is a default rate for all resources. Accepting the default rate advantageously provides for reporting of the schedule performance index and the cost performance index. The schedule performance index is based only on the ratio of budgeted hours of work performed divided by hours scheduled and the cost performance index is the ratio of budgeted hours of work performed to actual hours worked. Hereinafter, for simplicity, $1/hour is used to refer to the labor rate defined or capable of being defined in step 802, but it will be understood that any value of one monetary unit per unit of time can be substituted for $1/hour.

If inquiry step 801 determines that hours based earned value reporting is not implemented, then the user defines in step 803 a labor rate for each resource consistent with dollars based earned value reporting. Step 804 follows both step 802 and step 803.

In step 804, a view is automatically displayed by the computing application. The view allows the user to initiate execution of filters that validate labor rates. In step 804, the computing application executes the appropriate filters to perform checks (1), (3) and (5) listed below if step 804 follows step 802 or checks (2), (4) and (5) listed below if step 804 follows step 801:

(1) check if the standard labor rate does not equal $1/hour;
(2) check if the standard labor rate is less than a user-specified rate;
(3) check if the overtime labor rate does not equal $1/hour;
(4) check if the overtime labor rate is less than a user-specified rate; and
(5) check if the cost per use does not equal $0.

As used herein, cost per use refers to resources that charge a flat fee (i.e., no hourly labor rate is applied when cost per use is utilized). The step 804 filters associated with the checks in items (1)-(5) listed above are:

(a) Standard Rate does not equal $1/hour filter;
(b) Standard Rate is less than [user_value]/hour;
(c) Overtime Rate does not equal $1/hour;
(d) Overtime Rate is less than [user_value]/hour; and
(e) Cost Per Use does not equal $0/hour, respectively.

The Standard Rate does not equal $1/hour filter identifies a resource whose standard rate is set to a value other than $1/hour. $1/hour is the expected standard rate when Hours Based Earned Value reporting is being utilized.

The Overtime Rate does not equal $1/hour filter identifies a resource whose overtime rate is set to a value other than $1/hour. $1/hour is the expected overtime rate when Hours Based Earned Value reporting is being utilized.

The Cost Per Use does not equal $0/hour filter identifies a Cost Per Use field value that is not equal to zero. Zero is the only valid value for the Cost Per Use field.

If the execution of the filters in step 804 identifies one or more errors, then the computing application also automatically generates and displays one or more exception reports in step 804.

If inquiry step 806 determines that the exception reports generated in step 804 include at least one record (i.e., at least one error is identified in step 804), then the computing application automatically determines and displays one or more corrective actions in step 808 that can resolve one or more errors indicated by the exception report(s). The user selects an option in step 808 to prompt the computing application to automatically apply a displayed corrective action or to bypass the displayed corrective action(s). Following step 808, the process repeats starting at step 804.

If inquiry step 806 determines that no errors are identified in exception reports of step 804, then the validation process continues in FIG. 8B.

Examples of corrective actions performed in step 808 are presented below:

1. If the Standard Rate does not equal $1/hour filter identifies an invalid standard rate, the user confirms that Hours Based Earned Value reporting is in place and selects an option to set the standard rate field to $1.00.

2. If the Overtime Rate does not equal $1/hour filter identifies an invalid overtime rate, the user confirms that Hours Based Earned Value reporting is in place and selects an option to set the overtime rate field to $1.00.

3. If the Cost Per Use does not equal $0/hour filter identifies an invalid Cost Per Use value, the user selects an option to set a Cost Per Use field to $0.00.

In step 812 of FIG. 8B, the computing application executes filters to perform the following checks related to resources:

(1) check if no resource is assigned to a task; and
(2) check if any resources are assigned to a summary task.

The step 812 filters associated with the checks in items (1) and (2) listed above are: the Task with No Resources Assigned filter and the Resources Assigned to Summary Tasks filter, respectively.

The Task with No Resources Assigned filter identifies an invalid task if the task is not defined as a milestone or a summary task and the field that specifies resource names assigned to the task is blank.

The Resources Assigned to Summary Tasks filter identifies an invalid summary task if a task is defined as a Summary task and a non-blank value is in the field that specifies resource names for the summary task. Summary tasks with Resources assigned to them are invalid.

If the execution of the filters in step 812 identifies one or more errors, then the computing application automatically generates and displays one or more exception reports in step 812.

If inquiry step 814 determines that the exception reports generated in step 812 include at least one record (i.e., at least one error is identified in step 812), then the computing application automatically determines and automatically displays one or more corrective actions in step 816 that can resolve one or more errors indicated by the exception report(s). The user selects an option in step 816 to prompt the computing application to automatically apply a displayed corrective action or to bypass the displayed corrective action(s). Following step 816, the process repeats starting at step 812.

If inquiry step 814 determines that no errors are identified in exception reports of step 812, then the validation process continues with step 818, which is described below.

Examples of corrective actions performed in step 816 include:

(1) If Task with No Resources Assigned filter identifies an invalid task, then the user selects an option to enter the appropriate resource name in the resource name field.

(2) If the Resources Assigned to Summary Tasks filter identifies an invalid summary task, then the user selects an option to delete the resource names in the resource name field associated with the summary task, leaving the resource name field blank.

In step 818, the computing application executes filters to perform the following checks related to work:

(1) check for tasks with work in an e2e integrated plan (not shown in FIG. 8B); and (2) check for tasks with work greater than a user-specified value.

The step 818 filters associated with the checks in items (1) and (2) listed above are: the Tasks with Work in E2E Integrated Plan filter and the Tasks with Work Greater Than [user value] Days filter, respectively.

The Tasks with Work in E2E Integrated Plan filter identifies an invalid task if the task if a task is not completed, the task is not a milestone or a summary task, the task's work field value is non-zero and the task is defined in an e2e integrated plan.

The Tasks with Work Greater Than [user value] Days filter identifies an invalid task if the task is not completed, the task's work field value is greater than a user-specified amount of time (e.g., 10 days).

If the execution of the filters in step 818 identifies one or more errors, then the computing application automatically generates and displays one or more exception reports in step 818.

If inquiry step 820 determines that the exception reports generated in step 818 include at least one record (i.e., at least one error is identified in step 818), then the user identifies and implements one or more corrective actions in step 822 to resolve one or more errors indicated by the exception reports generated in step 818. Following step 822, the process repeats starting at step 818.

If inquiry step 820 determines that no errors are identified in exception reports of step 818, then the validation process ends at step 824.

Examples of corrective actions performed by the user in step 822 via interactive fields in an exception report generated in step 818 include:

(1) If the Tasks with Work in E2E Integrated Plan filter identifies an invalid task, then the user removes the task from the e2e integrated plan and places the task in a separate subproject. Alternatively, the user selects an option to reduce the work value associated with the task to zero.

(2) If the Tasks with Work Greater Than [user value] Days filter identifies an invalid task, the task is broken down into tasks that each reflect a single person's effort over a one to two week period (40 to 80 hours effort) that results in an objective and measurable output.

Integrating Project Plans

Figure 9:
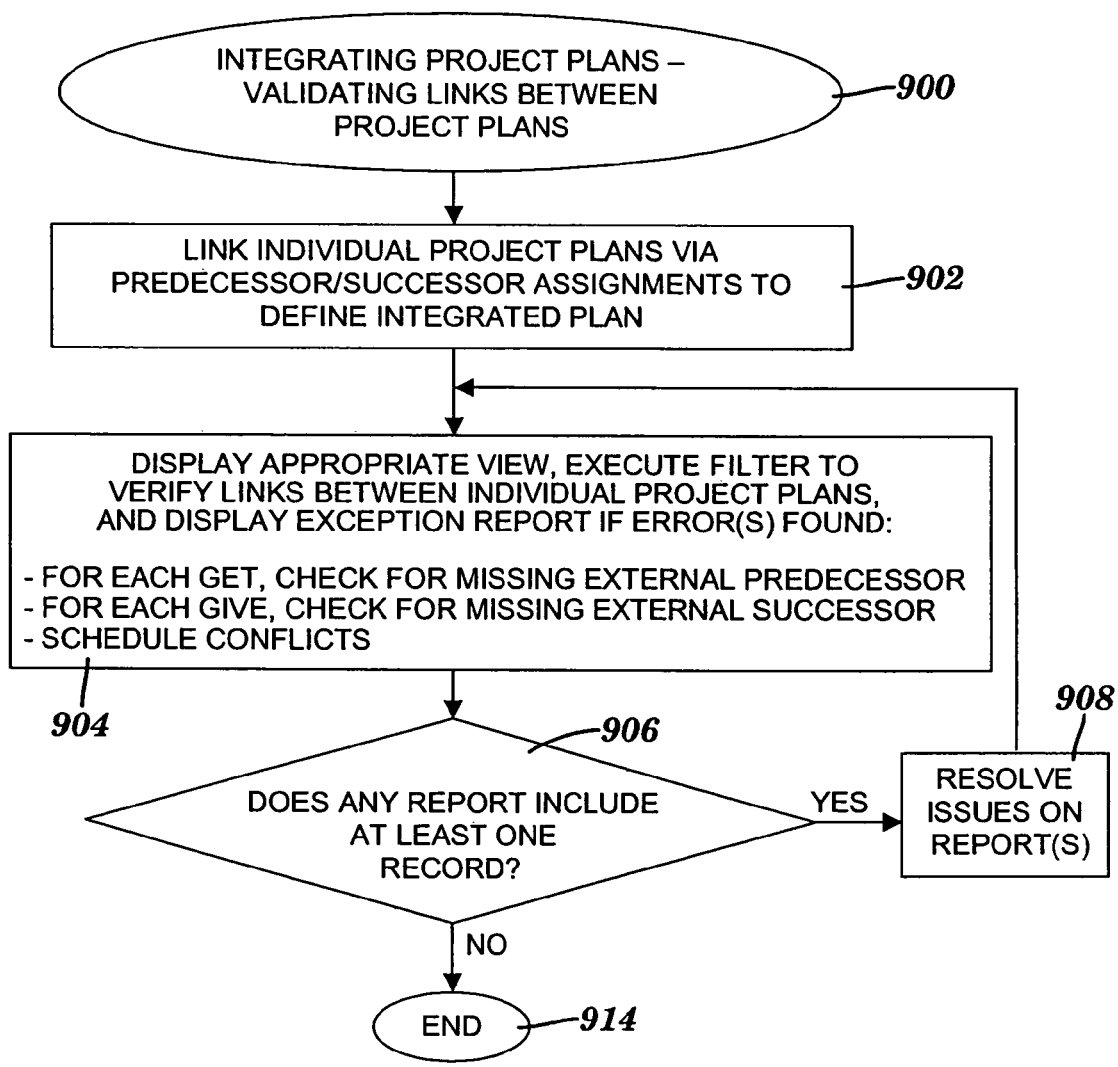
FIG. 9 is a flow chart of a process of validating links between project plans in the method of FIG. 1B, in accordance with embodiments of the present invention.

FIG. 9 is a flow chart of a process of validating links between project plans in the method of FIG. 1B, in accordance with embodiments of the present invention. The link validation process of FIG. 9 starts at step 900. In step 902, the user links individual subproject plans via predecessor and successor assignments. The linking in step 902 defines a seamless e2e integrated plan for the entire project.

In step 904, a view is automatically displayed to allow the user to initiate execution of filters and/or macros that facilitate the validation of links between project plans. In step 904, the computing application executes filters and/or macros to perform the following checks:

(1) for each Get task, check for a missing external predecessor;

(2) for each Give task, check for a missing external successor; and (3) check for schedule conflicts.

The step 904 filters associated with the checks in items (1) and (2) listed above are the Get missing external predecessor filter and the Give missing external successor filter, respectively. Both of these filters, along with their associated exception reports and corrective actions are described above relative to FIG. 7. The check for a schedule conflict in step 904 is described below relative to the flow chart depicted in FIGS. 12B-12C. Corrective actions for schedule conflicts are described below relative to FIG. 12E.

If the execution of the filters and/or macros in step 904 identifies one or more errors or schedule conflicts, then the computing application automatically generates and displays one or more exception reports in step 904.

If inquiry step 906 determines that any exception report generated in step 904 includes at least one record (i.e., at least one error or schedule conflict is identified in step 904), then the computing application automatically determines and automatically displays one or more corrective actions in step 908 that can resolve one or more errors indicated by the exception report(s). The user selects an option in step 908 to prompt the computing application to automatically apply a displayed corrective action or to bypass the displayed corrective action(s). Following step 908, the process repeats starting at step 904.

If inquiry step 906 determines that no exception report records are generated in step 904 (i.e., no errors or conflicts are identified in step 904), then the process ends at step 914.

Baselining Project Plans

Figure 10:
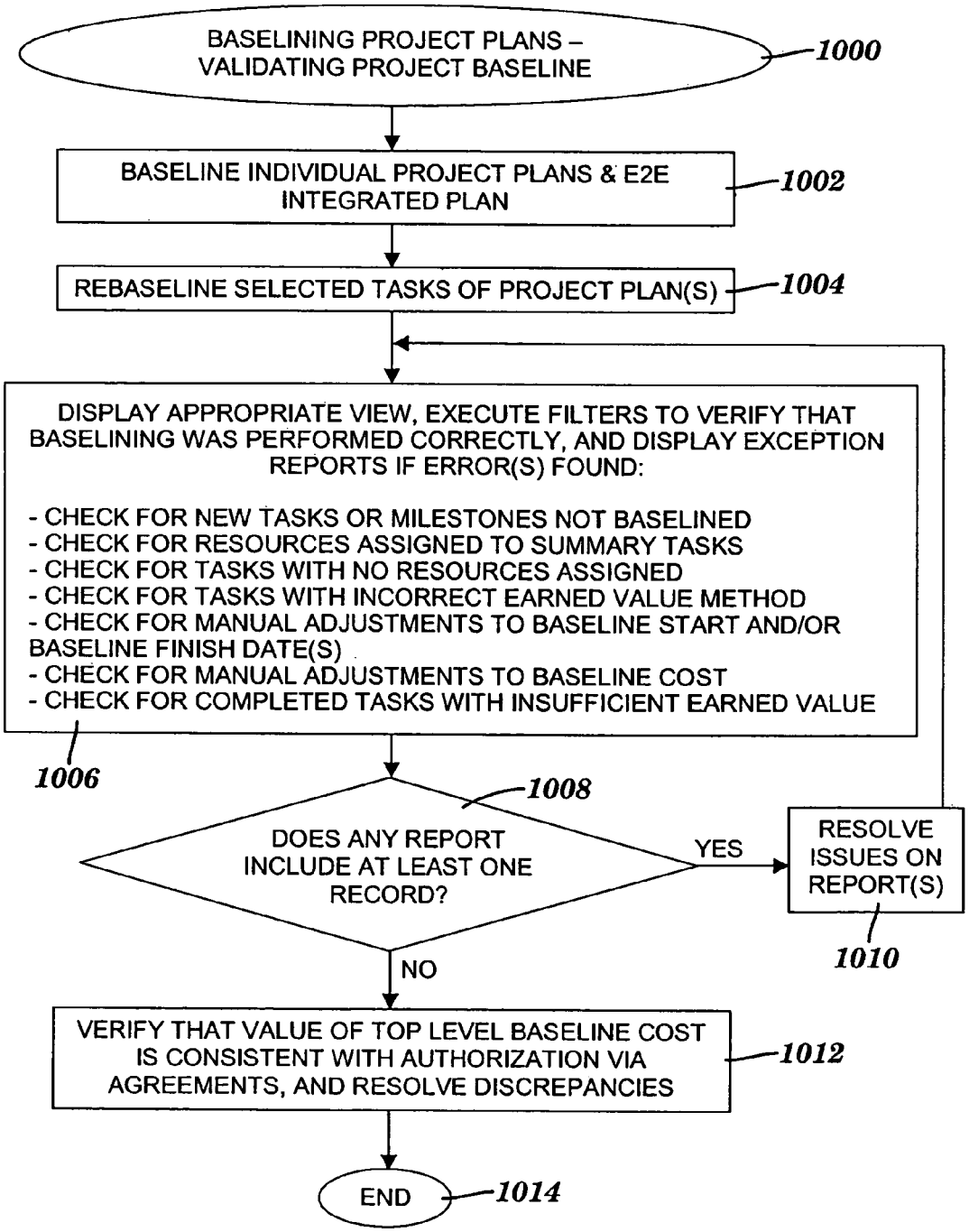
FIG. 10 is a flow chart of a process of validating a project baseline in the method of FIG. 1B, in accordance with embodiments of the present invention.

FIG. 10 is a flow chart of a process of validating a project baseline in the method of FIG. 1B, in accordance with embodiments of the present invention. The project baseline validation process starts at step 1000. In step 1002, the user baselines individual subproject plans and the e2e integrated plan. Due to change requests, project replanning and/or task detailing, the user rebaselines selected tasks in a selected project plan in step 1004.

In step 1006, a view is automatically displayed to allow the user to initiate execution of filters that facilitate the validation of a project baseline. In step 1006, the computing application executes filters to perform the following checks:

(1) check for new tasks or milestones that are not baselined;

(2) check for resources assigned to summary tasks;

(3) check for tasks with no resources assigned;

(4) check for tasks with an incorrect value in the earned value method field;

(5) check for tasks with missing baseline information (not shown in FIG. 10);

(6) check for manual adjustments to baseline start and/or baseline finish date(s);

(7) check for manual adjustments to baseline cost; and (8) check for completed tasks with an insufficient Earned Value (BCWP).

The step 1006 filter associated with the check in item (1) listed above is the New Tasks or Milestones not Baselined filter.

The New Tasks or Milestones not Baselined filter identifies a new task or milestone that was not baselined if the task or milestone is not an external task and one of the following sets of conditions applies: (1) the Baseline Start value is a default value associated with a new task (e.g., "NA"), (2) the Baseline Finish value is a default value associated with a new task (e.g., "NA"), or (3) the Baseline Cost (rollup) value is zero and the Baseline Work value is greater than 1.

The step 1006 filter associated with the check in item (2) listed above is the Resources Assigned to Summary Tasks filter. The functionality of the Resources Assigned to Summary Tasks filter, along with its associated exception report and corrective actions are described above relative to FIG. 8B.

The step 1006 filter associated with the check in item (3) above is the Tasks with No Resources Assigned filter. The functionality of the Tasks with No Resources Assigned filter, along with its associated exception report and corrective actions are described above relative to FIG. 8B.

The step 1006 filter associated with the check in item (4) listed above is the Tasks with Incorrect Earned Value Method filter. The functionality of the Tasks with Incorrect Earned Value Method filter is described above relative to FIG. 6.

The step 1006 filter associated with the check in item (5) listed above is the Tasks Missing Baseline Information. The Tasks Missing Baseline Information filter identifies missing baseline information based on a manual entry of baseline start and/or finish fields rather than performing a baseline function native to the project management application (e.g., Microsoft® Project). In one embodiment, the manual entry of baseline start is indicated if a field for an original baseline start includes a predetermined baseline start default value and a field for a baseline start (rollup) does not include the predetermined baseline start default value. Similarly, the manual entry of baseline finish is indicated if a field for an original baseline finish includes a predetermined baseline finish default value and a field for a baseline finish (rollup) does not include the predetermined baseline finish default value.

The step 1006 filters associated with the checks in item (6) above are the Baseline Start Mismatches filter and the Baseline Finish Mismatches filter. The Baseline Start Mismatches filter identifies a baseline start date mismatch if the value in the baseline start date field has been updated manually. The Baseline Finish Mismatches filter identifies a baseline finish date mismatch if the value in the baseline finish date field has been updated manually.

The step 1006 filters associated with the check in item (7) above are (1) the BCWS−BAC<0 filter which identifies invalid manual increases of the baseline cost based on the value of BCWS−BAC being less than zero and (2) the BCWS−BAC>0 filter, which identifies invalid manual reductions of the baseline cost based on the value BCWS−BAC being greater than zero.

The step 1006 filter associated with the check in item (8) listed above is the Completed Tasks with insufficient EV filter, which identifies an Earned Value (i.e., BCWP) that is not equal to BAC for a completed task. This error condition occurs, for example, as a result of marking tasks as complete within an e2e integrated plan managed by Microsoft® Project when the status dates within the subproject and the e2e integrated plan do not match. In one embodiment, the user corrects the error identified in step 1432 by setting the Physical % Complete field to 0%, and then setting the same field back to 100% and performing a Calculate Project function native to Microsoft® Project.

If the execution of the filters in step 1006 identifies one or more errors, then the computing application automatically generates and displays one or more exception reports in step 1006.

If inquiry step 1008 determines that any of the exception reports generated in step 1006 include at least one record (i.e., at least one error is identified in step 1006), then the computing application automatically determines and automatically displays one or more corrective actions in step 1010 that can resolve one or more errors indicated by the exception report(s). The user selects an option in step 1010 to prompt the computing application to automatically apply a displayed corrective action or to bypass the displayed corrective action(s). Following step 1010, the process repeats starting at step 1006.

If inquiry step 1008 determines that no exception report records are generated in step 1006 (i.e., no errors are identified in step 1006), then in step 1012, the user visually inspects the top level baseline cost and verifies that its value is consistent with what has been authorized via contractual agreements. The user resolves any discrepancies by making appropriate changes to the project plan and/or the contracts. The project baseline validation process ends at step 1014.

Examples of corrective actions that are performed in step 1010 include:

1. If the New Tasks or Milestones not Baselined filter identifies a new task or milestone that should be baselined, then the user selects a "New Value" option to baseline the single task or milestone. The Start and Finish dates for the task or milestone become the Baseline Start and Baseline Finish. The computing application utilizes a native function of the project management software (e.g., Microsoft® Project) to baseline the entire plan. The computing application utilizes a native function (e.g., "Task and Milestone Baseline") to baseline the individual task or milestone.

2. If the Baseline Start Mismatches filter identifies a mismatch, then the user, via the computing application, restores the original Baseline Start date. If the original Baseline Start date is less than the project start date, the user selects an option to set the Baseline Start to the project start date. The computing application moves the original Baseline Start date to the Baseline Start field.

3. If the Baseline Finish Mismatches filter identifies a mismatch, then the user, via the computing application, restores the original Baseline Finish date. If the original Baseline Finish date is less than the project finish date, the user selects an option to set the Baseline Finish to the project finish date. The computing application moves the original Baseline Finish date to the Baseline Finish field.

Updating Project Plans

Figure 11:
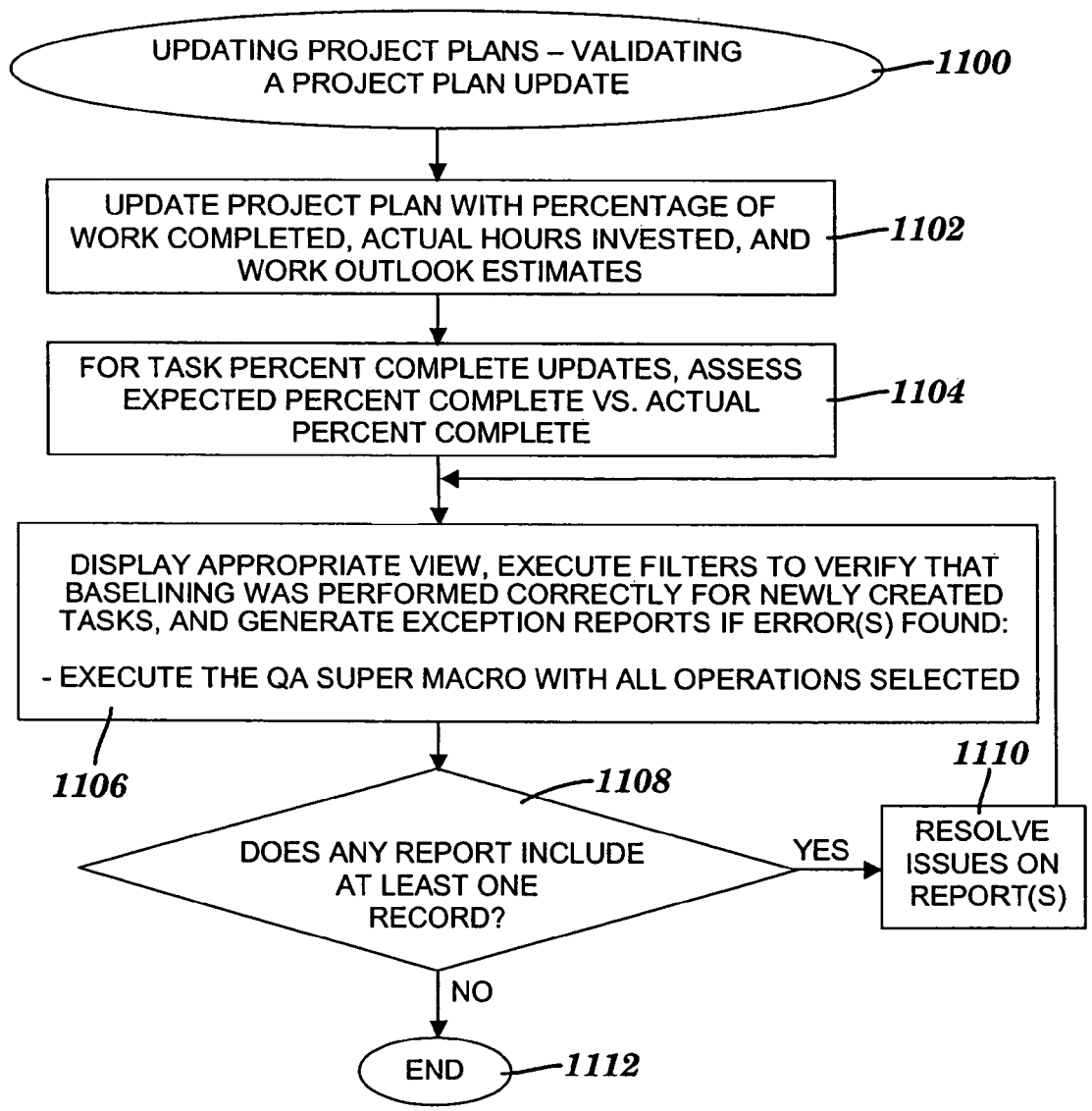
FIG. 11 is a flow chart of a process of validating a project plan update in the method of FIG. 1B, in accordance with embodiments of the present invention.

FIG. 11 is a flow chart of a process of validating a project plan update in the method of FIG. 1B, in accordance with embodiments of the present invention. The project plan update validation process starts at step 1100. In step 1102, the user updates a project plan with the percentage of originally scheduled work that is actually completed (a.k.a. percentage of work completed), actual hours of work expended against a given task to date, and an estimate of the cumulative work needed to complete the task, independent of the work originally planned. For task percent complete updates, the computing application assesses the expected percentage completed for a given task vs. the actual percentage completed for the given task in step 1104 and identifies errors relative to the expected and actual percent complete. The identified errors in step 1104 are corrected by the user utilizing the computing application.

In step 1106, a view is automatically displayed by the computing application. The view allows the user to initiate the execution of filters to verify that baselining was performed correctly for newly created tasks and verify the quality of the project plan. The filters are executed via an execution of a QA super macro with all QA operations selected, which is described below relative to FIGS. 13A-13F. If the execution of the super macro identifies any errors, then the computing application automatically generates and displays one or more exception reports in step 1106. An error identified by the super macro is identified via a filter or macro that is included in one of the selected QA operations and described above relative to FIGS. 3A-10 or below relative to FIGS. 12A-12F and FIGS. 14A-14B.

If inquiry step 1108 determines that any of the exception reports generated in step 1106 includes at least one record (i.e., at least one error is identified in step 1106), then one or more corrective actions are identified and performed in step 1110 to resolve one or more errors indicated by the exception report(s) generated in step 1106. The manner in which a corrective action of step 1110 is identified and performed depends on the specific error being corrected. For example, if the error being corrected is identified by a filter described above relative to one of FIGS. 3A-6, the missing predecessor/successor checks of step 704 (see FIG. 7), step 804 (see FIG. 8A), step 812 (see FIG. 8B), and FIGS. 9-10, or described below relative to FIG. 14A or FIG. 14B, then the computing application automatically displays the corrective action in step 1110 that can resolve the error, and the user selects an option in step 1110 to prompt the computing application to automatically apply the displayed corrective action or to bypass the displayed corrective action. As another example, if the error being corrected is identified by a filter or macro described above relative to the tasks not linked check or the total slack greater than a maximum check of step 704 (see FIG. 7), or described below relative to one of FIGS. 12B-12D, then the user identifies and implements the corrective action. Following step 1110, the process repeats starting at step 1106.

If inquiry step 1108 determines that no exception report records are generated in step 1106 (i.e., no errors are identified in step 1106), then the process ends at step 1112.

Schedule Conflicts

Figure 12A:
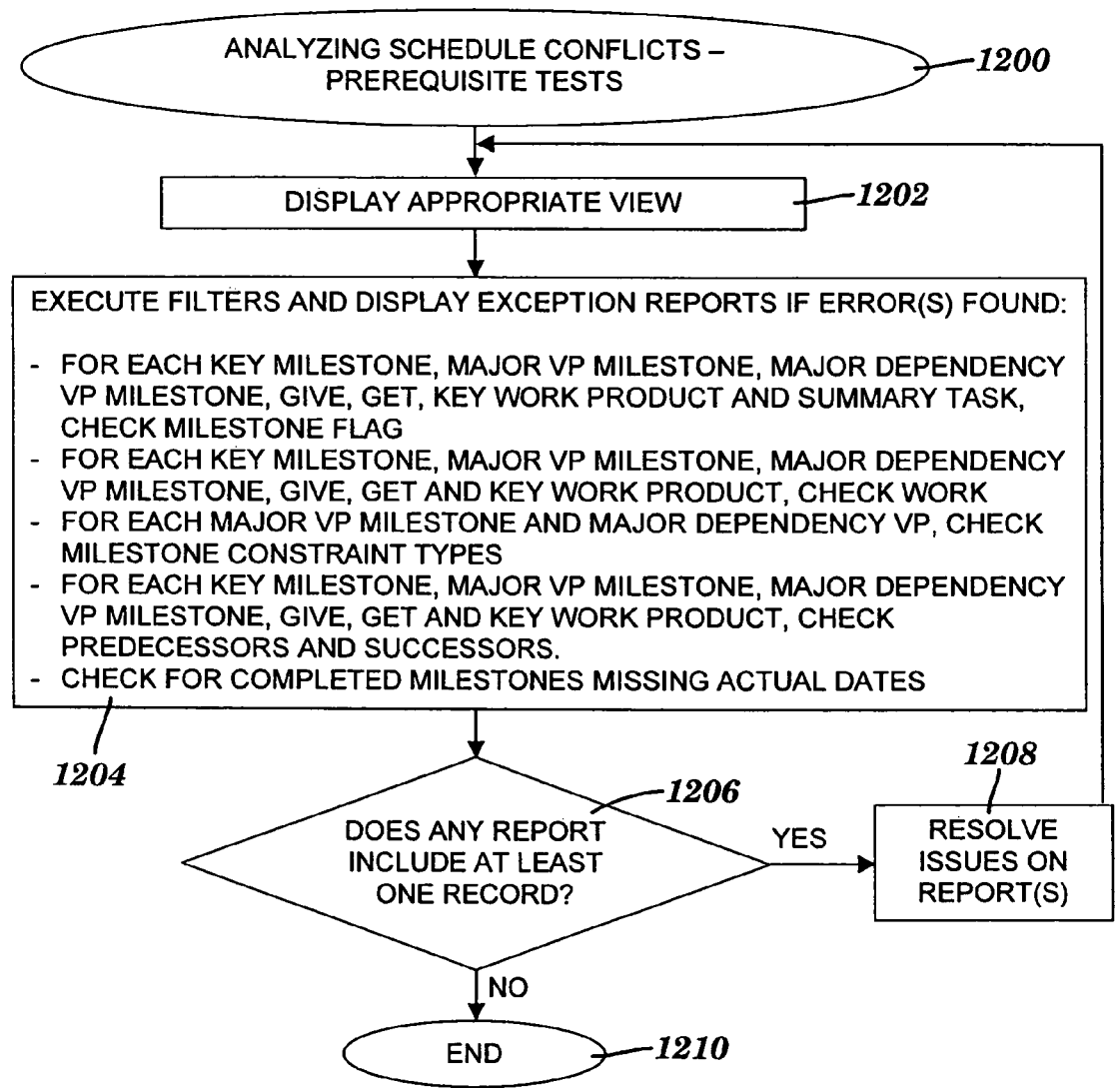
FIG. 12A is a flow chart of a process of prerequisite tests used in analyzing schedule conflicts in the method of FIG. 1B, in accordance with embodiments of the present invention.

FIG. 12A is a flow chart of a process of prerequisite tests used in analyzing schedule conflicts in the method of FIG. 1B, in accordance with embodiments of the present invention. The process of prerequisite schedule conflict tests start at step 1200. In step 1202, a view is automatically displayed by the computing application to allow the user to initiate an execution of filters to facilitate the prerequisite tests.

In step 1204, the computing application executes the filters listed below.

(1) Invalid Milestone flag for Key Milestone
(2) Invalid Milestone flag for Major VP
(3) Invalid Milestone flag for Give/Get
(4) Invalid Milestone flag for Major Dependency
(5) Invalid Milestone flag for Key Work Product
(6) Invalid Milestone flag for Summary task
(7) Invalid Work for Milestone
(8) Invalid Work for Key Milestone
(9) Invalid Work for Major VP
(10) Invalid Work for Give/Get
(11) Invalid Work for Major Dependency VP
(12) Invalid Work for Key Work Product
(13) Invalid Constraint Type for Major VP
(14) Invalid Constraint Type for Major Dependency VP
(15) Major VP missing predecessor
(16) Major VP missing successor
(17) Key milestone missing predecessor
(18) Key milestone missing successor
(19) Give missing external successor
(20) Give missing predecessor
(21) Get missing external predecessor
(22) Get missing successor
(23) Key work product missing predecessor
(24) Key work product missing successor
(25) Completed Milestones Missing Actual Dates The functionality, exception reports and corrective actions associated with the step 1204 filters listed above as items (1), (2), (6)-(9) and (13) are described above relative to FIGS. 3A-3B. Similar types of descriptions for the filters denoted by items (3), (4), (10), (11) and (14) listed above are presented above relative to FIG. 4. Further, filters denoted by items (5) and (12) are described above relative to FIG. 5. Still further, filters denoted by items (15)-(24) are described above relative to FIG. 7.

The Completed Milestones Missing Actual Dates filter identifies that a field corresponding to an actual finish date of a milestone is a missing an actual finish date value if the milestone's Physical % Complete value is 100% and no actual finish date has been entered in the field corresponding to the actual finish date.

If the execution of the filters in step 1204 identifies one or more errors, then the computing application automatically generates and displays one or more exception reports in step 1204.

In inquiry step 1206 determines that any of the exception reports generated in step 1204 includes at least one record (i.e., step 1204 identifies at least one error), then one or more corrective actions are identified and performed in step 1208 to resolve one or more errors indicated by the exception report(s) generated in step 1204. The manner in which a corrective action of step 1208 is identified and performed depends on the specific error being corrected. For example, if the error being corrected is identified by a filter denoted by one of the aforementioned items (1)-(14), then the computing application automatically displays the corrective action in step 1208 that can resolve the error, and the user selects an option in step 1208 to prompt the computing application to automatically apply the displayed corrective action or to bypass the displayed corrective action. Following step 1208, the process repeats starting at step 1202.

If inquiry step 1206 determines that no exception report records are generated in step 1204, then the prerequisite test process ends at step 1210.

As one example of a corrective action performed in step 1208, consider the Completed Milestones Missing Actual Dates filter identifying a missing actual date for a milestone, thereby generating an exception report. The user corrects the error by utilizing an interactive field on the exception report to enter an actual finish date for the milestone.

Figure 12B:
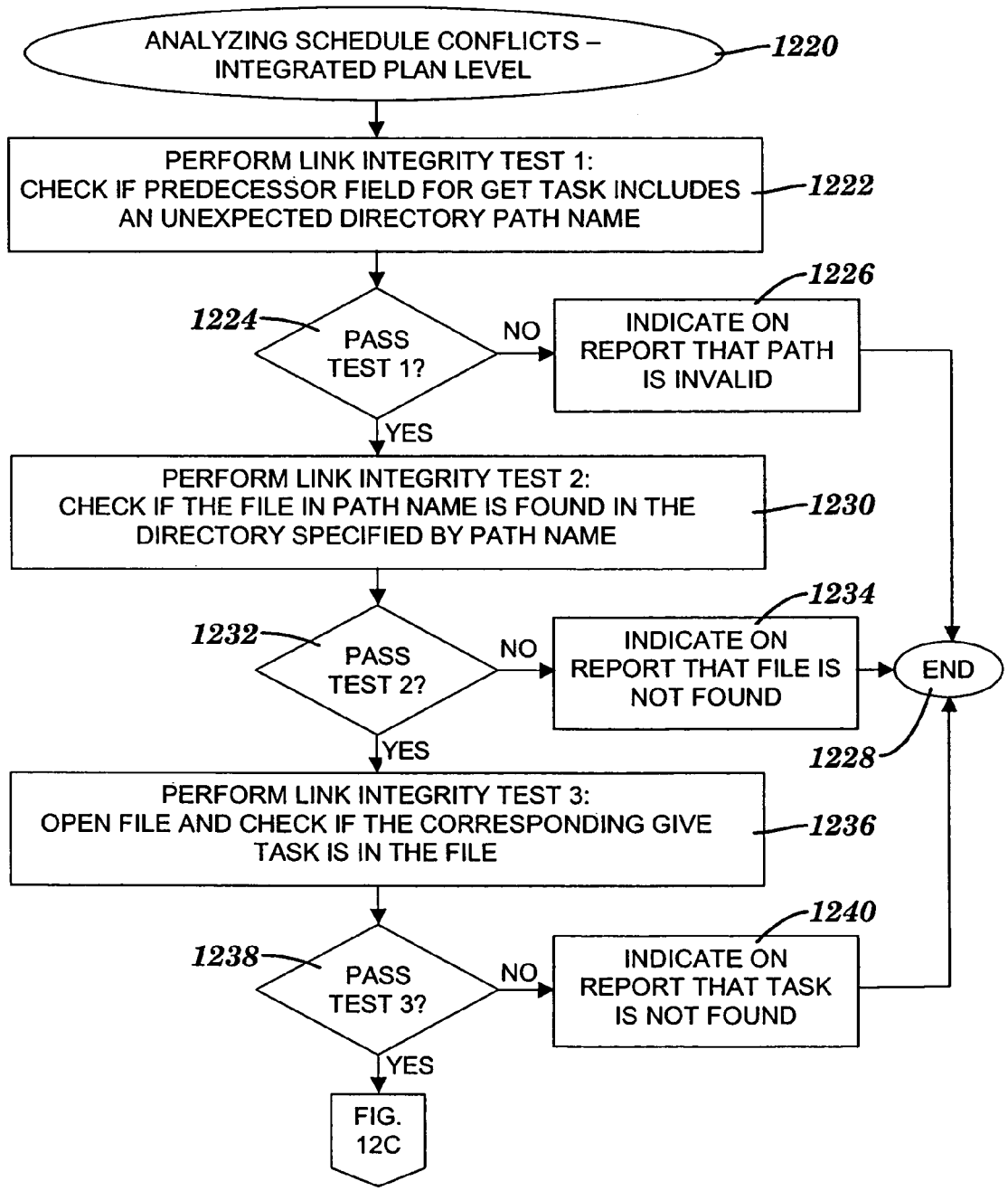
FIGS. 12B-12C depict a flow chart of a process of analyzing schedule conflicts at an integrated plan level in the method of FIG. 1B, in accordance with embodiments of the present invention.
Figure 12C:
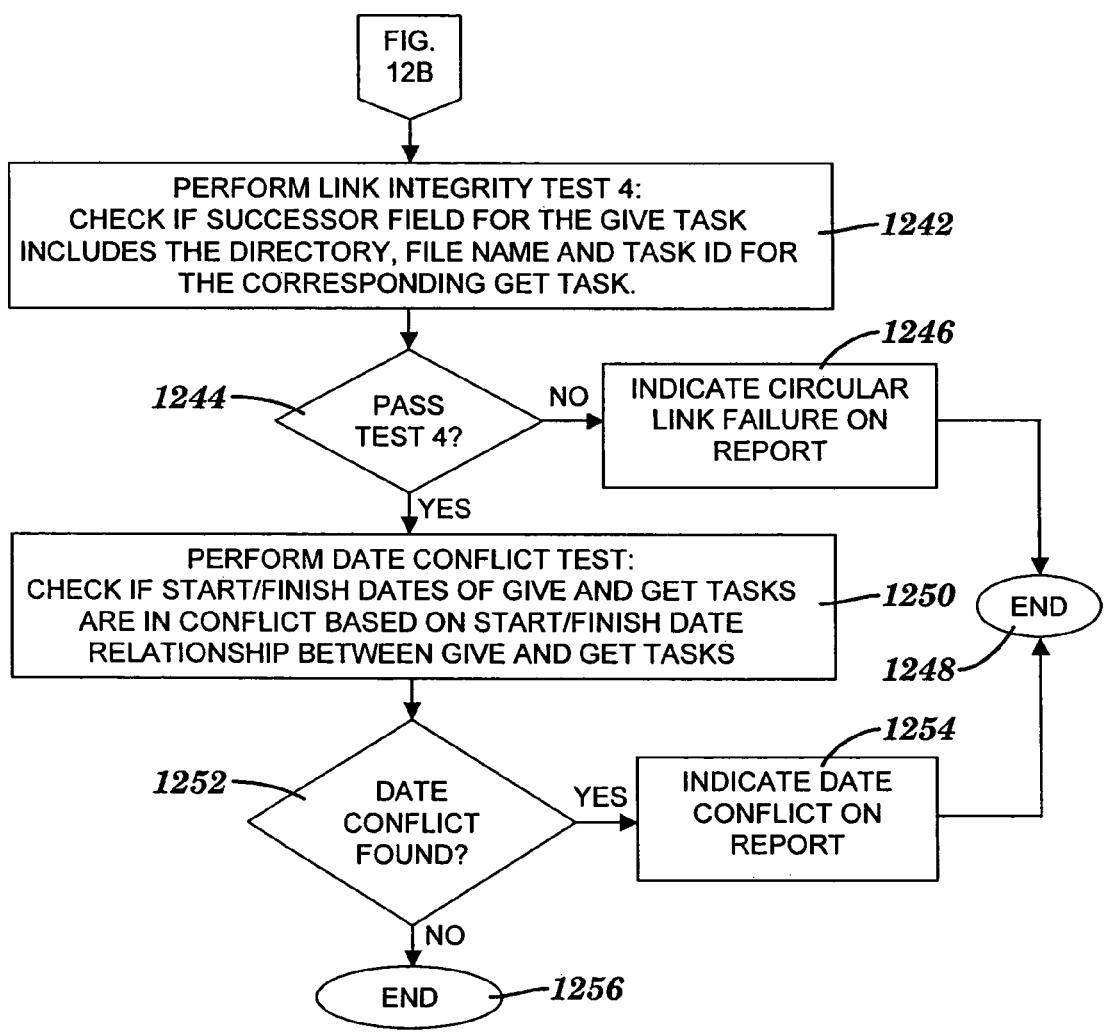

FIGS. 12B-12C depict a flow chart of a process of analyzing schedule conflicts at an integrated plan level in the method of FIG. 1B, in accordance with embodiments of the present invention. Schedule conflicts occur when a start and/or finish date of a predecessor task to a given task conflicts with a start and/or finish date of the given task. One example of a conflict occurs when the finish date of a predecessor task occurs after the start date of a given successor task. The schedule conflicts analysis process operates within an e2e integrated plan that includes multiple subproject plans and begins at step 1220. To accurately identify schedule conflicts between linked tasks in separate project plans, the integrity of the link must be assured as a prerequisite. For a given dependency/deliverable pair, the schedule conflicts analysis aborts upon detection of the first error. Unless otherwise indicated, the subsequent process steps of FIGS. 12B-12C are performed automatically by a schedule conflicts macro provided by the computing application.

In step 1222, the computing application automatically performs a first link integrity test that checks if a predecessor field for a Get task of a project plan includes an unexpected (i.e., invalid) directory path name. In this case, an unexpected directory path name indicates a directory path that that is not associated with the project plan being analyzed for schedule conflicts. If an expected (i.e., valid) directory path name is included in the predecessor field, then the first link integrity test passes; otherwise, the first test fails.

If inquiry step 1224 determines that the first link integrity test fails (i.e., the checked directory path name is invalid), then an indication of the invalid path name is included on a report in step 1226 and the process ends at step 1228. For example, in response to detecting an invalid directory path name, the step 1226 report includes the notification: PROJECT PATH INCORRECT.

If inquiry step 1224 determines that the first link integrity test passes, then the computing application automatically performs a second link integrity test in step 1230. The second link integrity test checks if a project plan file in the path name is found in the directory specified by the path name. If the file is found in the specified directory, then the second link integrity test passes; otherwise the second test fails.

If inquiry step 1232 determines that the second link integrity test fails (i.e., the project plan file in the path name is not found in the specified directory), then an indication of the file not being found is included in a report in step 1234 and the process ends at step 1228. For example, in response to not finding the file in the specified directory, the report in step 1234 includes the notification: PROJECT FILE NOT FOUND.

If inquiry step 1232 determines that the second link integrity test passes, then the computing application automatically performs a third link integrity test in step 1236. The third link integrity test opens the project plan file found in step 1230 and checks if the Give task corresponding to the Get task is in the project plan file. If the Give task is found in the opened file, then the third link integrity test passes; otherwise the third test fails. The third test fails, for instance, if the Give task is deleted from one project plan and another project plan that includes the Get task has not been updated.

If inquiry step 1238 determines that the third link integrity test fails (i.e., the corresponding Give task is not found in the project plan file), then an indication of the task not being found is included in a report in step 1240 and the process ends at step 1228. For example, in response to not finding the Give task in the project plan file, the report in step 1240 includes the notification: TASK NOT FOUND IN PROJECT.

If inquiry step 1238 determines that the third link integrity test passes, then the process continues in FIG. 12C with the computing application automatically performing a fourth link integrity test in step 1242. The fourth link integrity test checks if the successor field for the Give task includes the following expected information: directory path, file name and task ID for the corresponding Get task. The fourth link integrity test completes a check of a "circular" link with a project plan (i.e., a check of the links going both ways between a Give and a Get). If the successor field includes the aforementioned expected information, then the fourth link integrity test passes; otherwise, the fourth test fails (i.e., a circular link failure is detected).

If inquiry step 1244 determines that the fourth link integrity test fails (i.e., the successor field for the Give task does not include the expected information), then an appropriate notification (e.g., CIRCULAR LINK FAILURE) is included in a report in step 1246 and the process ends at step 1248.

If inquiry step 1244 determines that the fourth link integrity test passes, then the computing application automatically performs a date conflict test in step 1250. The date conflict test checks if start/finish dates of Give and Get tasks are in conflict based on a particular link relationship between the Give and Get tasks.

The particular link relationships (a.k.a. link associations or start/finish date relationships) that can exist between the Give and Get tasks include: Finish-to-Start, Finish-to-Finish, Start-to-Start and Start-to-Finish relationships, which are also referred to herein as FS, FF, SS and SF, respectively.

A Finish-to-Start relationship indicates that the Give task's finish date must be before the Get task's start date. A Finish-to-Finish relationship indicates that the Give task's finish date must be before the Get task's finish date, while the Get task's start date is not restricted. A Start-to-Start relationship indicates that the Give task's start date must be before the Get task's start date. A Start-to-Finish relationship indicates that the Give task's start date must be before the Get task's finish date.

For example, if the date conflict test of step 1250 determines that a FS relationship exists between Give and Get task and a Give task's finish date is later than a corresponding Get task's start date, then a date conflict is identified in step 1252.

If inquiry step 1252 determines that the date conflict test of step 1250 has identified a date conflict, then the date conflict is included on a report in step 1254 and the process ends at step 1248. If inquiry step 1252 determines that no date conflict is found, then the process ends at step 1256.

It should be noted that the schedule conflict analysis of FIGS. 12B-12C is an analysis of a single Get task where processing halts on the occurrence of the first error. After the occurrence and processing of an error, the computing application fetches the next Get task (not shown) and repeats the process of FIGS. 12B-12C as it applies to the fetched Get task.

Figure 12D:
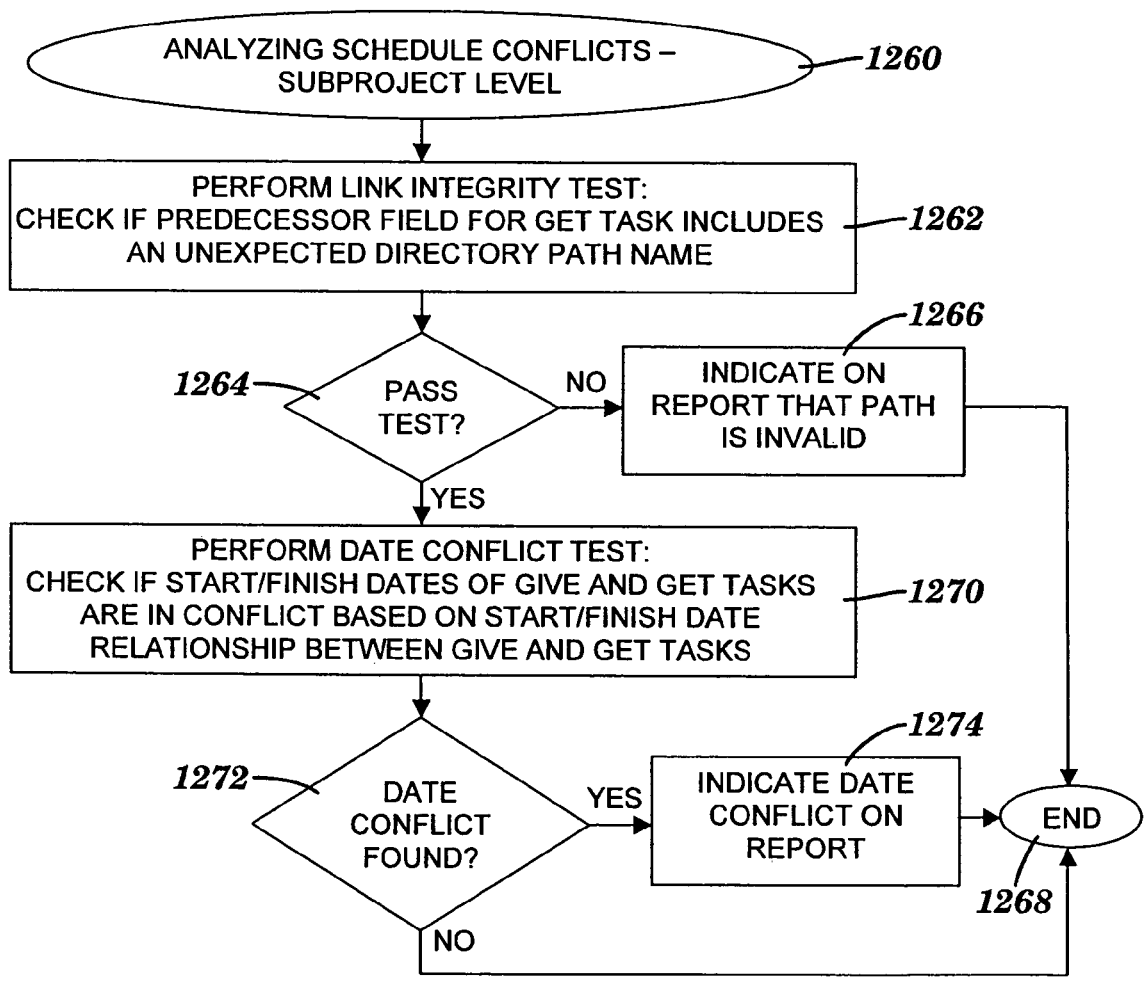
FIG. 12D is a flow chart of a process of analyzing schedule conflicts at a subproject level in the method of FIG. 1B, in accordance with embodiments of the present invention.

FIG. 12D is a flow chart of a process of analyzing schedule conflicts at a subproject level in the method of FIG. 1B, in accordance with embodiments of the present invention. The schedule conflicts analysis process of FIG. 12D operates within a subproject and begins at step 1260. To accurately identify schedule conflicts between linked tasks in a subproject, the integrity of the link must be assured as a prerequisite. For a given dependency/deliverable pair, the schedule conflicts analysis of FIG. 12D aborts upon detection of the first error. Unless otherwise indicated, the subsequent process steps of FIG. 12D are performed automatically by a schedule conflicts macro provided by the computing application.

In step 1262, the computing application automatically performs a link integrity test that checks if a predecessor field for a Get task of a project plan includes an unexpected (i.e., invalid) directory path name. In this case, an unexpected directory path name indicates a directory path that that is not associated with the project plan being analyzed for schedule conflicts. If an expected (i.e., valid) directory path name is included in the predecessor field, then the link integrity test of step 1262 passes; otherwise, the link integrity test fails.

If inquiry step 1264 determines that the link integrity test fails (i.e., the checked directory path name is invalid), then an indication of the invalid path name is included on a report in step 1266 and the process ends at step 1268. For example, in response to detecting an invalid directory path name, the step 1266 report includes the notification: SUBPROJECT PATH INCORRECT.

If inquiry step 1264 determines that the link integrity test passes, then the computing application automatically performs a date conflict test in step 1270. The date conflict test checks if start/finish dates of Give and Get tasks are in conflict based on a particular link relationship between the Give and Get tasks. The particular link relationships that can exist between the Give and Get tasks are FS, FF, SS or SF, as described above relative to FIG. 12C.

For example, if the date conflict test of step 1270 determines that a FS relationship exists between a Give task and its corresponding Get task, and the Give task's finish date is later than a corresponding Get task's start date, then a date conflict is identified in step 1272.

If inquiry step 1272 determines that the date conflict test of step 1270 has identified a date conflict, then the date conflict is included on a report in step 1274 and the FIG. 12D process ends at step 1268. If inquiry step 1272 determines that no date conflict is found, then the FIG. 12D process ends at step 1268.

Similar to FIGS. 12B-12C, the subproject level schedule conflict analysis of FIG. 12D is an analysis of a single Get task where processing halts on the occurrence of the first error. After the occurrence and processing of an error, the computing application fetches the next Get task (not shown) and repeats the process of FIG. 12D as it applies to the fetched Get task.

Figure 12E:
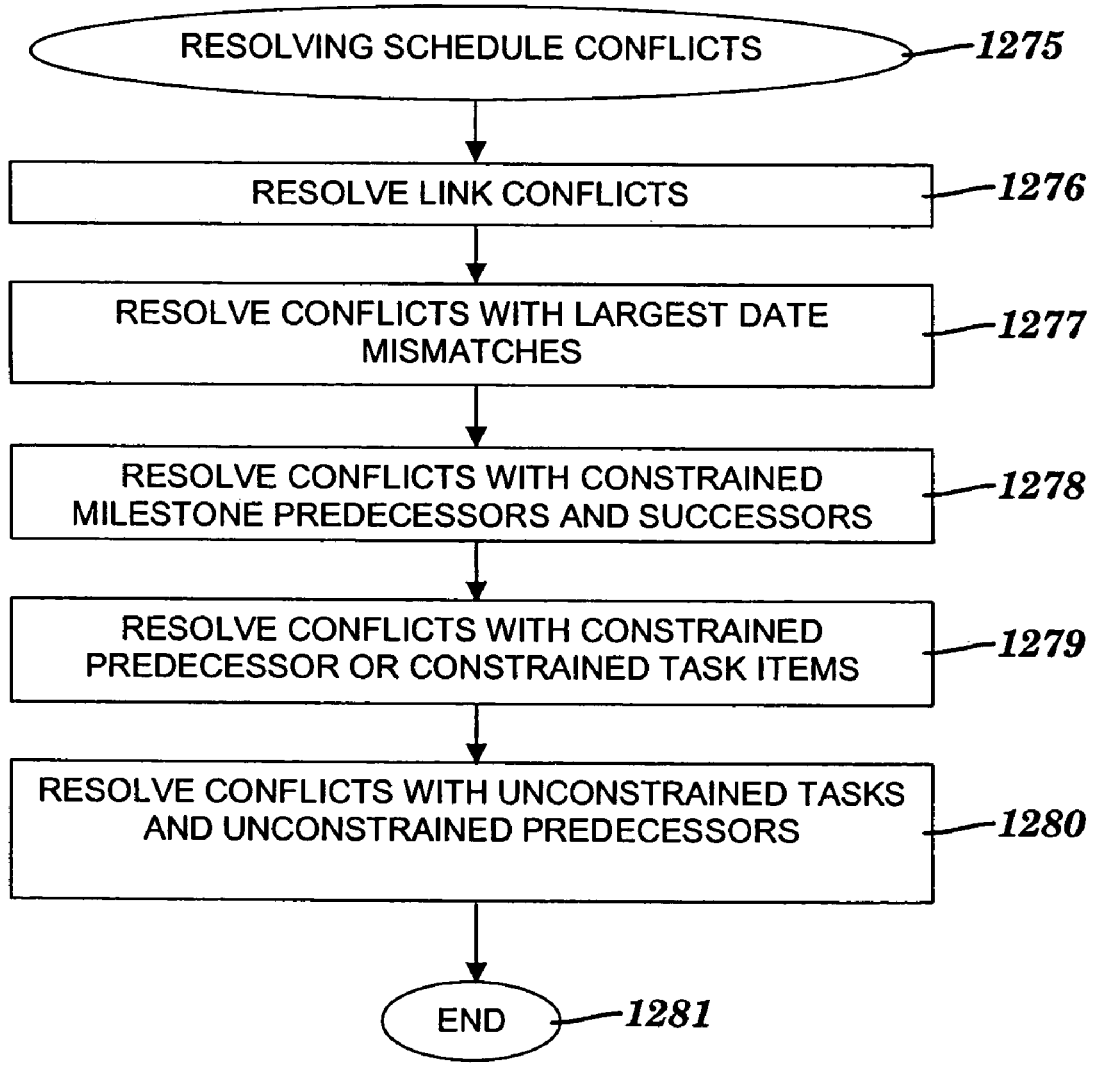
FIG. 12E is a flow chart of a process of resolving schedule conflicts in the method of FIG. 1B, in accordance with embodiments of the present invention.

FIG. 12E is a flow chart of a process of resolving schedule conflicts in the method of FIG. 1B, in accordance with embodiments of the present invention. The schedule conflict resolution process begins at step 1275. The user of the computing application examines the exception report generated by FIGS. 12B-12C or FIG. 12D and identifies and implements one or more corrective actions to resolve any link integrity issues (i.e., link conflicts) or date conflicts included in the exception report. In one embodiment, the computing application provides a conflict resolution interface through which the user initiates resolution of the link conflict and date conflict issues included in the exception report. For example, the user utilizes the conflict resolution interface to resolve link conflicts in step 1276, date conflicts with the largest date mismatches in step 1277, date conflicts with constrained milestone predecessors and/or successors in step 1278, date conflicts with constrained predecessor or constrained task items in step 1279, and date conflicts with unconstrained tasks and unconstrained predecessors in step 1280. The schedule conflict resolution process ends at step 1281.

A date mismatch in step 1277 is caused, for example, by making a typographical error associated with the entry of a constraint date, or by neglecting to update a constraint date in response to an agreement to update a project plan. Further, the resolution of conflicts associated with constrained milestone predecessors and successors in step 1278 is capable of automatically resolving other conflicts not related to constrained milestones.

Figure 12F:
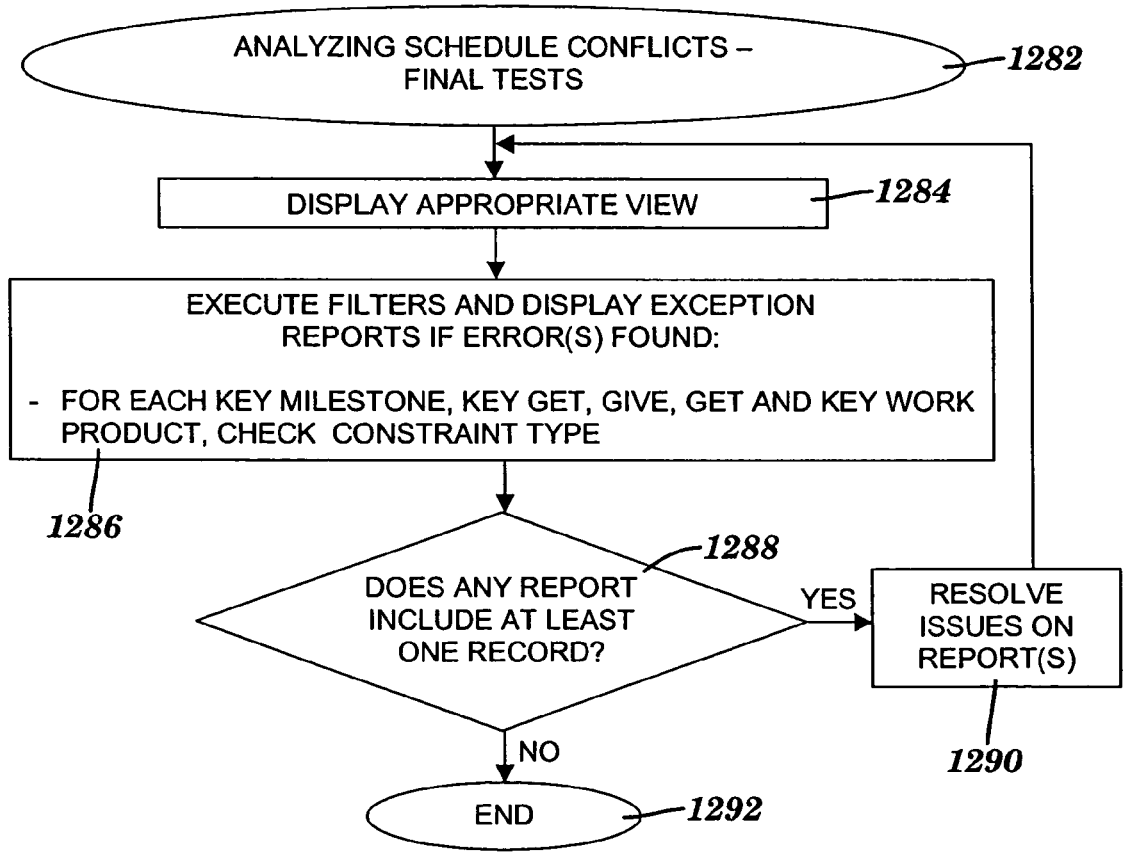
FIG. 12F is a flow chart of a process of final tests used in analyzing schedule conflicts in the method of FIG. 1B, in accordance with embodiments of the present invention.

FIG. 12F is a flow chart of a process of final tests used in analyzing schedule conflicts in the method of FIG. 1B, in accordance with embodiments of the present invention. The process of final schedule conflict tests start at step 1282 and are performed after the schedule conflicts analysis of FIGS. 12B-12C or FIG. 12D and the schedule conflict resolution process of FIG. 12E are completed for all Get tasks of a project. In step 1284, a view is automatically displayed by the computing application to allow the user to initiate an execution of filters to facilitate the final tests.

In step 1286, the computing application executes the filters listed below.

(1) Invalid Constraint Type for Key Milestone, which identifies an invalid constraint type for a milestone, if a task is not completed, the task is not a Get, the task is defined as a key milestone in a milestone type field, and the key milestone's constraint type field includes a value other than the valid values for a key milestone (i.e., a value other than "Must Finish On" or "Finish No Later Than").

(2) Invalid Constraint Type for Key Get, which identifies an invalid constraint type for a Get task if the Get task is defined as a key Get in the milestone type field and the Get task's constraint type is a value other than the valid values for key Gets (i.e., a value other than "Must Finish On" or "Finish No Later Than")

(3) Invalid Constraint Type for Get, which identifies an invalid constraint type for a task if the task is not complete and is defined as a Get or External Get, and the task's constraint type value is other than the valid constraint type values for a Get or External Get (i.e., a value other than "Must Start On" or "Start No Earlier Than").

(4) Invalid Constraint Type for Give, which identifies an invalid constraint type for a task if the task is not completed and is defined as a Give or External Give, and the task's constraint type value is other than the valid constraint type values for a Give or External Give (i.e., a value other than "Must Finish On" or "Finish No Later Than").

(5) Invalid Constraint Type for Key Work Product, which identifies an invalid constraint type for a task if the task is defined as a key work product and the key work product's constraint type value is other than the valid constraint type values for a key work product (i.e., a value other than "Must Finish On" or "Finish No Later Than").

If the execution of the filters in step 1286 identifies one or more errors, then the computing application automatically generates and displays one or more exception reports in step 1286.

If inquiry step 1288 determines that any of the exception reports generated in step 1286 includes at least one record (i.e., step 1286 identifies at least one error), then the computing application automatically determines and automatically displays one or more corrective actions in step 1290 that can resolve one or more errors indicated by the exception report(s). The user selects an option in step 1290 to prompt the computing application to automatically apply a displayed corrective action or to bypass the displayed corrective action(s). Following step 1290, the process repeats starting at step 1284.

If inquiry step 1288 determines that no exception report records are generated in step 1204 (i.e., no errors are identified in step 1286), then the process for final tests for analyzing schedule conflicts ends at step 1292.

Examples of corrective actions that are performed in step 1290 by the user via interactive fields in an exception report generated in step 1286 include:

1. If the Invalid Constraint Type for Key Milestone filter identifies an invalid constraint type, then the user selects an option to set the key milestone's constraint type field to "Must Finish On" or "Finish No Later Than".

(2) If the Invalid Constraint Type for Key Get filter identifies an invalid constraint type, then the user selects an option to set the key Get task's constraint type field to "Must Finish On" or "Finish No Later Than". Further, if the Get or External Get is not meant to be a key Get, the user sets the milestone type field to a blank field.

(3) If the Invalid Constraint Type for Get filter identifies an invalid constraint type, then the user selects an option to set the Get task's constraint type field to "Must Start On" or "Start No Earlier Than".

(4) If the Invalid Constraint Type for Give filter identifies an invalid constraint type, then the user selects an option to set the Give task's constraint type field to "Must Finish On" or "Finish No Later Than".

(5) If the Invalid Constraint Type for Key Work Product filter identifies an invalid constraint type, then the user selects an option to set the key work product's constraint type field to "Must Finish On" or "Finish No Later Than".

Figure 12G:
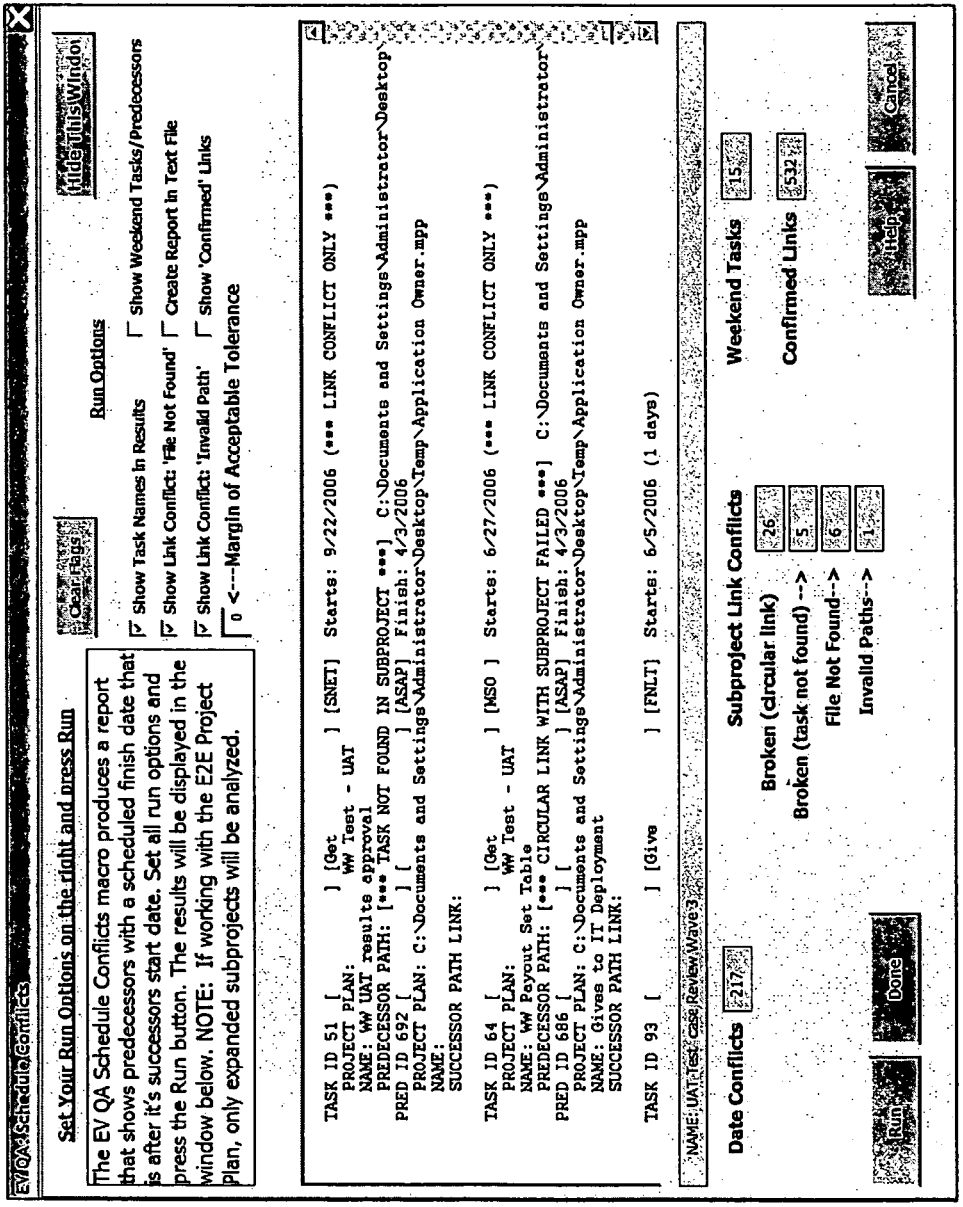
FIG. 12G is an exemplary interface that includes an exception report generated by the schedule conflict analysis of FIGS. 12B-12C or FIG. 12D and that facilitates the schedule conflicts resolution process of FIG. 12E, in accordance with embodiments of the present invention.

FIG. 12G is an exemplary interface that includes an exception report generated by the schedule conflict analysis of FIGS. 12B-12C and that facilitates the schedule conflicts resolution process of FIG. 12E, in accordance with embodiments of the present invention. Interface 1295 indicates examples of two conflicts identified by the analysis of FIGS. 12B-12C. A similar interface is generated by the analysis of FIG. 12D.

In the example shown in FIG. 12G, the exception report includes an identifier (e.g., TASK ID) of the task for which a conflict or link integrity issue was determined, the type of task (e.g., Get or Give), the start date of the task, a name of the identified task, a name of the project plan that includes the task, and a directory path of the predecessor task corresponding to the identified task. Further, for each task, the exception report includes a predecessor identifier (e.g., PRED ID), a finish date of the predecessor task, a directory path of the project plan that includes the predecessor task, a name of the predecessor task, and a directory path of the successor to the predecessor task. The exception report also includes the type of link integrity issue or date conflict determined for each task listed. Further, the exception report of FIG. 12G includes automatically calculated totals for confirmed (i.e., valid) links, date conflicts, and link conflicts broken down by four link conflict types identified by the aforementioned four link integrity tests (see FIGS. 12B-12C).

In this example, the analysis of FIGS. 12B-12C includes two notifications of link integrity issues: (1) for task ID 51, a TASK NOT FOUND IN SUBPROJECT issue that indicates a failure of the third link integrity test performed in step 1236 of FIG. 12B, and (2) for task ID 64, a CIRCULAR LINK WITH SUBPROJECT FAILED issue that indicates a failure of the fourth link integrity test performed in step 1242 of FIG. 12C.

In one embodiment, interface 1295 provides an option to enter a margin of acceptable tolerance. By default, the test performed in step 1250 of FIG. 12C flags a date conflict based on finding a first date associated with a Give being later than a second date associated with a Get by one or more days. The user, however, may make an entry of X days in a margin of acceptable tolerance field to display only date conflicts where the step 1250 (see FIG. 12C) comparison finds the first date being later than the second date by more than X days.

Quality Assurance Super Macro

Figure 13A:
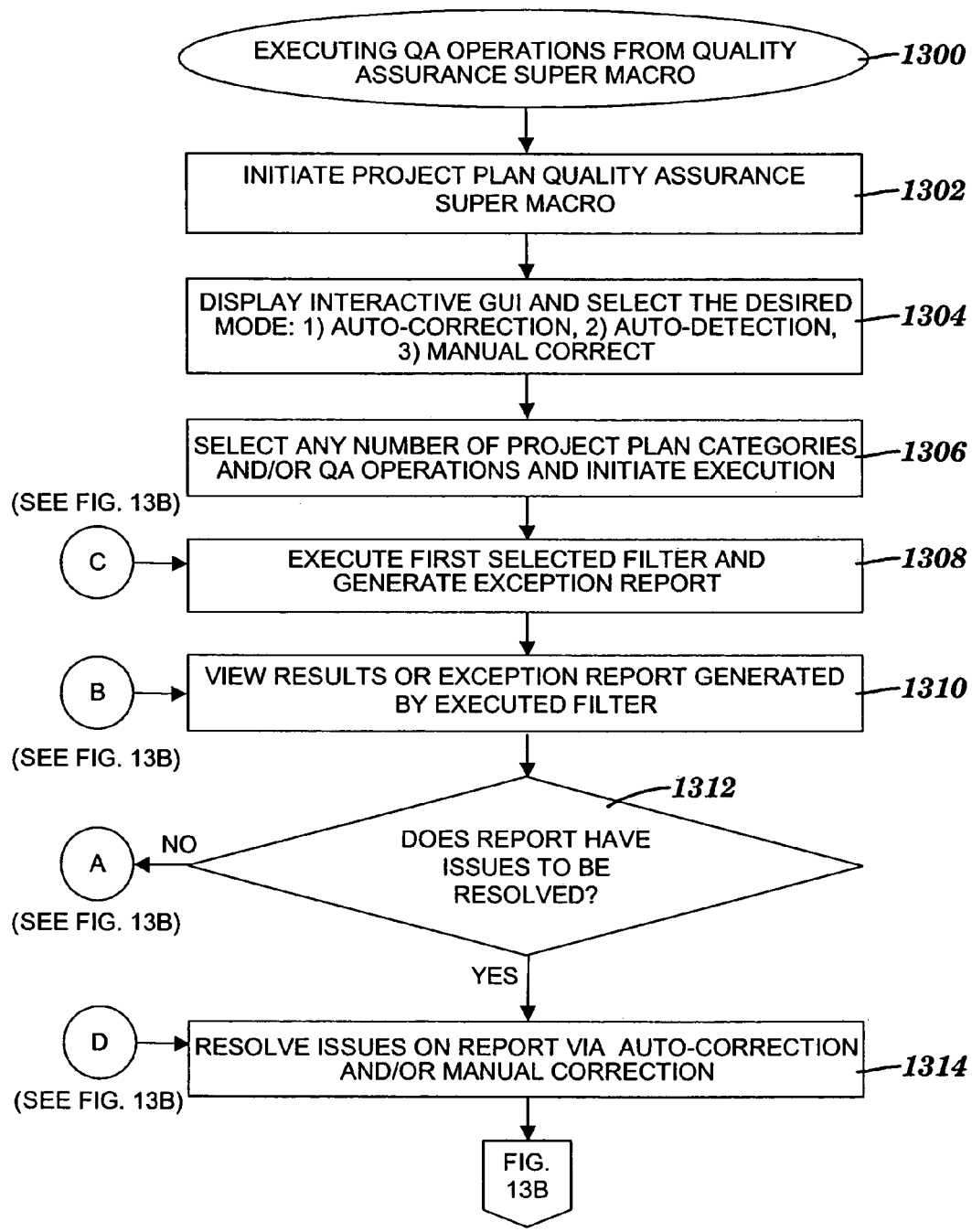
FIGS. 13A-13B depict a flow chart of a process of executing QA operations from a quality assurance super macro in the validation method of FIG. 1B, in accordance with embodiments of the present invention.
Figure 13B:
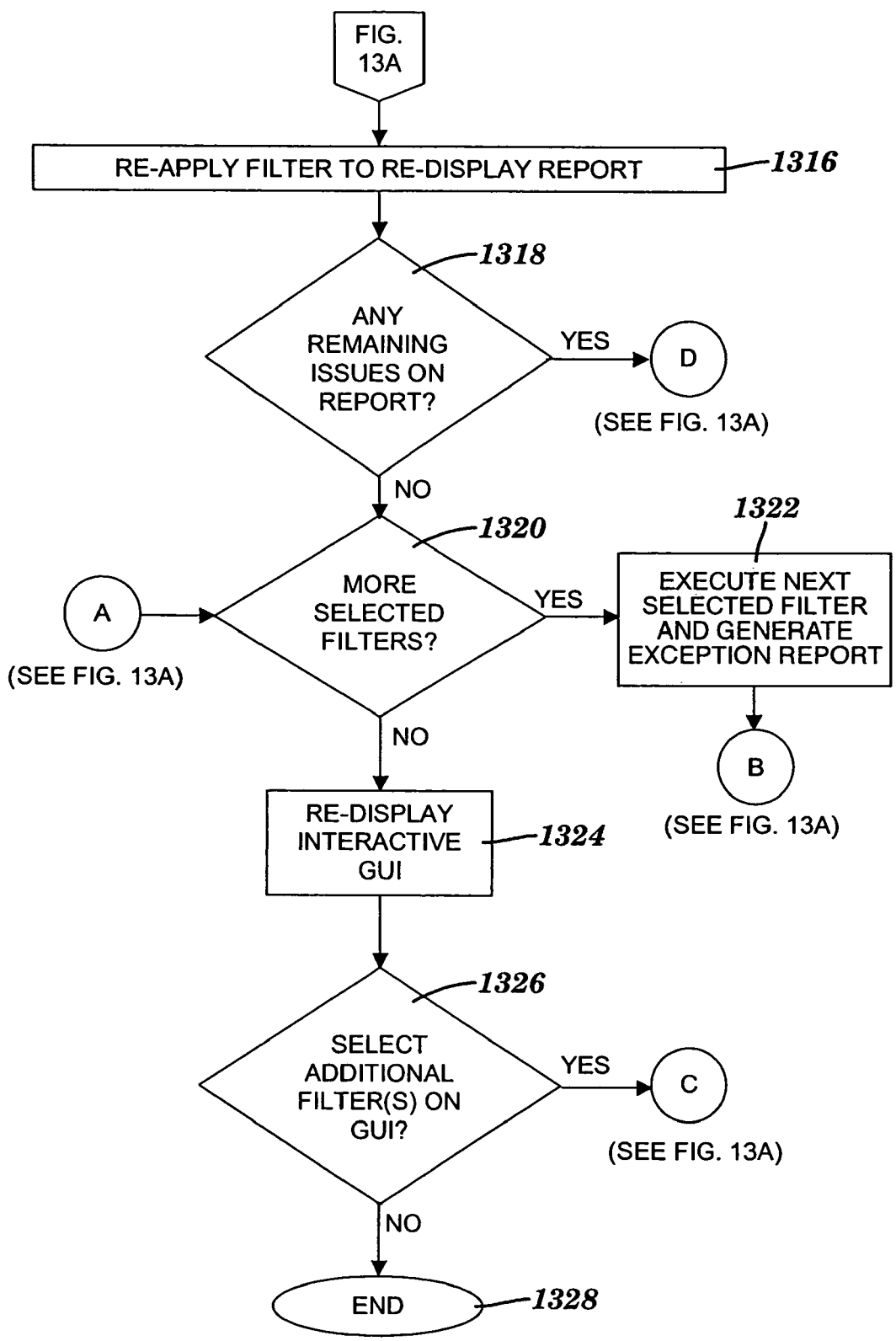

FIGS. 13A-13B depict a flow chart of a process of executing QA operations from a project plan quality assurance super macro in the validation method of FIG. 1B, in accordance with embodiments of the present invention. The project plan quality assurance super macro is hereinafter simply referred to as the super macro. The super macro is capable of automatically executing all of the filters described above relative to FIGS. 1-11, 12A-12D, 12F, and described below relative to FIGS. 14A and 14B, or any combination of the aforementioned filters. The execution of the super macro advantageously provides an efficient software-driven and automated process for executing the filters of FIGS. 3A-11 and the macros associated with FIGS. 12A-12D, 12F, 14A and 14B. Further, execution of the super macro automatically identifies potential errors via the execution of the aforementioned filters and/or macros and automatically corrects one or more of the identified errors. The automatic correction of an identified error is preformed in response to the identification of the error, or in response to an automatic generation of a proposed correction of the error followed by the user confirming that the proposed correction should be performed.

The process of executing filters and/or macros via the super macro begins at step 1300. In step 1302, the user initiates execution of the super macro via an interface provided by the computing application. In step 1304, the super macro provides an interactive graphical user interface (GUI) that allows execution of the above-described filters and/or macros based on a selection of one or more individual QA operations or based on a selection of one or more categories, where each category includes one or more QA operations. Each QA operation corresponds to one or more of the aforementioned filters and/or macros.

In step 1304, the user also utilizes the GUI to select a desired mode: (1) an automated correction mode (a.k.a. Auto-correction), (2) an automated detection mode (a.k.a. Auto-detection), or (3) a manual correction mode (a.k.a. Manual Correct). In a series of executions of the super macro relative to a single project plan, the user has the ability to select any combination of the aforementioned modes. For example, given a project plan whose tasks are being validated via the super macro, a first execution of the super macro includes a selection of the automated correction mode to perform a first set of corrective actions and a second execution of the super macro includes a selection of the manual correction mode.

In step 1306, the user selects (e.g., via checkboxes and/or buttons) any number of the aforementioned categories and/or QA operations. This selection by the user initiates execution by the computing application of the one or more filters and/or macros associated with the selected one or more categories and/or one more QA operations.

In step 1308, a first filter or macro associated with the selection in step 1306 is automatically executed by the computing application and an exception report is generated. The filter or macro executed in step 1308 is described above relative to one of FIGS. 3A-12F. For example, if step 1308 executes the filters associated with a validation of milestones, then the filters include those filters described above relative to FIGS. 3A-3B. In step 1310, the user views the results on the exception report generated in step 1308.

If inquiry step 1312 determines that the exception report generated in step 1308 includes one or more issues to be resolved (i.e., one or more errors are identified by the exception report), then the one or more issues are resolved in step 1314. The resolution of the issues depends on the mode selected in step 1304.

If Auto-correct is selected in step 1304, step 1314 includes automatically presenting to the user on an interactive display one or more recommended actions to correct the one or more errors and automatically executing an action of the one or more actions in response to the user utilizing the interactive display to confirm that the recommended action should be performed.

If Auto-detect is selected in step 1304, the filters and/or macros associated with the selection(s) in step 1306 are executed in the background in step 1308 to produce exception reports that are to be reviewed later by the user.

In Manual Correct is selected in step 1304, proposed corrective actions are not presented to the user, but the user still has the capability of utilizing an interactive display to correct the one or more errors in step 1314.

Following step 1314, the super macro process continues in FIG. 13B. In step 1316, the user re-executes the filter and/or macro that was first executed in step 1308 (see FIG. 13A) to regenerate and re-display the exception report originally generated in step 1308 (see FIG. 13A). If inquiry step 1318 determines that any issues remain on the re-displayed exception report, then the process repeats starting with the issue resolution step 1314 of FIG. 13A; otherwise inquiry step 1320 determines if additional filters and/or macros exist that were selected in step 1306 (see FIG. 13A) and have not yet been executed. Inquiry step 1320 is also performed if inquiry step 1312 (see FIG. 13A) determines that no exception report record based on the execution of step 1308 (see FIG. 13A) indicate any issues to be resolved.

If inquiry step 1320 determines that there are more selected filters and/or macros to be executed, then step 1322 executes the next selected filter/macro and generates an exception report associated with the next selected filter/macro, and the process repeats starting at step 1310 (see FIG. 13A). If inquiry step 1320 finds no additional selected filters or macros, then the GUI originally displayed in step 1304 (see FIG. 13A) is re-displayed in step 1324, which allows the user to select one or more additional filters and/or macros to be executed. If inquiry step 1326 determines that the user selects one or more additional filters and/or macros, then the process repeats starting at the first filter execution step 1308 of FIG. 13A; otherwise the super macro process ends at step 1328.

Figure 13C:
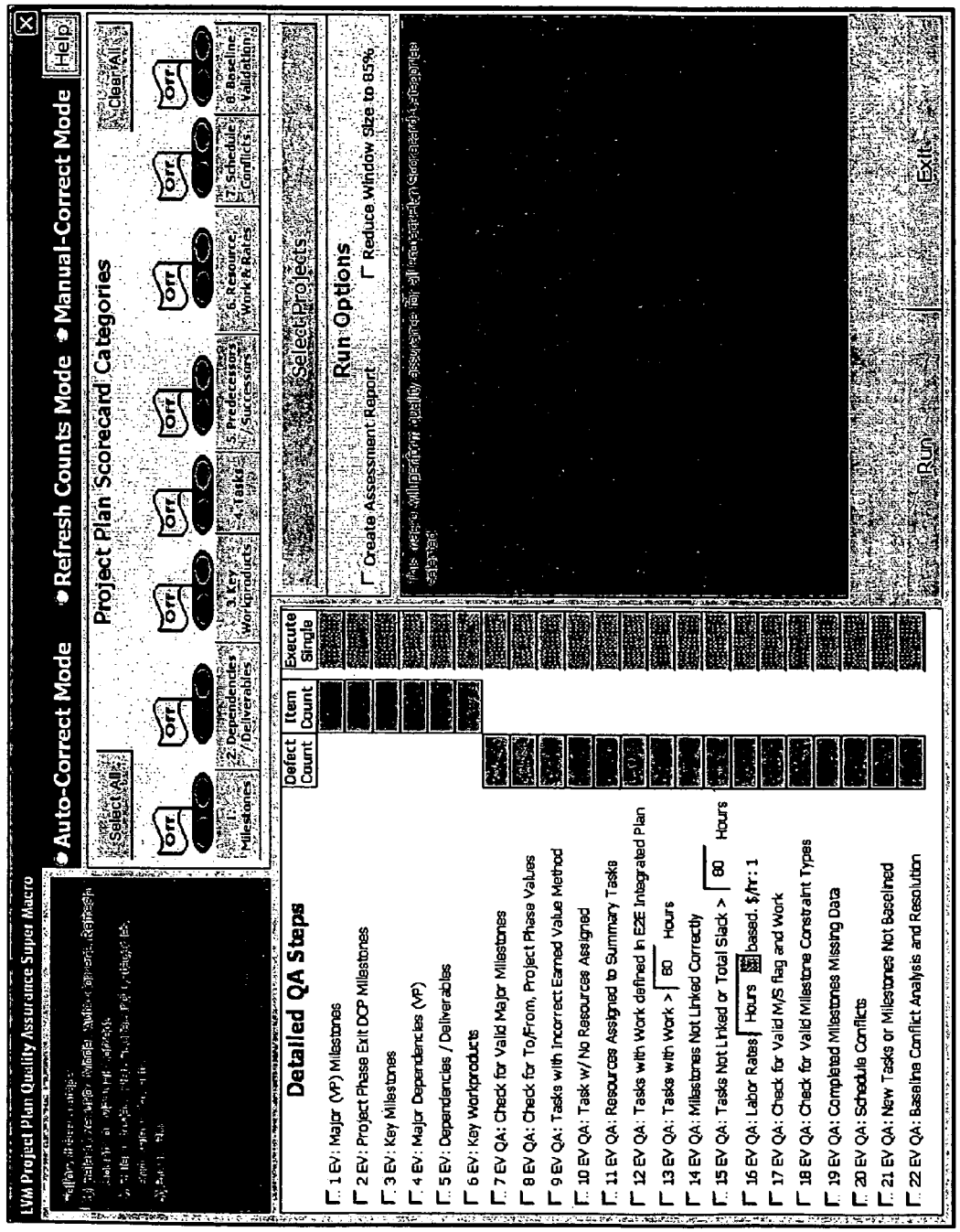
FIG. 13C is an exemplary interface for the quality assurance super macro that provides the process of FIGS. 13A-13B, in accordance with embodiments of the present invention.

FIG. 13C is an exemplary interface for the quality assurance super macro that provides the process of FIGS. 13A-13B, in accordance with embodiments of the present invention. Interface 1350 is an example of the GUI displayed in step 1304 (see FIG. 13A). The user can check one or more checkboxes in the Detailed QA Steps section of GUI 1350 to select one or more QA operations in step 1306 (see FIG. 13A). For example, the user can check the checkbox labeled "10" to perform the QA operation that checks for tasks with no resources assigned. In this example, the QA operation is performed via an execution of the Task with No Resources Assigned filter. Instead of checking checkboxes, the user can also select a category that corresponds to one or more QA operations listed in the Detailed QA Steps section of GUI 1350. The QA operations that correspond to the categories are described above relative to step 1306 (see FIG. 13A). The categories in GUI 1350 are selected via onscreen buttons that include: (1) Milestones, (2) Dependencies/Deliverables, (3) Key Work Products, (4) Tasks, (5) Predecessors/Successors, (6) Resource, Work & Rates, (7) Schedule Conflicts, and (8) Baseline Validation. For example, selecting the Milestones category automatically selects the following QA operations: Major (VP) Milestones, Project Phase Exit DCP Milestones, Key Milestones, Check for Valid Major Milestones, Check for Valid M/S flag and Work and Check for Valid Milestone Constraint Types.

Figure 13D:
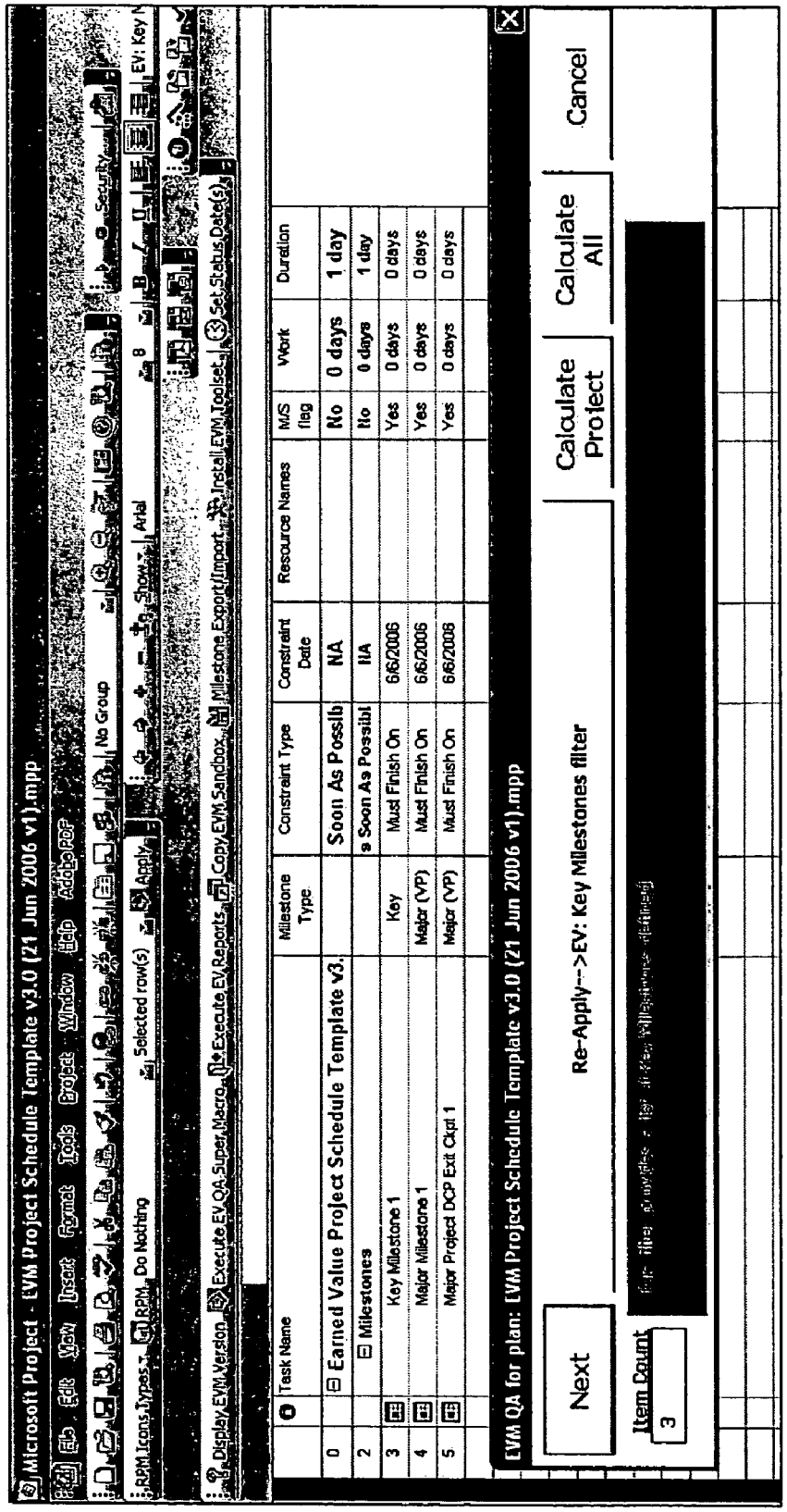
FIGS. 13D-13F depict an example of using the quality assurance super macro interface of FIG. 13C to resolve an error in a milestone constraint type, in accordance with embodiments of the present invention.
Figure 13E:
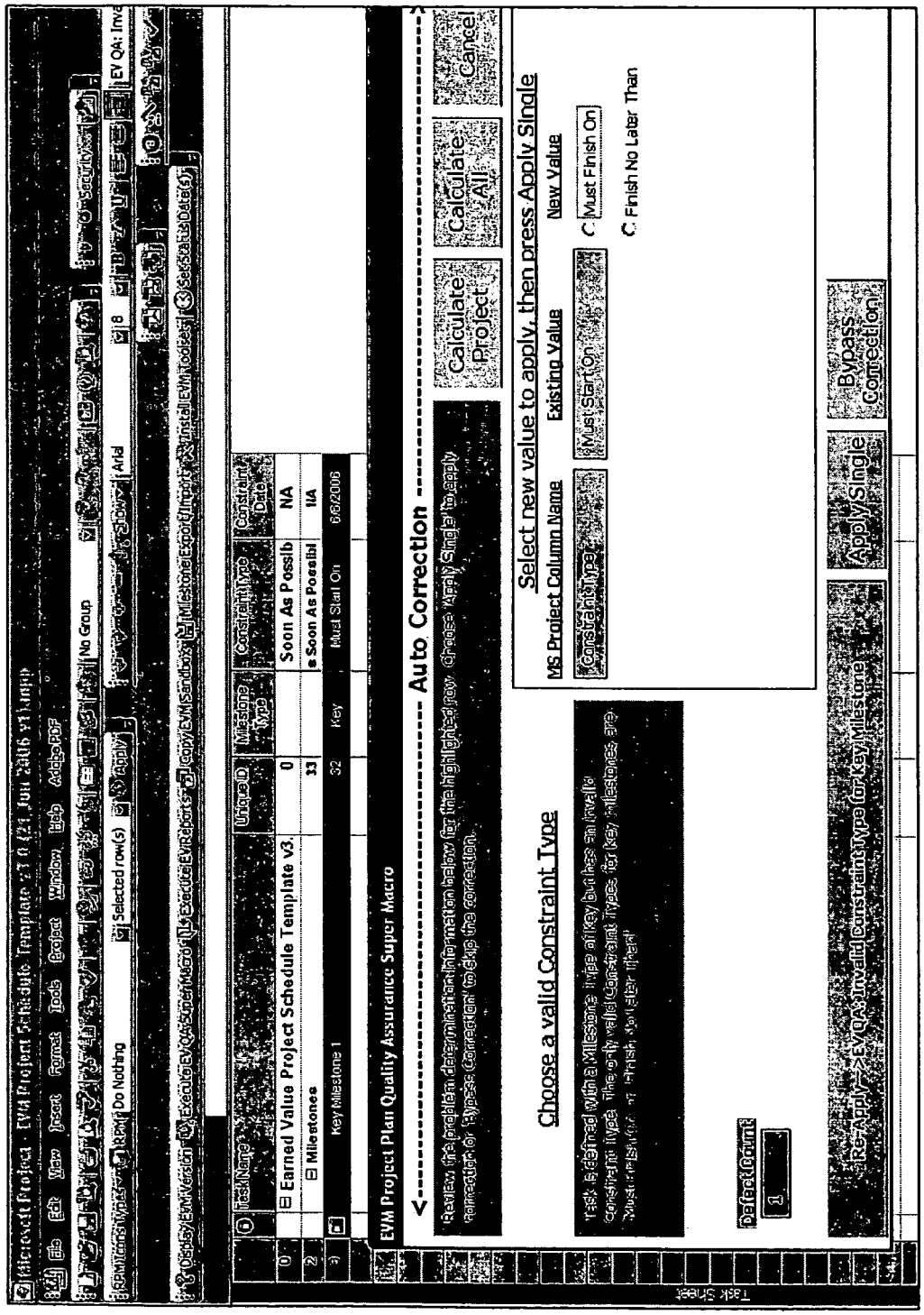
Figure 13F:
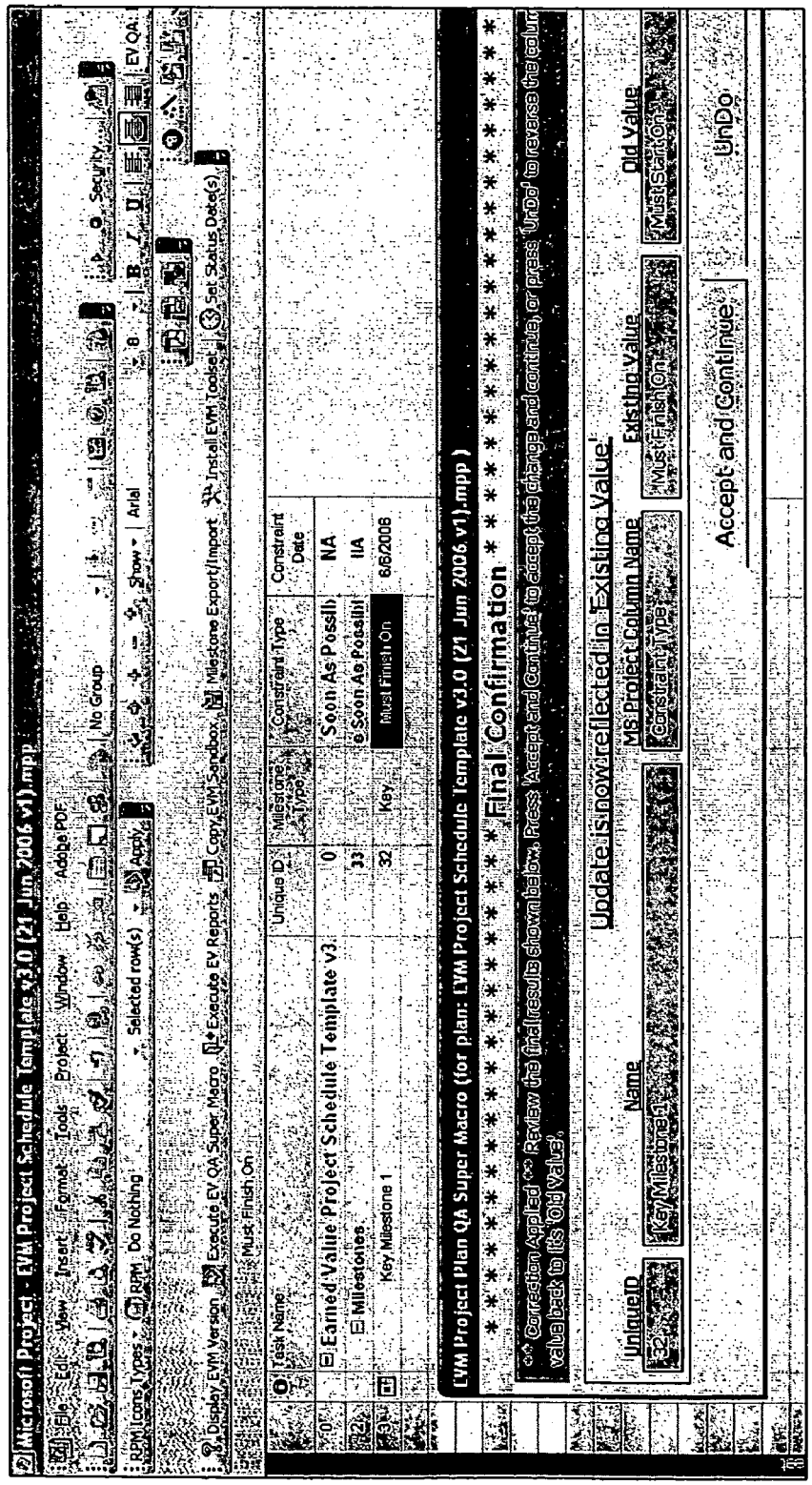

FIGS. 13D-13F depict an example of using the quality assurance super macro interface of FIG. 13C to resolve errors in a milestone constraint type, in accordance with embodiments of the present invention. In this example, QA operations including EV: Key Milestones and EV QA: Check for Valid Milestone Constraint Types are selected to be executed. It will be understood that FIGS. 13D-13F illustrate an example only, and that the super macro process of FIGS. 13A-13B and the GUI of FIG. 13C can be applied to other QA operations that execute other filters described above relative to FIGS. 1-12C.

In this example, the user also selects the automated correction mode by activating the "Auto-Correct Mode" button at the top of GUI 1350 (see FIG. 13C). The EV: Key Milestones filter is executed first to generate results in a display 1360 shown in FIG. 13D. Display 1360 includes a Milestone Type column that identifies milestone tasks as Major (VP) and Key milestones, and a Constraint Type column that specified types of constraints on start or finish dates for tasks. The dialog box in display 1360 allows the user to activate the execution of the next selected filter (e.g., by activating the Next button on display 1360).

The EV QA: Check for Valid Milestone Constraint Types operation is executed next, which executes filters including the Invalid Constraint Type for Key Milestone filter, which is described above relative to FIG. 12F. This filter's execution automatically identifies invalid constraint types and generates an exception report in a display 1380, which is shown in FIG. 13E. One invalid constraint type is the Must Start On constraint type associated with the key milestone named Key Milestone 1, which is a highlighted row on display 1380.

As the Auto-correct mode has been selected, the computing application also automatically analyzes the identified invalid constraint types and automatically determines and displays recommended changes to correct the identified invalid constraint. The recommended changes are shown in a dialog box included in display 1380. The dialog box includes the column name that is associated with the invalid value, the invalid value, and the possible values that will correct the invalid value. In this case, the dialog box in display 1380 identifies the column name as Constraint Type, the existing value is Must Start On, and the possible new values that would be valid are Must Finish On and Finish No Later Than. In this case, the user utilizes the interactive dialog box in display 1380 to select Must Finish On as the new, valid value for the Constraint Type, and then indicates that the correction is to be applied by the computing application (e.g., by activating the Apply Single button).

A display 1385 of FIG. 13F includes an updated report that shows the new value the user selected on display 1380 (see FIG. 13E). A dialog box included in display 1385 presents the name of the task, the column name that includes the changed value, the existing value (i.e., the updated value), and the old value (i.e., the value identified as invalid). This dialog box in display 1385 also presents an opportunity to the user to accept or undo the change presented in the updated report. If the user chooses to accept the change (e.g., by activating the Accept and Continue button), the computing application makes the change and then continues to the identification of the next error, if there is one. In this case, activating the Accept and Continue button changes the Constraint Type field for Key Milestone 1 from the invalid value of Must Start On to the valid value of Must Finish On. If the user chooses to undo the change (e.g., by activating the Undo button), the computing application changes the existing value back to the old value.

Baseline Error Checking

FIGS. 14A-14B depict a flow chart of an automated process of baseline error checking in the method of FIG. 1B, in accordance with embodiments of the present invention. In one embodiment, the baseline error checking process of FIGS. 14A-14B presents details of the project baseline validation process of FIG. 10. The baseline error checking process of FIGS. 14A-14B is performed by the execution of a macros and filters.

The baseline error checking process compares a project's baseline with expected values to identify baseline integrity issues that are associated with one or more tasks. A baseline integrity problem exists, for example, when a baselined value does not match an expected value (e.g., a value currently loaded in the project plan). Examples of activities that can cause a baseline integrity problem include manually adjusting baseline cost and manually adjusting a baseline start or finish date.

Baseline integrity problems can be manifested in conflicting assessments of tasks in a project plan. For example, a task assessed simultaneously as being 100% complete and as being behind schedule is an indicator of a baseline integrity problem.

The baseline error checking process begins at step 1400. Input to the baseline error checking process includes the budgeted cost of work scheduled (BCWS) and Baseline Cost (BAC). In step 1402, the computing application automatically executes the following set of pre-requisite filters which are described above relative to FIG. 10: (a) New Tasks or Milestones not Baselined, (b) Resources Assigned to Summary Tasks, (c) Task with No Resources Assigned, and (d) Tasks with Incorrect Earned Value Method. If the filters (a)-(d) identify any invalidity issues, the computing application in step 1402 automatically generates one or more exception reports that include the identified issues. Corrective actions are performed to resolve the identified issues, as described in step 1010 of FIG. 10.

In step 1404, the computing application automatically determines original baseline start and baseline finish dates for each task (e.g., by using baseline information on a time-phased data table) and loads those dates into custom fields (hereinafter referred to as the Original Baseline Start and Original Baseline Finish fields). In step 1405, the computing application automatically executes the Tasks Missing Baseline Information filter, which identifies baseline information that is missing if baseline start and/or finish fields have been manually entered rather than performing a baseline function native to the project management application (e.g., Microsoft® Project). In one embodiment, the manual entry of baseline start is indicated if a field for an original baseline start includes a predetermined baseline start default value and a field for a baseline start (rollup) does not include the predetermined baseline start default value. Similarly, the manual entry of baseline finish is indicated if a field for an original baseline finish includes a predetermined baseline finish default value and a field for a baseline finish (rollup) does not include the predetermined baseline finish default value.

If the execution of the filter in step 1405 indicates any missing baseline information, then the computing application automatically generates an exception report that indicates the missing information. In step 1405, the user performs corrective actions via the computing application to resolve the missing baseline information issue. For example, the user selects options provided by the computing application to baseline an individual task, thereby populating the baseline start and finish fields.

In step 1406, the computing application automatically executes the Baseline Start Mismatches filter and displays an exception report if a mismatch exists between the baseline start date and the original baseline start date for a task. This mismatch indicates that the baseline start date has been updated manually. The exception report generated in step 1406 includes the errors (i.e., baseline start mismatches) that were found in step 1406. Further details regarding the Baseline Start Mismatches filter are included above relative to the discussion of FIG. 10.

If inquiry step 1408 determines that a baseline start mismatch error was identified and is included in the exception report generated in step 1406, then the computing application automatically determines and automatically displays one or more corrective actions in step 1410 that can resolve one or more errors indicated by the exception report. The user selects an option in step 1410 to prompt the computing application to automatically apply a displayed corrective action or to bypass the displayed corrective action(s). Following step 1410, the process repeats starting at step 1406. For example, the user selects an option to restore the original baseline start date to the baseline start field. Alternatively, if the original baseline start date is less than the project start date, the user selects an option to set the baseline start date to the project start date.

If inquiry step 1408 determines that no errors were identified in step 1406, then in step 1412, the computing application automatically executes the Baseline Finish Mismatches filter and generates an exception report if a mismatch exists between the baseline finish date and the original baseline finish date. This mismatch indicates that the baseline finish date has been updated manually. The exception report generated in step 1412 includes the errors (i.e., baseline finish mismatches) that were found in step 1412. Further details regarding the Baseline Finish Mismatches filter are included above relative to the discussion of FIG. 10.

If inquiry step 1414 determines that a baseline finish mismatch error is identified and is included in the exception report generated in step 1412, then the computing application automatically determines and automatically displays one or more corrective actions in step 1416 that can resolve one or more errors indicated by the exception report. The user selects an option in step 1416 to prompt the computing application to automatically apply a displayed corrective action or to bypass the displayed corrective action(s). Following step 1416, the process repeats starting at step 1412. For example, the user selects an option to restore the original baseline finish date to the baseline finish field. Alternatively, if the original baseline finish date is less than the project finish date, the user selects an option to set the baseline finish date to the project finish date.

If inquiry step 1414 determines that no errors are identified in step 1412, then the baseline error checking process continues in FIG. 14B.

In step 1418 of FIG. 14B, the computing application automatically sets the project status date equal to the end date of the project to initiate preliminary calculations that facilitate the computation of BCWS and BAC.

In step 1420, the computing application automatically executes the BCWS−BAC<0 filter, which identifies an invalid manual increase of the baseline cost if BCWS−BAC is less than zero. The computing application also automatically generates an exception report indicating any invalidity issues (i.e., manual increase of BAC) found by the filter executed in step 1420.

If inquiry step 1422 determines that the exception report of step 1420 includes at least one record (i.e., step 1420 identifies at least one error), then the computing application automatically determines and automatically displays one or more corrective actions in step 1424 that can resolve one or more errors indicated by the exception report. The user selects an option in step 1424 to prompt the computing application to automatically apply a displayed corrective action or to bypass the displayed corrective action(s). Following step 1424, the process repeats starting at step 1420. In one embodiment, the computing application displays in step 1424 a corrective action that includes adding the value of the BCWS−BAC field to the baseline cost field, and the user can select an option to apply or bypass the displayed corrective action.

If inquiry step 1422 determines that no records are included in an exception report generated by step 1420 (i.e., no errors are identified in step 1420), then the computing application automatically executes the BCWS−BAC>0 filter in step 1426.

The BCWS−BAC>0 filter identifies an invalid manual reduction of the baseline cost if BCWS-BAC is greater than zero. The computing application also automatically generates an exception report indicating any invalidity issues (i.e., manual reduction of BAC) found by the filter executed in step 1426.

If inquiry step 1428 determines that the exception report of step 1426 includes at least one record (i.e., step 1426 identifies at least one error), then the computing application automatically determines and automatically displays one or more corrective actions in step 1430 that can resolve one or more errors indicated by the exception report. The user selects an option in step 1430 to prompt the computing application to automatically apply a displayed corrective action or to bypass the displayed corrective action(s). Following step 1430, the process repeats starting at step 1426. In one embodiment, the computing application displays in step 1430 a corrective action that includes adding the value of the BCWS−BAC field to the baseline cost field, and the user can select an option to apply or bypass the displayed corrective action.

If inquiry step 1428 determines that no records are included in an exception report generated by step 1426 (i.e., no errors are identified in step 1426), then in step 1432, the computing application automatically executes the Completed Tasks with insufficient EV filter, which identifies an earned value (i.e., BCWP) that is not equal to BAC for a completed task. This error condition occurs, for example, as a result of marking tasks as complete within an e2e integrated plan managed by Microsoft® Project when the status dates within the subproject and the e2e integrated plan do not match. In one embodiment, the user corrects the error identified in step 1432 by setting the Physical % Complete field to 0%, and then setting the same field back to 100% and performing a Calculate Project function native to Microsoft® Project. After the issues on the exception report of step 1432 are resolved, the baseline error checking process of FIG. 14B ends at step 1434.

Baseline Error Checking Example

FIG. 14C is a screen illustrating baseline errors to be detected by the process of FIGS. 14A-14B and FIG. 14D is a screen illustrating a result of identifying baseline information missing from the screen of FIG. 14C, in accordance with embodiments of the present invention. Each of screens 1450 of FIGS. 14C and 1460 of FIG. 14D includes the following nine columns: (1) Task Name, (2) Start (i.e., start date of the task), (3) Finish (i.e., finish date of the task), (4) Baseline Start (Rollup), (5) Baseline Finish (Rollup), (6) Original Baseline Start, (7) Original Baseline Finish, (8) BCWS-BAC, and (9) Baseline Cost (Rollup). It should be noted that negative values in the last two columns of screen 1450 or screen 1460 are indicated by parentheses.

Screen 1460 of FIG. 14D includes values that were populated in the Original Baseline Start and Original Baseline Finish fields after the completion of steps 1404 and 1405 in FIG. 14A, but prior to the application of any filters starting at step 1406 of FIG. 14A and prior to the application of any corrective actions in steps 1410 and 1416 of FIG. 14A and steps 1424 and 1430 of FIG. 14B.

The baseline error checking process of FIGS. 14A-14B detects the errors that are indicated in the names of the tasks in the Task Name column of screen 1450. For example, for the task in the third row of data in screen 1450 (i.e., the task named "Manually Increased Baseline Start Date to 12/17"), a filter in step 1406 of FIG. 14A identifies that the baseline start date for this task had been previously manually increased to 12/17/2003 (i.e., the value in the Baseline Start (Rollup) field). Step 1410 of FIG. 14A performs the corrective action that copies the Original Baseline Start value of 12/15/2003 to the Baseline Start field, as shown in the third row of data in screen 1460 of FIG. 14D.

Behind Schedule Performance Index

FIG. 15 is an example of a report including a behind schedule performance index used in the methods of FIG. 1A and/or FIG. 1B, in accordance with embodiments of the present invention. Project status and trend reports are reviewed by the user following periodic updates to project plans. These reports facilitate project execution, tracking and controlling by providing an early warning system that detects impending issues related to a project. EV Rollup report 1500 includes data for an e2e integrated plan (i.e., data under the E2E column) and four subprojects of the e2e integrated plan (i.e., data under the Planning, Develop PM, Develop, and Qualify columns).

Report 1500 includes a computation for Behind Schedule Performance Index (BSPI). BSPI is a custom and novel metric defined by the formula: $((BCWP-Ahead)/BCWS) \times 100\%$, which is equivalent to $((BCWS+Behind)/BCWS) \times 100\%$, where $Ahead >= 0$, $Behind <= 0$, Ahead is the Ahead of Schedule component of SV, and Behind in the Behind Schedule component of SV.

BSPI presents a more conservative view of project performance compared to SPI, as BSPI's formula excludes the impact of the Ahead of Schedule component of SV. That is, BSPI considers only the Behind Schedule portion of the SV as a ratio to BCWS. BSPI advantageously provides a view of impending project execution problems that would otherwise be masked from view due to the presence of the Ahead of Schedule component of the SV.

For example, in the Develop subproject of report 1500, the SPI is 135.3% and the BSPI is 79.7%. Even though an SPI of greater than 100% indicates a project that is ahead of schedule overall, this discrepancy between SPI and BSPI values indicates that the SPI value is masking problems relative to Behind Schedule components of the SV value. Further, since the difference between SPI and BSPI for the Develop subproject is substantially greater than the differences for any of the other subprojects of report 1500, the Develop subproject is identified as the source of most of the tasks that are behind schedule.

Ahead/Behind Reporting

Figure 16A:
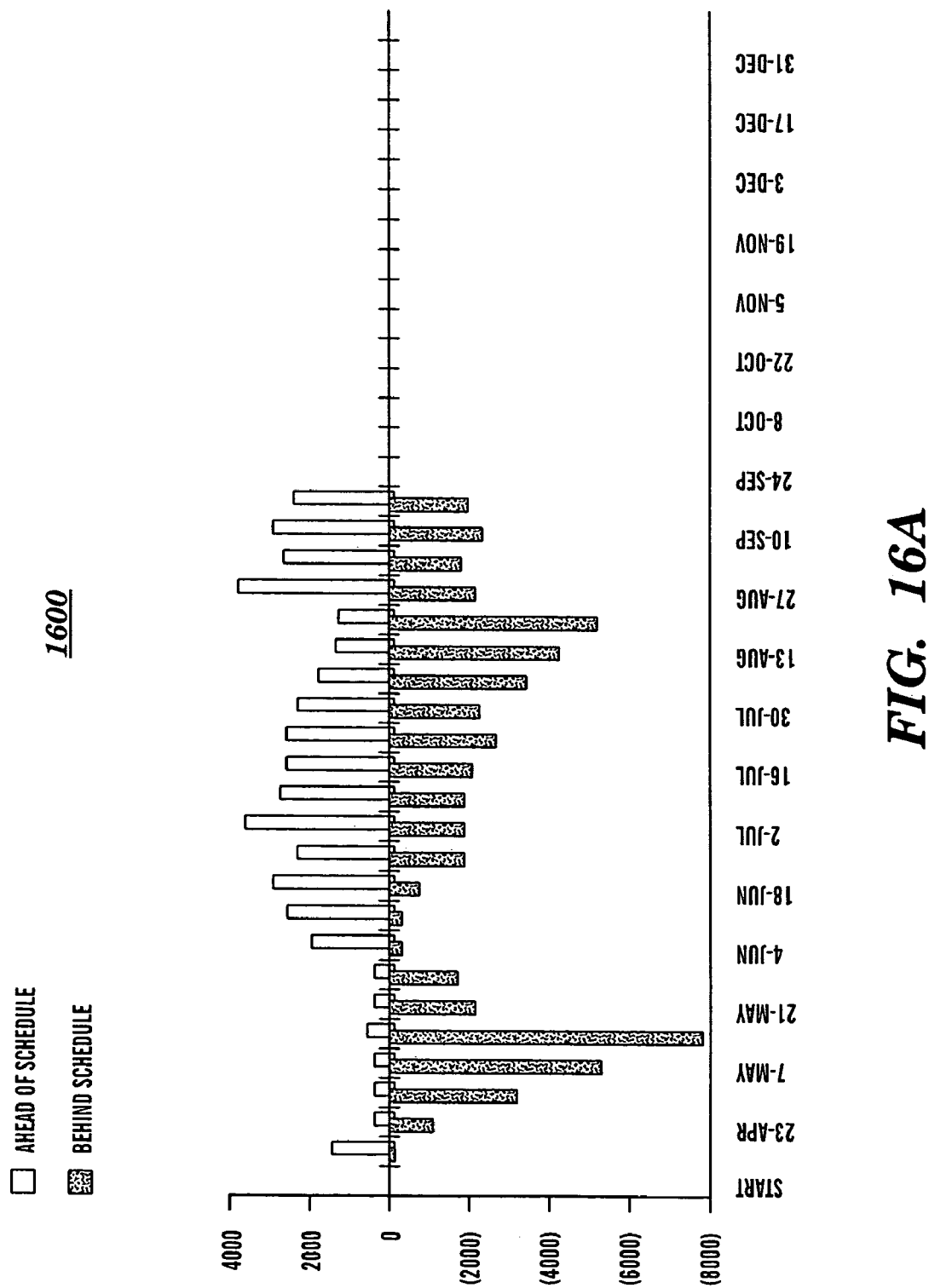
FIG. 16A is an example of an ahead/behind trend graph used to analyze Ahead of Schedule and Behind Schedule components of a project plan in the methods of FIG. 1A and/or FIG. 1B, in accordance with embodiments of the present invention.

FIG. 16A is an example of an ahead/behind trend graph used to analyze Ahead of Schedule and Behind Schedule components of a project plan in the methods of FIG. 1A and/or FIG. 1B, in accordance with embodiments of the present invention. An ahead/behind trend graph is generated by the computing application and is presented to the user, for example, in step 108 (see FIG. 1A). The ahead/behind trend graph includes indicators for Ahead of Schedule and Behind Schedule values for specified time periods. In the example of trend graph 1600, vertical bars extending above a horizontal zero line indicate Ahead of Schedule values and vertical bars extending below the zero line indicate Behind Schedule values.

As Ahead of Schedule values offset Behind Schedule values in industry standard calculations for SPI, a value for SPI that indicates a project that is ahead of schedule overall (i.e., an SPI value above 100%) may mask a problem related to substantial numbers of tasks or any number of critical tasks being behind schedule.

For example, the project associated with trend graph 1600, has approximately 2000 hours for Behind Schedule data points in September, which is more than offset by similar, but slightly higher values for Ahead of Schedule. Thus, during this time in September, the SPI is reported as greater than 100%, which indicates a project that is ahead of schedule overall and provides no early warning of portions of the project that are behind schedule. After viewing a report or a trend graph (not shown) that indicates this greater than 100% value for SPI, the user views ahead/behind trend graph 1600. The user analyzes graph 1600 and finds that that there are non-zero values for Behind Schedule during September. These non-zero values indicate that there are tasks that are behind schedule that may jeopardize the end deliverable of the project. As used herein, an end deliverable is defined as any measurable, tangible, and verifiable item that must be produced to complete a project. In one embodiment, the user utilizes a Behind Schedule report (see FIG. 16B) to refine the analysis of the Behind Schedule components shown in ahead/behind trend graph 1600.

FIG. 16B is an example of a Behind Schedule report used to analyze behind schedule components of a project plan in the methods of FIG. 1A and/or FIG. 1B, in accordance with embodiments of the present invention. A Behind Schedule report is generated by the computing application and is presented to the user, for example, in step 108 (see FIG. 1A). A Behind Schedule report provides a view of tasks that are not progressing consistent with baseline expectations. A Behind Schedule report includes only non-zero Behind Schedule values and their associated tasks, along with summarized Behind Schedule values for the associated tasks' summary tasks, subprojects and/or the e2e integrated plan. The Behind Schedule report does not include Ahead of Schedule values, nor does the report include tasks, summary tasks, subprojects, or an e2e integrated plan whose Behind Schedule value is zero.

The values for Behind Schedule in the Behind Schedule report (e.g., report 1650) are determined by formula (1) presented below.

$$IIf(([BCWP]-[BCWS]<0 \text{ And } [External Task]=No), [BCWP]-[BCWS],0) \qquad (1)$$

It should be noted that in formula (1), [External Task]=No excludes BCWP−BCWS values that are associated with hidden external tasks that exist only as local images in a plan, and therefore includes only BCWP−BCWS values that are associated with tasks that actually exist in the plan. A task is set up as one of the aforementioned hidden external tasks by, for example, the native functionality of project management software such as Microsoft® Project.

During the performance of the status reporting of the EVM of FIG. 1A, the user initiates execution of a macro via the computing application to automatically apply formula (1) to facilitate the computing application's automatic generation of a Behind Schedule report that filters out tasks that are ahead of schedule. As an option, the user can specify a sensitivity setting so that the macro also filters out certain tasks from being shown on the Behind Schedule report, where the filtered out tasks are behind schedule for a time period that is less than the specified sensitivity setting. For example, to generate report 1650, the user specifies a sensitivity setting of 60 hours so that only tasks which are greater than or equal to 60 hours behind schedule are included in the Behind Schedule report.

The Behind Schedule report also includes a Behind Schedule (B/S) Critical Path value for each of the included tasks, summary tasks, subprojects and e2e integrated plan. A B/S Critical Path value records Behind Schedule hours for a task if the task is on the project's critical path.

For projects with a substantial number of tasks (e.g., tens of thousands of tasks), the Behind Schedule report advantageously reduces the number of tasks to view by a substantial number via the macro that filters out ahead of schedule tasks, as well as behind schedule tasks that do not meet the sensitivity setting if the setting has been specified. In this way, the present invention eliminates or substantially decreases the amount of scrolling or advancing of pages required to view the tasks that are associated with non-zero Behind Schedule values.

In exemplary Behind Schedule report 1650, the report also includes Task Name, Task ID, Baseline Cost, BCWS and BCWP for the tasks, summary tasks, subprojects and/or e2e integrated plan. In report 1650, the BCWP and BCWS values indicate that 62,427 hours of value were earned against a plan of 62,651 hours. In this report, all rates are assumed to be loaded at $1/hour in the plan yielding earned value in hours. While the SV indicates only 224 hours behind schedule (i.e., the difference between BCWP and BCWS, or 62,651), the Behind Schedule value for all tasks is 1,714 hours (i.e., the Behind Schedule value for the e2e integrated plan named Lab Integrated Plan). The B/S Critical path value of 709 indicates that 709 hours of the 1714 Behind Schedule hours are on the project's critical path. Behind Schedule report 1650 also indicates that the task named System Test accounts for the largest portion of the Behind Schedule hours (i.e., 1202 hours of the 1714 Behind Schedule hours). Further, the task named Documentation/Training accounts for the largest portion of the B/S Critical Path hours (i.e., 249 hours of the 709 total B/S Critical Path hours).

The computing application also is capable of automatically generating an Ahead of Schedule report (not shown) that provides a view of tasks whose progress exceeds the baseline plan. An Ahead of Schedule report includes Ahead of Schedule values for tasks, summary tasks, subprojects, and e2e integrated plan. In one embodiment, the report also includes Task Name, Task ID, Baseline Cost, BCWS and BCWP. The values for Ahead of Schedule in the Ahead of Schedule report are determined by the novel formula (2) presented below.

$$IIf(([BCWP]-[BCWS]>=0 \text{ And } [External Task]=No), [BCWP]-[BCWS],0) \qquad (2)$$

A user-activated macro automatically applies formula (2) to facilitate the computing application's generation of the Ahead of Schedule report. As an option, the user can specify a sensitivity setting that filters out certain tasks that are ahead of schedule from being shown on the Ahead of Schedule report. For example, the user specifies a sensitivity setting of 40 hours so that only tasks that are more than 40 hours ahead of schedule are shown on the Ahead of Schedule report.

Similar to the Behind Schedule report, the Ahead of Schedule report advantageously reduces the number of tasks to view by a substantial number via the macro that filters out behind schedule tasks, as well as ahead of schedule tasks that do not meet the sensitivity setting if the setting has been specified. Thus, the present invention eliminates or substantially decreases the amount of scrolling or advancing of pages required to view the tasks that are associated with non-zero Ahead of Schedule values.

Computing System

Figure 17:
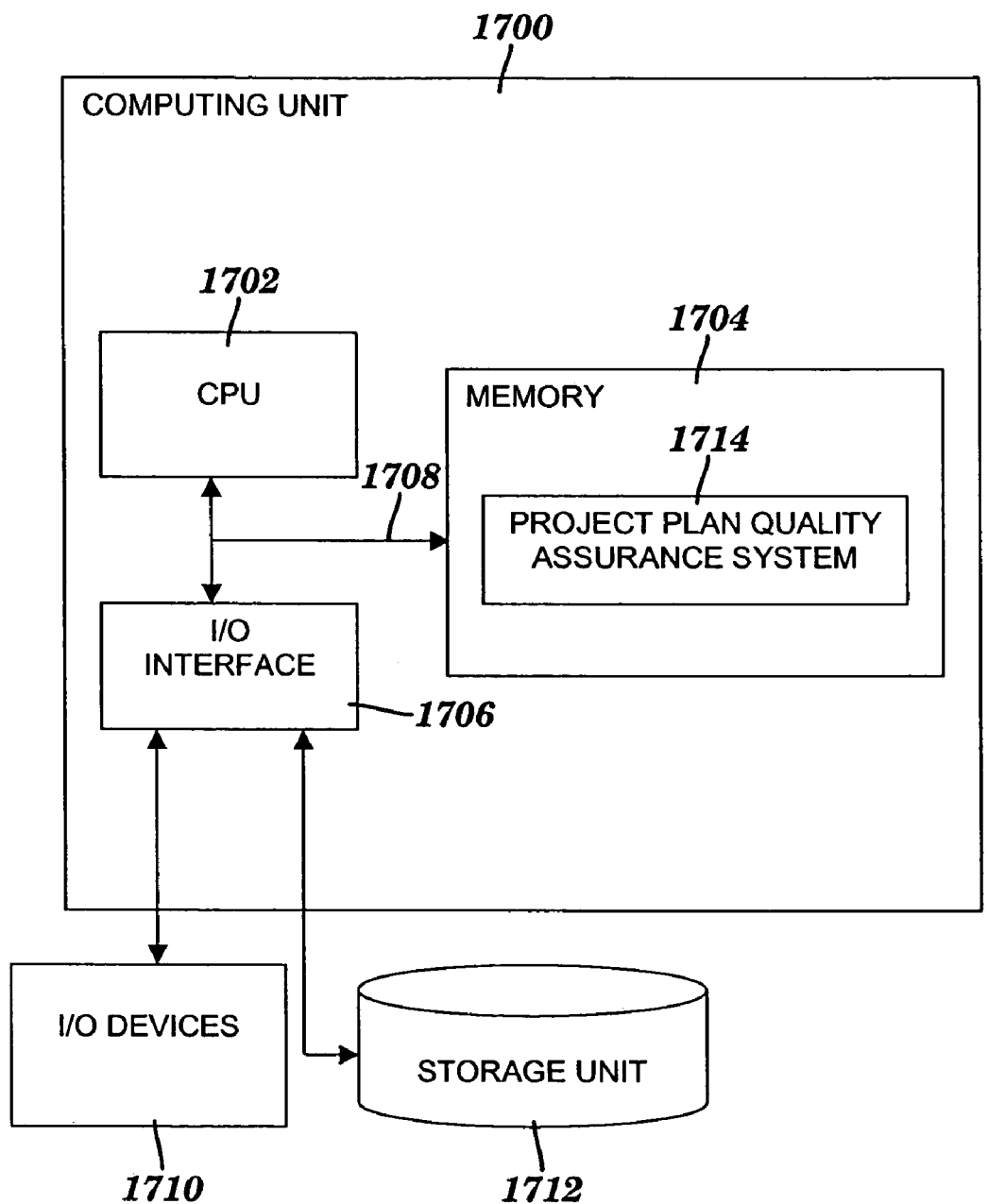
FIG. 17 is a block diagram of a computing system for implementing the methods of FIGS. 1A and 1B, in accordance with embodiments of the present invention.

FIG. 17 is a block diagram of a computing system for implementing the methods of FIGS. 1A and 1B, in accordance with embodiments of the present invention. Computing unit 1700 generally comprises a central processing unit (CPU) 1702, a memory 1704, an input/output (I/O) interface 1706, a bus 1708, I/O devices 1710 and a storage unit 1712. CPU 1702 performs computation and control functions of computing unit 1700. CPU 1702 may comprise a single processing unit, or be distributed across one or more processing units in one or more locations (e.g., on a client and server).

Memory 1704 may comprise any known type of data storage and/or transmission media, including magnetic media, optical media, random access memory (RAM), read-only memory (ROM), a data cache, a data object, etc. Local memory elements of memory 1704 are employed during actual execution of a task validation system included in a project plan quality assurance system 1714. Cache memory elements of memory 1704 provide temporary storage of at least some program code in order to reduce the number of times code must be retrieved from bulk storage during execution. Storage unit 1712 is, for example, a magnetic disk drive or an optical disk drive that stores data. Moreover, similar to CPU 1702, memory 1704 may reside at a single physical location, comprising one or more types of data storage, or be distributed across a plurality of physical systems in various forms. Further, memory 1704 can include data distributed across, for example, a LAN, WAN or storage area network (SAN) (not shown).

I/O interface 1706 comprises any system for exchanging information to or from an external source. I/O devices 1710 comprise any known type of external device, including a display monitor, keyboard, mouse, printer, speakers, handheld device, printer, facsimile, etc. Bus 1708 provides a communication link between each of the components in computing unit 1700, and may comprise any type of transmission link, including electrical, optical, wireless, etc.

I/O interface 1706 also allows computing unit 1700 to store and retrieve information (e.g., program instructions or data) from an auxiliary storage device, such as a non-volatile storage device (e.g., a CD-ROM drive which receives a CD-ROM disk) (not shown). Computing unit 1700 can store and retrieve information from other auxiliary storage devices (not shown), which can include a direct access storage device (DASD) (e.g., hard disk or floppy diskette), a magneto-optical disk drive, a tape drive, or a wireless communication device.

Memory 1704 includes computer program code comprising project plan quality assurance system 1714. Further, memory 1704 may include other systems not shown in FIG. 17, such as an operating system (e.g., Linux) that runs on CPU 1702 and provides control of various components within and/or connected to computing unit 1700.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 1714 for use by or in connection with a computing unit 1700 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 1704, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the task validation method of the present invention. Thus, the present invention discloses a process for supporting computer infrastructure, comprising integrating, hosting, maintaining and deploying computer-readable code into a computing system (e.g., computing unit 1700), wherein the code in combination with the computing system is capable of performing a method of validating a task of a project.

In another embodiment, the invention provides a business method that performs the process steps of the invention on a subscription, advertising and/or fee basis. That is, a service provider, such as a Solution Integrator, can offer to create, maintain, support, etc. the task validation method of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of validating a plurality of tasks of a project, said method comprising:
   a computer receiving a single selection from a user;
   responsive to said receiving said single selection, said computer automatically performing a sequence of validations by identifying a plurality of errors, wherein said identifying said plurality of errors includes:
      said computer validating one or more milestones included in said plurality of tasks to identify a first error;
      subsequent to said validating to identify said first error, said computer validating one or more dependencies and one or more deliverables included in said plurality of tasks to identify a second error;
      subsequent to said validating to identify said second error, said computer validating one or more work products included in said plurality of tasks to identify a third error;
      subsequent to said validating to identify said third error, said computer validating a first set of one or more tasks of a work breakdown structure to identify a fourth error, wherein said work breakdown structure defines work to be accomplished to achieve a final objective of said project, and wherein said first set of one or more tasks is included in said plurality of tasks;
      subsequent to said validating to identify said fourth error, said computer validating one or more predecessors and one or more successors of said first set of one or more tasks of said work breakdown structure to identify a fifth error;
      subsequent to said validating to identify said fifth error, said computer validating resources, work and labor rates associated with said plurality of tasks to identify a sixth error;
      subsequent to said validating to identify said sixth error, said computer validating one or more links connecting a second set of one or more tasks of said plurality of tasks in said project with a third set of one or more tasks of a second project to identify a seventh error; and subsequent to said validating to identify said seventh error, said computer validating critical dates of give and get tasks included in said plurality of tasks to identify an eighth error;

said computer initiating a display of said plurality of errors, wherein said plurality of errors includes at least two errors selected from the group consisting of said first error, said second error, said third error, said fourth error, said fifth error, said sixth error, said seventh error and said eighth error;

said computer initiating a display of a notification of a plurality of corrective actions for correcting said plurality of errors;

said computer receiving a selection by said user of a corrective action of said plurality of corrective actions; and responsive to said receiving said selection of said corrective action, said computer automatically performing said corrective action to correct an error of said plurality of errors, wherein said error is included in said at least two errors.

2. The method of claim 1, wherein said validating critical dates of give and get tasks included in said plurality of tasks to identify said eighth error includes:

said computer determining a predecessor field indicating a predecessor task of a second task of said plurality of tasks includes a directory path name that is associated with said project; and said computer determining a conflict between a first critical date on which said second task is to be started and a second critical date on which said predecessor task is to be finished by determining said second critical date is after said first critical date without restarting said computer, wherein said identifying said plurality of errors includes identifying said error based on said determining said predecessor field includes said directory path name and said determining said conflict between said first critical date and said second critical date, and wherein said automatically performing said corrective action to correct said error includes updating said first critical date or said second critical date so that said second critical date on which said predecessor task is to be finished is not after said first critical date on which said second task is to be started.

3. A computer system comprising:

a central processing unit (CPU);

a computer-readable memory coupled to said CPU;

a computer-readable, tangible storage device coupled to said CPU, said storage device containing instructions that are carried out by said CPU via said memory to implement a method of validating a plurality of tasks of a project, said method comprising:

receiving a single selection from a user;

responsive to said receiving said single selection, automatically performing a sequence of validations by identifying plurality of errors, wherein said identifying said plurality of errors includes:

validating one or more milestones included in said plurality of tasks to identify a first error;

subsequent to said validating to identify said first error, validating one or more dependencies and one or more deliverables included in said plurality of tasks to identify a second error;

subsequent to said validating to identify said second error, validating one or more work products included in said plurality of tasks to identify a third error;

subsequent to said validating to identify said third error, validating a first set of one or more tasks of a work breakdown structure to identify a fourth error, wherein said work breakdown structure defines work to be accomplished to achieve a final objective of said project, and wherein said first set of one or more tasks is included in said plurality of tasks;

subsequent to said validating to identify said fourth error, validating one or more predecessors and one or more successors of said first set of one or more tasks of said work breakdown structure to identify a fifth error;

subsequent to said validating to identify said fifth error, validating resources, work and labor rates associated with, said plurality of tasks to identify a sixth error;

subsequent to said validating to identify said sixth error, validating one or more links connecting a second set of one or more tasks of said plurality of tasks in said project with a third set of one or more tasks of a second project to identify a seventh error; and subsequent to said validating to identify said seventh error, validating critical dates of give and get tasks included in said plurality of tasks to identify an eighth error;

initiating a display of said plurality of errors, wherein said plurality of errors includes at least two errors selected from the group consisting of said first error, said second error, said third error, said fourth error, said fifth error, said sixth error, said seventh error and said eighth error;

initiating a display of a notification of a plurality of corrective actions for correcting said plurality of errors;

receiving a selection by said user of a corrective action of said plurality of corrective actions; and automatically performing, responsive to said receiving said selection of said corrective action, said corrective action to correct an error of said plurality of errors, wherein said error is included in said at least two errors.

4. The computer system of claim 3, wherein said validating critical dates of give and get tasks included in said plurality of tasks to identify said eighth error includes:

determining a predecessor field indicating a predecessor task of a second task of said plurality of tasks includes a directory path name that is associated with said project; and determining a conflict between a first critical date on which said second task is to be started and a second critical date on which said predecessor task is to be finished by determining said second critical date is after said first critical date without restarting said computer system, wherein said identifying said plurality of errors includes identifying said error based on said determining said predecessor field includes said directory path name and said determining said conflict between said first critical date and said second critical date, and wherein said automatically performing said corrective action to correct said error includes updating said first critical date or said second critical date so that said second critical date on which said predecessor task is to be finished is not after said first critical date on which said second task is to be started.

5. A computer program product comprising a computer-readable, tangible storage device including computer-readable program code containing instructions that are carried out by a central processing unit of a computer to implement a method of validating a plurality of tasks of a project, said method comprising:

receiving a single selection from a user;

responsive to said receiving said single selection, automatically performing a sequence of validations by identifying a plurality of errors, wherein said identifying said plurality of errors includes:

validating one or more milestones included in said plurality of tasks to identify a first error;

subsequent to said validating to identify said first error, validating one or more dependencies and one or more deliverables included in said plurality of tasks to identify a second error;

subsequent to said validating to identify said second error, validating one or more work products included in said plurality of tasks to identify a third error;

subsequent to said validating to identify said third error, validating a first set of one or more tasks of a work breakdown structure to identify a fourth error, wherein said work breakdown structure defines work to be accomplished to achieve a final objective of said project, and wherein said first set of one or more tasks is included in said plurality of tasks;

subsequent to said validating to identify said fourth error, validating one or more predecessors and one or more successors of said first set of one or more tasks of said work breakdown structure to identify a fifth error;

subsequent to said validating to identify said fifth error, validating resources, work and labor rates associated with said plurality of tasks to identify a sixth error;

subsequent to said validating to identify said sixth error, validating one or more links connecting a second set of one or more tasks of said plurality of tasks in said project with a third set of one or more tasks of a second project to identify a seventh error; and subsequent to said validating to identify said seventh error, validating critical dates of give and get tasks included in said plurality of tasks to identify an eighth error;

initiating a display of said plurality of errors, wherein said plurality of errors includes at least two errors selected from the group consisting of said first error, said second error, said third error, said fourth error, said fifth error, said sixth error, said seventh error and said eighth error;

initiating a display of a notification of a plurality of corrective actions for correcting said plurality of errors;

receiving a selection by said user of a corrective action of said plurality of corrective actions; and responsive to said receiving said selection of said corrective action, automatically performing said corrective action to correct an error of said plurality of errors, wherein said error is included in said at least two errors.

6. The program product of claim 5, wherein said validating critical dates of give and get tasks included in said plurality of tasks to identify said eighth error includes:

determining a predecessor field indicating a predecessor task of a second task of said plurality of tasks includes a directory path name that is associated with said project; and determining a conflict between a first critical date on which said second task is to be started and a second critical date on which said predecessor task is to be finished by determining said second critical date is after said first critical date without restarting said computer, wherein said identifying said plurality of errors includes identifying said error based on said determining said predecessor field includes said directory path name and said determining said conflict between said first critical date and said second critical date, and wherein said automatically performing said corrective action to correct said error includes updating said first critical date or said second critical date so that said second critical date on which said predecessor task is to be finished is not after said first critical date on which said second task is to be started.

7. A process for supporting computing infrastructure, said process comprising providing at least one support service for at least one of creating, integrating, hosting, maintaining, and deploying computer-readable code in a computer comprising a central processing unit (CPU), wherein said CPU carries out instructions contained in the code causing the computer to perform method of validating a plurality of tasks of a project, said method comprising:

said computer receiving a single selection from a user;

responsive to said receiving said single selection, said computer automatically performing a sequence of validations by identifying a plurality of errors, wherein said identifying said plurality of errors includes:

said computer validating one or more milestones included in said plurality of tasks to identify a first error;

subsequent to said validating to identify said first error, said computer validating one or more dependencies and one or more deliverable included in said plurality of tasks to identify a second error;

subsequent to said validating to identify said second error, said computer validating one or more work products included in said plurality of tasks to identify a third error;

subsequent to said validating to identify said third error, said computer validating a first set of one or more tasks of a work breakdown structure to identify a fourth error, wherein said work breakdown structure defines work to be accomplished to achieve a final objective of said project, and wherein aid first set of one or more tasks is included in said plurality of tasks;

subsequent to said validating to identify said fourth error, said computer validating one or more predecessors and one or more successors of said first set of one or more tasks of said work breakdown structure to identify a fifth error;

subsequent to said validating to identify said fifth error, said computer validating resources, work and labor rates associated with said plurality of tasks to identify a sixth error;

subsequent to said validating to identify said sixth error, said computer validating one or more links connecting a second set of one or more tasks of said plurality of tasks in said project with a third set of one or more tasks of a second project to identify a seventh error; and subsequent to said validating to identify said seventh error, said computer validating critical dates of give and get tasks included in said plurality of tasks to identify an eighth error;

said computer initiating a display of said plurality of errors, wherein said plurality of errors includes at least two errors selected from the group consisting of said first error, said second error, said third error, said fourth error, said fifth error, said sixth error, said seventh error and said eighth error;

said computer initiating a display of a notification of a plurality of corrective actions for correcting said plurality of errors;

said computer receiving a selection by said user of a corrective action of said plurality of corrective actions; and responsive to said receiving said selection of said corrective action, said computer automatically performing said corrective action to correct an error of said plurality of errors, wherein said error is included in said at least two errors.

8. The process of claim 7, wherein said validating critical dates of give and get tasks included in said plurality of tasks to identify said eighth error includes:

said computer determining a predecessor field indicating a predecessor task of a second task of said plurality of tasks includes a directory path name that is associated with said project; and said computer determining a conflict between a first critical date on which said second task is to be started and a second critical date on which said predecessor task is to be finished by determining said second critical date is after said first critical date without restarting said computer, wherein said identifying said plurality of errors includes identifying said error based on said determining said predecessor field includes said directory path name and said determining said conflict between said first critical date and said second critical date, and wherein said automatically performing said corrective action to correct said error includes updating said first critical date or said second critical date so that said second critical date on which said predecessor task is to be finished is not after said first critical date on which said second task is to be started.

* * * * *